(12) United States Patent
Huang et al.

(10) Patent No.: US 12,302,394 B2
(45) Date of Patent: May 13, 2025

(54) METHOD AND APPARATUS FOR LISTEN BEFORE TALK FOR SIDELINK TRANSMISSION IN A WIRELESS COMMUNICATION SYSTEM

(71) Applicant: ASUSTek Computer Inc., Taipei (TW)

(72) Inventors: Chun-Wei Huang, Taipei (TW); Ming-Che Li, Taipei (TW); Li-Chih Tseng, Taipei (TW); Yi-Hsuan Kung, Taipei (TW)

(73) Assignee: ASUSTEK Computer Inc., Taipei (TW)

( * ) Notice: Subject to any disclaimer, the term of this patent is extended or adjusted under 35 U.S.C. 154(b) by 253 days.

(21) Appl. No.: 17/886,512

(22) Filed: Aug. 12, 2022

(65) Prior Publication Data

US 2023/0064680 A1 Mar. 2, 2023

Related U.S. Application Data

(60) Provisional application No. 63/233,053, filed on Aug. 13, 2021.

(51) Int. Cl.
*H04W 74/08* (2024.01)
*H04L 1/18* (2023.01)
(Continued)

(52) U.S. Cl.
CPC ....... *H04W 74/0816* (2013.01); *H04L 1/1812* (2013.01); *H04L 27/2607* (2013.01); *H04W 74/002* (2013.01); *H04W 92/18* (2013.01)

(58) Field of Classification Search
None
See application file for complete search history.

(56) References Cited

U.S. PATENT DOCUMENTS

2020/0029340 A1 1/2020 He et al.
2021/0014694 A1 1/2021 Li et al.
(Continued)

FOREIGN PATENT DOCUMENTS

CN 112671521 A 4/2021
CN 114503738 A 5/2022
(Continued)

OTHER PUBLICATIONS

Corresponding Chinese Patent Application No. 202210968706.1, Office Action dated Mar. 26, 2024, 36 pages.

*Primary Examiner* — Yemane Mesfin
*Assistant Examiner* — Jeff Banthrongsack
(74) *Attorney, Agent, or Firm* — Cooper Legal Group LLC

(57) ABSTRACT

In an example from the perspective of a first User Equipment (UE), in response to performing successful listen before talk (LBT), the first UE determines a channel occupancy time (COT). The first UE determines whether or not a second sidelink transmission, to be performed by a second UE, is within the COT. The first UE determines information, associated with LBT type and/or cyclic prefix (CP) extension, for inclusion in a first sidelink transmission in the COT, wherein whether the information includes first information associated with LBT type and/or CP extension or the information includes second information associated with LBT type and/or CP extension is based on the determination of whether or not the second sidelink transmission is within the COT. The UE transmits, to the second UE, the first sidelink transmission in the COT. The first sidelink transmission includes the information. The second sidelink transmission is associated with the first sidelink transmission.

21 Claims, 21 Drawing Sheets

(51) Int. Cl.
    *H04L 1/1812*      (2023.01)
    *H04L 27/26*      (2006.01)
    *H04W 74/00*      (2009.01)
    *H04W 74/0816*      (2024.01)
    *H04W 92/18*      (2009.01)

(56) References Cited

U.S. PATENT DOCUMENTS

| | | | |
|---|---|---|---|
| 2021/0092783 A1* | 3/2021 | Sun | H04W 76/15 |
| 2021/0185722 A1 | 6/2021 | Li et al. | |
| 2021/0195637 A1 | 6/2021 | Xue et al. | |
| 2021/0195649 A1 | 6/2021 | Xue et al. | |
| 2022/0353945 A1* | 11/2022 | Liu | H04W 76/28 |
| 2023/0026028 A1* | 1/2023 | Xue | H04L 5/0094 |

FOREIGN PATENT DOCUMENTS

| | | | | |
|---|---|---|---|---|
| CN | 114830552 A | | 7/2022 | |
| WO | WO-2020198499 A1 * | | 10/2020 | H04L 1/1812 |
| WO | 2021080347 A1 | | 4/2021 | |
| WO | 2021149231 A1 | | 7/2021 | |
| WO | 2021066590 A1 | | 8/2021 | |

* cited by examiner

| Entry index | Channel Access/LBT Type | The CP extension Text index (e.g., defined in Clause 5.3.1 of 3GPP TS 38.211 V16.6.0) |
|---|---|---|
| 0 | A | E |
| 1 | B | F |
| 2 | C | G |
| . | . | . |
| . | . | . |
| M | D | H |

| Entry index | Channel Access/LBT Type | The CP extension Text index (e.g., defined in Clause 5.3.1 of 3GPP TS 38.211 V16.6.0) | CAPC | Time offset or starting position of shared COT | Duration or ending position of shared COT | Energy (detection) threshold |
|---|---|---|---|---|---|---|
| 0 | A | D | G | J | N | Q |
| 1 | B | E | H | K | O | R |
| . | . | . | . | . | . | . |
| M | C | F | I | L | P | S |

FIG. 6

| Value of 2nd-stage SCI format field | 2nd-stage SCI format |
|---|---|
| 00 | SCI format 2-A |
| 01 | SCI format 2-B |
| 10 | SCI format 2-C or<br>SCI format 2-A with COT sharing information or<br>SCI format 2-A with information of LBT type and/or CP extension |
| 11 | SCI format 2-D or<br>SCI format 2-B with COT sharing information or<br>SCI format 2-B with information of LBT type and/or CP extension |

FIG. 9

| Value of 2nd-stage SCI format field | 2nd-stage SCI format |
|---|---|
| 000 | SCI format 2-A |
| 001 | SCI format 2-B |
| 010 | SCI format 2-C (SCI format 2-A with information of LBT type and/or CP extension) |
| 011 | SCI format 2-D (SCI format 2-B with information of LBT type and/or CP extension) |
| 100 | SCI format 2-E (SCI format 2-A with COT sharing information) |
| 101 | SCI format 2-F (SCI format 2-B with COT sharing information) |
| 110 | Reserved |
| 111 | Reserved |

FIG. 10

| Value of 2nd-stage SCI format field | 2nd-stage SCI format |
|---|---|
| 00 | SCI format 2-A |
| 01 | SCI format 2-B |
| 10 | SCI format 2-C (SCI format 2-A with COT sharing information and information of LBT type and/or CP extension) |
| 11 | SCI format 2-D (SCI format 2-B with COT sharing information and information of LBT type and/or CP extension) |

1405 — DETERMINE, HAVE, OCCUPY AND/OR INITIATE COT BASED ON PERFORMING SUCCESSFUL LBT, WHEREIN LENGTH OF COT IS MINIMUM LENGTH OF FIRST LENGTH CORRESPONDING TO NUMBER OF CONSECUTIVE SLOTS ASSOCIATED WITH SIDELINK RESOURCE POOL, AND SECOND LENGTH CORRESPONDING TO MAXIMUM TIME ASSOCIATED WITH CAPC

FIG. 14

METHOD AND APPARATUS FOR LISTEN BEFORE TALK FOR SIDELINK TRANSMISSION IN A WIRELESS COMMUNICATION SYSTEM

CROSS-REFERENCE TO RELATED APPLICATIONS

The present application claims the benefit of U.S. Provisional Patent Application Ser. No. 63/233,053 filed on Aug. 13, 2021, the entire disclosure of which is incorporated herein in its entirety by reference.

FIELD

This disclosure generally relates to wireless communication networks, and more particularly, to a method and apparatus for listen before talk for sidelink transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a first User Equipment (UE), in response to performing successful listen before talk (LBT), the first UE determines a channel occupancy time (COT). The first UE determines whether or not a second sidelink transmission, to be performed by a second UE, is within the COT. The first UE determines a set of information, associated with LBT type and/or cyclic prefix (CP) extension, for inclusion in a first sidelink transmission in the COT, wherein whether the set of information comprises a first set of information associated with LBT type and/or CP extension or the set of information comprises a second set of information associated with LBT type and/or CP extension is based on the determination of whether or not the second sidelink transmission is within the COT. The UE transmits, to the second UE, the first sidelink transmission in the COT. The first sidelink transmission comprises the set of information. The second sidelink transmission is associated with the first sidelink transmission and is performed by the second UE after the first sidelink transmission.

In an example from the perspective of a second UE, the second UE receives a first sidelink transmission from a first UE, wherein the first sidelink transmission comprises COT sharing information. Based on the COT sharing information, the second UE determines whether or not a second sidelink transmission, to be performed by the second UE, is within a COT initiated by the first UE.

In an example from the perspective of a first UE, in response to performing successful LBT, the first UE determines a COT. The first UE transmits, to a second UE, a first sidelink transmission in the COT. The first sidelink transmission comprises COT sharing information. Whether the first sidelink transmission comprises a set of information associated with LBT type and/or CP extension and/or comprises one or more fields indicative of the set of information is based on whether Sidelink Hybrid Automatic Repeat Request (SL HARQ) feedback is enabled or is disabled for the first sidelink transmission, where: (A) if SL HARQ feedback is enabled for the first sidelink transmission, the first sidelink transmission comprises the set of information associated with LBT type and/or CP extension and/or comprises one or more fields indicative of the set of information; or (B) if SL HARQ is disabled for the first sidelink transmission, the first sidelink transmission does not comprise the set of information and/or does not comprise the one or more fields.

BRIEF DESCRIPTION OF THE DRAWINGS

FIG. 5 is a table associated with Listen Before Talk (LBT) type/Cyclic Prefix (CP) extension information according to one exemplary embodiment.

FIG. 6 is a table associated with LBT type/CP extension information according to one exemplary embodiment.

FIG. 9 is a table associated with Sidelink Control Information (SCI) according to one exemplary embodiment.

FIG. 10 is a table associated with SCI according to one exemplary embodiment.

FIG. 11 is a table associated with SCI according to one exemplary embodiment.

FIG. 14 is a flow chart according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.321 V16.5.0 (2021 June) 3rd Generation Partnership Project, Technical Specification Group Radio Access Network, NR, Medium Access Control (MAC) protocol specification (Release 16); 3GPP TS 38.211 V16.6.0 (2021 June) 3rd Generation Partnership Project, Technical Specification Group Radio Access Network, NR, Physical channels and modulation (Release 16); 3GPP TS 38.212 V16.6.0 (2021 June) 3rd Generation Partnership Project, Technical Specification Group Radio Access Network, NR, Multiplexing and channel coding (Release 16); 3GPP TS 38.213 V16.6.0 (2021 June) 3rd Generation Partnership Project, Technical Specification Group Radio Access Network, NR, Physical layer procedures for control (Release 16); 3GPP TS 38.214 V16.6.0 (2021 June) 3rd Generation Partnership Project, Technical Specification Group Radio Access Network, NR, Physical layer procedures for data (Release 16); 3GPP TS 37.213 V16.6.0 (2021 June) 3rd Generation Partnership Project, Technical Specification Group Radio Access Network, Physical layer procedures for shared spectrum channel access (Release 16); 5G New Radio Unlicensed: Challenges and Evaluation, Mohammed Hirzallah, Marwan Krunz, Balkan Kecicioglu and Belal Hamzeh (https://arxiv.org/pdf/2012.10937.pdf); 3GPP TR 22.886 V16.2.0 (2018 December) 3rd Generation Partnership Project, Technical Specification Group Services and System Aspects, Study on enhancement of 3GPP Support for 5G V2X Services (Release 16). The standards and documents listed above are hereby expressly incorporated by reference in their entirety.

Figure 1:
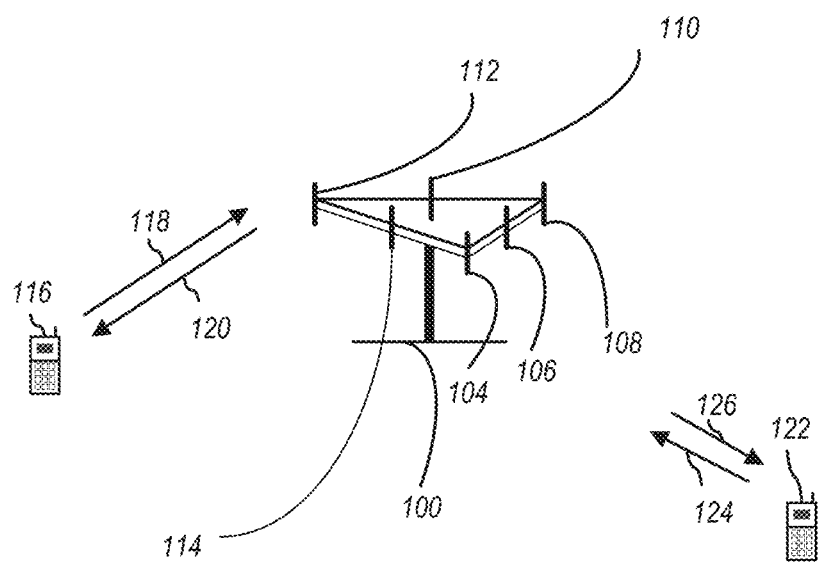
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
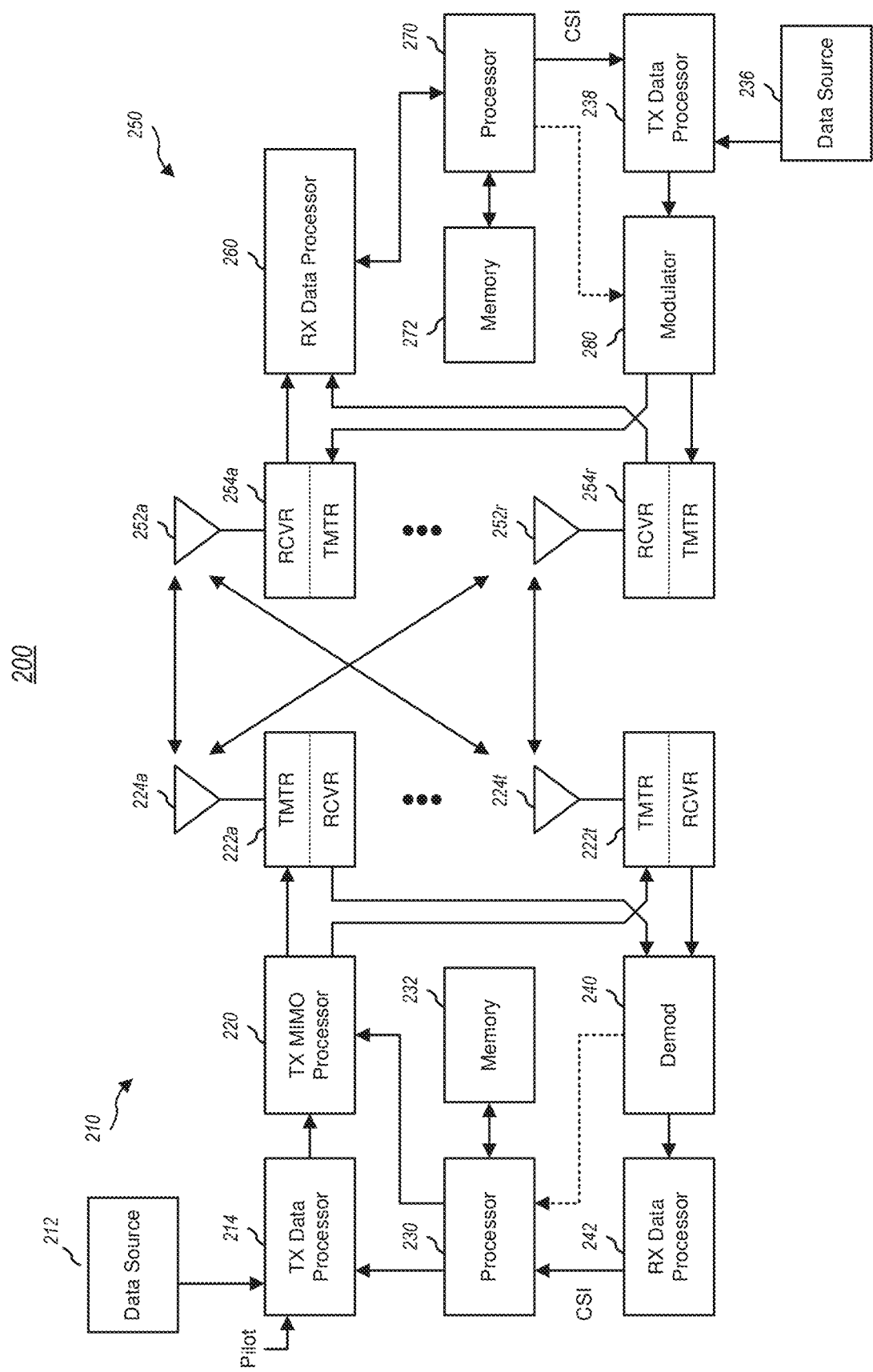
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
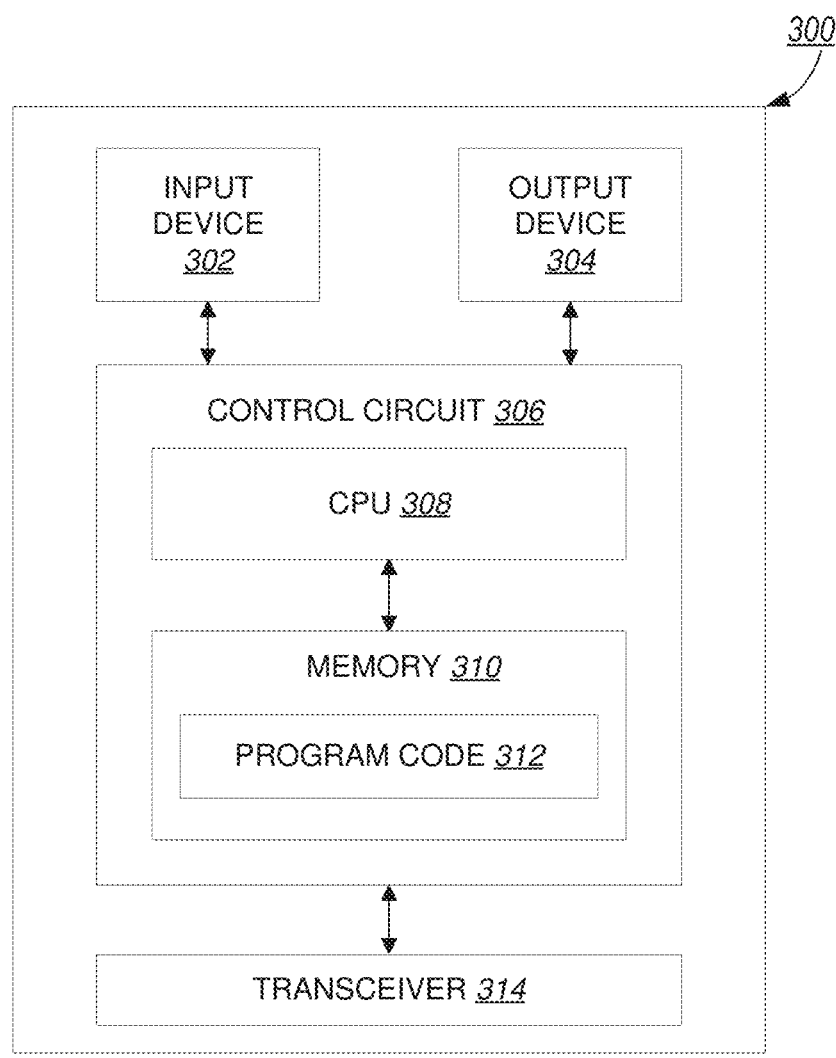
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
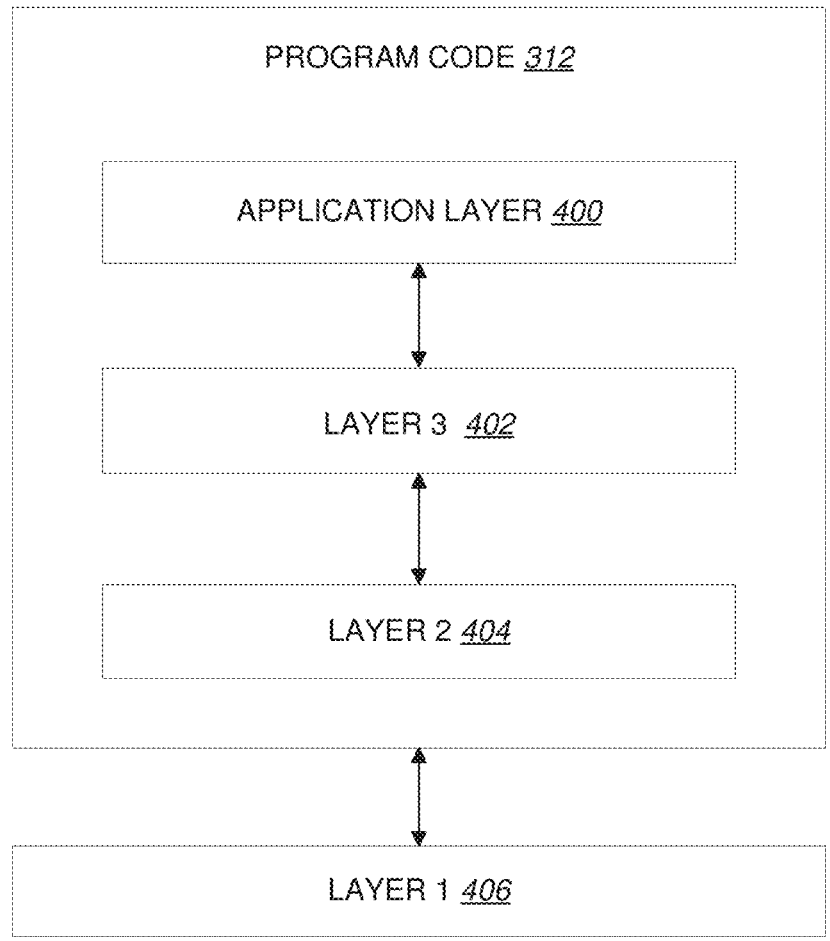
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

In 3GPP TS 38.321 V16.5.0 (e.g., Rel-16), NR Sidelink (SL) data reception and/or transmission are discussed below in one or more parts quoted below:

5.22 SL-SCH Data Transfer
5.22.1 SL-SCH Data Transmission
5.22.1.1 SL Grant Reception and SCI Transmission Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant.

If the MAC entity has been configured with Sidelink resource allocation mode 1 as indicated in TS 38.331 [5], the MAC entity shall for each PDCCH occasion and for each grant received for this PDCCH occasion:

1> if a sidelink grant has been received on the PDCCH for the MAC entity's SL-RNTI:
  2> if the NDI received on the PDCCH has not been toggled compared to the value in the previously received HARQ information for the HARQ Process ID:
    3> use the received sidelink grant to determine PSCCH duration(s) and PSSCH duration(s) for one or more retransmissions of a single MAC PDU for the corresponding Sidelink process according to clause 8.1.2 of TS 38.214 [7].
  2> else:
    3> use the received sidelink grant to determine PSCCH duration(s) and PSSCH duration(s) for initial transmission and, if available, retransmission(s) of a single MAC PDU according to clause 8.1.2 of TS 38.214 [7].
  2> if a sidelink grant is available for retransmission(s) of a MAC PDU which has been positively acknowledged as specified in clause 5.22.1.3.1a:
    3> clear the PSCCH duration(s) and PSSCH duration(s) corresponding to retransmission(s) of the MAC PDU from the sidelink grant.
1> else if a sidelink grant has been received on the PDCCH for the MAC entity's SLCS-RNTI:
  2> if PDCCH contents indicate retransmission(s) for the identifed HARQ process ID that has been set for an activated configured sidelink grant identified by sl-ConfigIndexCG:
    3> use the received sidelink grant to determine PSCCH duration(s) and PSSCH duration(s) for one or more retransmissions of a single MAC PDU according to clause 8.1.2 of TS 38.214 [7].
  2> else if PDCCH contents indicate configured grant Type 2 deactivation for a configured sidelink grant:
    3> trigger configured sidelink grant confirmation for the configured sidelink grant.

2> else if PDCCH contents indicate configured grant Type 2 activation for a configured sidelink grant:
  3> trigger configured sidelink grant confirmation for the configured sidelink grant;
  3> store the configured sidelink grant;
  3> initialise or re-initialise the configured sidelink grant to determine the set of PSCCH durations and the set of PSSCH durations for transmissions of multiple MAC PDUs according to clause 8.1.2 of TS 38.214 [7].

If the MAC entity has been configured with Sidelink resource allocation mode 2 to transmit using pool(s) of resources in a carrier as indicated in TS 38.331 [5] or TS 36.331 [21] based on sensing or random selection, the MAC entity shall for each Sidelink process:

NOTE 1: If the MAC entity is configured with Sidelink resource allocation mode 2 to transmit using a pool of resources in a carrier as indicated in TS 38.331 [5] or TS 36.331 [21], the MAC entity can create a selected sidelink grant on the pool of resources based on random selection or sensing only after releasing configured sidelink grant(s), if any.
  NOTE 2: The MAC entity expects that PSFCH is always configured by RRC for at least one pool of resources in case that at least a logical channel configured with sl-HARQ-FeedbackEnabled is set to enabled.
1> if the MAC entity has selected to create a selected sidelink grant corresponding to transmissions of multiple MAC PDUs, and SL data is available in a logical channel:
  2> if the MAC entity has not selected a pool of resources allowed for the logical channel:
    3> if sl-HARQ-FeedbackEnabled is set to enabled for the logical channel:
      4> select any pool of resources configured with PSFCH resources among the pools of resources;
    3> else:
      4> select any pool of resources among the pools of resources;
  2> perform the TX resource (re-)selection check on the selected pool of resources as specified in clause 5.22.1.2;
  NOTE 3: The MAC entity continuously performs the TX resource (re-)selection check until the corresponding pool of resources is released by RRC or the MAC entity decides to cancel creating a selected sidelink grant corresponding to transmissions of multiple MAC PDUs.
  2> if the TX resource (re-)selection is triggered as the result of the TX resource (re-)selection check:
    3> select one of the allowed values configured by RRC in sl-ResourceReservePeriodList and set the resource reservation interval, $P_{rsvp\_TX}$, with the selected value;
  NOTE 3A: The MAC entity selects a value for the resource reservation interval which is larger than the remaining PDB of SL data available in the logical channel.
    3> randomly select, with equal probability, an integer value in the interval [5, 15] for the resource reservation interval higher than or equal to 100 ms or in the interval $$\left[ 5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_COUNTER to the selected value;
    3> select the number of HARQ retransmissions from the allowed numbers that are configured by RRC in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
    3> select an amount of frequency resources within the range that is configured by RRC between sl-MinSubChannelNumPSSCH and sl-MaxSubchannelNumPSSCH included in sl-PSSCH-TxConfigList and, if configured by RRC, overlapped between MinSubChannelNumPSSCH and MaxSubchannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
    3> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier.
    3> use the randomly selected resource to select a set of periodic resources spaced by the resource reservation interval for transmissions of PSCCH and PSSCH corresponding to the number of transmission opportunities of MAC PDUs determined in TS 38.214 [7];
    3> if one or more HARQ retransmissions are selected:
      4> if there are available resources left in the resources indicated by the physical layer according to clause 8.1.4 of TS 38.214 [7] for more transmission opportunities:
        5> randomly select the time and frequency resources for one or more transmission opportunities from the available resources, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9];
        5> use the randomly selected resource to select a set of periodic resources spaced by the resource reservation interval for transmissions of PSCCH and PSSCH corresponding to the number of retransmission opportunities of the MAC PDUs determined in TS 38.214 [7];
5> consider the first set of transmission opportunities as the initial transmission opportunities and the other set(s) of transmission opportunities as the retransmission opportunities;
5> consider the sets of initial transmission opportunities and retransmission opportunities as the selected sidelink grant.
3> else:
4> consider the set as the selected sidelink grant.
3> use the selected sidelink grant to determine the set of PSCCH durations and the set of PSSCH durations according to TS 38.214 [7].
2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by RRC in sl-ProbResourceKeep:
3> clear the selected sidelink grant, if available;
3> randomly select, with equal probability, an integer value in the interval [5, 15] for the resource reservation interval higher than or equal to 100 ms or in the interval $$\left[5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_COUNTER to the selected value;
3> reuse the previously selected sidelink grant for the number of transmissions of the MAC PDUs determined in TS 38.214 [7] with the resource reservation interval to determine the set of PSCCH durations and the set of PSSCH durations according to TS 38.214 [7].
1> if the MAC entity has selected to create a selected sidelink grant corresponding to transmission(s) of a single MAC PDU, and if SL data is available in a logical channel, or a SL-CSI reporting is triggered:
2> if SL data is available in the logical channel:
3> if sl-HARQ-FeedbackEnabled is set to enabled for the logical channel:
4> select any pool of resources configured with PSFCH resources among the pools of resources;
3> else:
4> select any pool of resources among the pools of resources;
2> else if a SL-CSI reporting is triggered:
3> select any pool of resources among the pools of resources.
2> perform the TX resource (re-)selection check on the selected pool of resources as specified in clause 5.22.1.2;
2> if the TX resource (re-)selection is triggered as the result of the TX resource (re-)selection check:
3> select the number of HARQ retransmissions from the allowed numbers that are configured by RRC in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
3> select an amount of frequency resources within the range that is configured by RRC between sl-MinSubChannelNumPSSCH and sl-MaxSubChannelNumPSSCH included in sl-PSSCH-TxConfigList and, if configured by RRC, overlapped between sl-MinSubChannelNumPSSCH and sl-MaxSubChannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
3> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier, and/or the latency requirement of the triggered SL-CSI reporting;
3> if one or more HARQ retransmissions are selected:
4> if there are available resources left in the resources indicated by the physical layer according to clause 8.1.4 of TS 38.214 [7] for more transmission opportunities:
5> randomly select the time and frequency resources for one or more transmission opportunities from the available resources, according to the amount of selected frequency resources, the selected number of HARQ retransmissions and the remaining PDB of SL data available in the logical channel(s) allowed on the carrier, and/or the latency requirement of the triggered SL-CSI by ensuring the minimum time gap between any two selected resources in case that PSFCH is configured for this pool of resources, and that a retransmission resource can be indicated by the time resource assignment of a prior SCI according to clause 8.3.1.1 of TS 38.212 [9];
5> consider a transmission opportunity which comes first in time as the initial transmission opportunity and other transmission opportunities as the retransmission opportunities;
5> consider all the transmission opportunities as the selected sidelink grant;
3> else:
4> consider the set as the selected sidelink grant;
3> use the selected sidelink grant to determine PSCCH duration(s) and PSSCH duration(s) according to TS 38.214 [7].
NOTE 3B: If retransmission resource(s) cannot be selected by ensuring that the resource(s) can be indicated by the time resource assignment of a prior SCI, how to select the time and frequency resources for one or more transmission opportunities from the available resources is left for UE implementation by ensuring the minimum time gap between any two selected resources in case that PSFCH is configured for this pool of resources.

1> if a selected sidelink grant is available for retransmission(s) of a MAC PDU which has been positively acknowledged as specified in clause 5.22.1.3.3:
  2> clear the PSCCH duration(s) and PSSCH duration(s) corresponding to retransmission(s) of the MAC PDU from the selected sidelink grant.

NOTE 3C: How the MAC entity determines the remaining PDB of SL data is left to UE implementation.

For a selected sidelink grant, the minimum time gap between any two selected resources comprises:
  a time gap between the end of the last symbol of a PSSCH transmission of the first resource and the start of the first symbol of the corresponding PSFCH reception determined by sl-MinTimeGapPSFCH and sl-PSFCH-Period for the pool of resources; and
  a time required for PSFCH reception and processing plus sidelink retransmission preparation including multiplexing of necessary physical channels and any TX-RX/RX-TX switching time.

NOTE: How to determine the time required for PSFCH reception and processing plus sidelink retransmission preparation is left to UE implementation.

The MAC entity shall for each PSSCH duration:
1> for each sidelink grant occurring in this PSSCH duration:
. . .
  2> if the MAC entity has been configured with Sidelink resource allocation mode 1:
  . . .
    3> set the resource reservation interval to 0ms.
  2> else:
  . . .
    3> if the MAC entity decides not to use the selected sidelink grant for the next PSSCH duration:
      4> set the resource reservation interval to 0ms.
    3> else:
      4> set the resource reservation interval to the selected value.
  2> if the configured sidelink grant has been activated and this PSSCH duration corresponds to the first PSSCH transmission opportunity within this sl-PeriodCG of the configured sidelink grant:
    3> set the HARQ Process ID to the HARQ Process ID associated with this PSSCH duration and, if available, all subsequent PSSCH duration(s) occuring in this sl-PeriodCG for the configured sidelink grant;
    3> determine that this PSSCH duration is used for initial transmission;
    3> flush the HARQ buffer of Sidelink process associated with the HARQ Process ID.
  2> deliver the sidelink grant, the selected MCS, and the associated HARQ information to the Sidelink HARQ Entity for this PSSCH duration.

For configured sidelink grants, the HARQ Process ID associated with the first slot of a SL transmission is derived from the following equation:

HARQ Process ID=[floor(CURRENT_slot/PeriodicitySL)]modulo sl-NrOfHARQ-Processes+sl-HARQ-ProcID-offset where CURRENT_slot refers to current logical slot in the associated resource pool, and PeriodicitySL is defined in clause 5.8.3.

[ . . . ]

5.22.1.3 Sidelink HARQ Operation 5.22.1.3.1 Sidelink HARQ Entity

The MAC entity includes at most one Sidelink HARQ entity for transmission on SL-SCH, which maintains a number of parallel Sidelink processes.

The maximum number of transmitting Sidelink processes associated with the Sidelink HARQ Entity is 16. A sidelink process may be configured for transmissions of multiple MAC PDUs. For transmissions of multiple MAC PDUs with Sidelink resource allocation mode 2, the maximum number of transmitting Sidelink processes associated with the Sidelink HARQ Entity is 4.

A delivered sidelink grant and its associated Sidelink transmission information are associated with a Sidelink process. Each Sidelink process supports one TB.

For each sidelink grant, the Sidelink HARQ Entity shall:
1> if the MAC entity determines that the sidelink grant is used for initial transmission as specified in clause 5.22.1.1; or
1> if the sidelink grant is a configured sidelink grant and no MAC PDU has been obtained in a sl-PeriodCG of the configured sidelink grant:
NOTE 1: Void.
  2> (re-)associate a Sidelink process to this grant, and for the associated Sidelink process:
  NOTE 1A: The Sidelink HARQ Entity will associate the selected sidelink grant to the Sidelink process determined by the MAC entity.
    3> obtain the MAC PDU to transmit from the Multiplexing and assembly entity, if any;
    3> if a MAC PDU to transmit has been obtained:
      4> if a HARQ Process ID has been set for the sidelink grant:
        5> (re-)associate the HARQ Process ID corresponding to the sidelink grant to the Sidelink process;
      NOTE 1a: There is one-to-one mapping between a HARQ Process ID and a Sidelink process in the MAC entity configured with Sidelink resource allocation mode 1.
      4> determines Sidelink transmission information of the TB for the source and destination pair of the MAC PDU as follows:
        5> set the Source Layer-1 ID to the 8 LSB of the Source Layer-2 ID of the MAC PDU;
        5> set the Destination Layer-1 ID to the 16 LSB of the Destination Layer-2 ID of the MAC PDU;
        5> (re-)associate the Sidelink process to a Sidelink process ID;
        5> consider the NDI to have been toggled compared to the value of the previous transmission corresponding to the Sidelink identification information and the Sidelink process ID of the MAC PDU and set the NDI to the toggled value;
        5> set the cast type indicator to one of broadcast, groupcast and unicast as indicated by upper layers;
        5> if HARQ feedback has been enabled for the MAC PDU according to clause 5.22.1.4.2;
          6> set the HARQ feedback enabled/disabled indicator to enabled.

5> else:
　　　6> set the HARQ feedback enabled/disabled indicator to disabled.
　　5> set the priority to the value of the highest priority of the logical channel(s), if any, and a MAC CE, if included, in the MAC PDU;
　　5> if HARQ feedback is enabled for groupcast:
　　　6> if both a group size and a member ID are provided by upper layers and the group size is not greater than the number of candidate PSFCH resources associated with this sidelink grant:
　　　　7> select either positive-negative acknowledgement or negative-only acknowledgement.
　　　6> else:
　　　　7> select negative-only acknowledgement.
　　　6> if negative-only acknowledgement is selected, UE's location information is available, and sl-TransRange has been configured for a logical channel in the MAC PDU, and sl-ZoneConfig is configured as specified in TS 38.331 [5]:
　　　　7> set the communication range requirement to the value of the longest communication range of the logical channel(s) in the MAC PDU;
　　　　7> determine the value of sl-ZoneLength corresponding to the communication range requirement and set Zone_id to the value of Zone_id calculated using the determined value of sl-ZoneLength as specified in TS 38.331 [5].
　　4> deliver the MAC PDU, the sidelink grant and the Sidelink transmission information of the TB to the associated Sidelink process;
　　4> instruct the associated Sidelink process to trigger a new transmission.
　3> else:
　　4> flush the HARQ buffer of the associated Sidelink process.
1> else (i.e. retransmission):
　2> if the HARQ Process ID corresponding to the sidelink grant received on PDCCH, the configured sidelink grant or the selected sidelink grant is associated to a Sidelink process of which HARQ buffer is empty; or
　2> if the HARQ Process ID corresponding to the sidelink grant received on PDCCH is not associated to any Sidelink process:
　　3> ignore the sidelink grant.
　2> else:
　　3> identify the Sidelink process associated with this grant, and for the associated Sidelink process:
　　　4> deliver the sidelink grant of the MAC PDU to the associated Sidelink process;
　　　4> instruct the associated Sidelink process to trigger a retransmission.

5.22.1.3.1a Sidelink Process

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 [7] and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

If the Sidelink HARQ Entity requests a new transmission, the Sidelink process shall:
　1> store the MAC PDU in the associated HARQ buffer;
　1> store the sidelink grant received from the Sidelink HARQ Entity;
　1> generate a transmission as described below.

If the Sidelink HARQ Entity requests a retransmission, the Sidelink process shall:
　1> store the sidelink grant received from the Sidelink HARQ Entity;
　1> generate a transmission as described below.

To generate a transmission, the Sidelink process shall:
　1> if there is no uplink transmission; or
　1> if the MAC entity is able to simultaneously perform uplink transmission(s) and sidelink transmission at the time of the transmission; or
　1> if the other MAC entity and the MAC entity are able to simultaneously perform uplink transmission(s) and sidelink transmission at the time of the transmission respectively; or
　1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:
　　2> instruct the physical layer to transmit SCI according to the stored sidelink grant with the associated Sidelink transmission information;
　　2> instruct the physical layer to generate a transmission according to the stored sidelink grant;
　　2> if HARQ feedback has been enabled the MAC PDU according to clause 5.22.1.4.2:
　　　3> instruct the physical layer to monitor PSFCH for the transmission and perform PSFCH reception as specified in clause 5.22.1.3.2.
　　2> if sl-PUCCH-Config is configured by RRC for the stored sidelink grant:
　　　3> determine transmission of an acknowledgement on the PUCCH as specified in clause 5.22.1.3.2.
　1> if this transmission corresponds to the last transmission of the MAC PDU:
　　2> decrement SL_RESOURCE_RESELECTION_COUNTER by 1, if available.

NOTE 1: If the number of HARQ retransmissions selected by the MAC entity has been reached, or if a positive acknowledgement to a transmission of the MAC PDU has been received, or if a negative-only acknowledgement was enabled in the SCI and no negative acknowledgement was received for the transmission of the MAC PDU, the MAC entity determines this transmission corresponds to the last transmission of the MAC PDU for Sidelink resource allocation mode 2. How to determine the last transmission in other cases is up to UE implementation.

1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or
　1> if a positive acknowledgement to this transmission of the MAC PDU was received according to clause 5.22.1.3.2; or
　1> if negative-only acknowledgement was enabled in the SCI and no negative acknowledgement was received for this transmission of the MAC PDU according to clause 5.22.1.3.2:

2> flush the HARQ buffer of the associated Sidelink process.

The transmission of the MAC PDU is prioritized over uplink transmissions of the MAC entity or the other MAC entity if the following conditions are met:
  1> if the MAC entity is not able to perform this sidelink transmission simultaneously with all uplink transmissions at the time of the transmission, and
  1> if uplink transmission is neither prioritized as specified in clause 5.4.2.2 nor prioritized by upper layer according to TS 23.287 [19]; and
  1> if sl-PrioritizationThres is configured and if the value of the highest priority of logical channel(s) or a MAC CE in the MAC PDU is lower than sl-PrioritizationThres.
  NOTE 2: If the MAC entity is not able to perform this sidelink transmission simultaneously with all uplink transmissions as specified in clause 5.4.2.2 of TS 36.321 [22] at the time of the transmission, and prioritization-related information is not available prior to the time of this sidelink transmission due to processing time restriction, it is up to UE implementation whether this sidelink transmission is performed.

5.22.1.3.2 PSFCH Reception

The MAC entity shall for each PSSCH transmission:
  1> if an acknowledgement corresponding to the PSSCH transmission in clause 5.22.1.3.1a is obtained from the physical layer:
    2> deliver the acknowledgement to the corresponding Sidelink HARQ entity for the Sidelink process;
  1> else:
    2> deliver a negative acknowledgement to the corresponding Sidelink HARQ entity for the Sidelink process;
  1> if the PSSCH transmission occurs for a pair of Source Layer-2 ID and Destination Layer-2 ID corresponding to a PC5-RRC connection which has been established by upper layers:
    2> perform the HARQ-Based Sidelink RLF Detection procedure as specified in clause 5.22.1.3.3.

If sl-PUCCH-Config is configured by RRC, the MAC entity shall for a PUCCH transmission occasion:
  1> if the timeAlignmentTimer, associated with the TAG containing the Serving Cell on which the HARQ feedback is to be transmitted, is stopped or expired:
    2> not instruct the physical layer to generate acknowledgement(s) of the data in this TB.
  1> else if a MAC PDU has been obtained for a sidelink grant associated to the PUCCH transmission occasion in clause 5.22.1.3.1, the MAC entity shall:
    2> if the most recent transmission of the MAC PDU was not prioritized as specified in clause 5.22.1.3.1a:
      3> instruct the physical layer to signal a negative acknowledgement on the PUCCH according to clause 16.5 of TS 38.213 [6].
    2> else if HARQ feedback has been disabled for the MAC PDU and next retransmission(s) of the MAC PDU is not required:
      3> instruct the physical layer to signal a positive acknowledgement corresponding to the transmission on the PUCCH according to clause 16.5 of TS 38.213 [6].
    2> else if HARQ feedback has been disabled for the MAC PDU and no sidelink grant is available for next retransmission(s) of the MAC PDU, if any:
      3> instruct the physical layer to signal a negative acknowledgement corresponding to the transmission on the PUCCH according to clause 16.5 of TS 38.213 [6].
    2> else:
      3> instruct the physical layer to signal an acknowledgement corresponding to the transmission on the PUCCH according to clause 16.5 of TS 38.213 [6]
  1> else:
    2> instruct the physical layer to signal a positive acknowledgement on the PUCCH according to clause 16.5 of TS 38.213 [6].

5.22.2 SL-SCH Data Reception 5.22.2.1 SCI Reception

SCI indicate if there is a transmission on SL-SCH and provide the relevant HARQ information. A SCI consists of two parts: the $1^{st}$ stage SCI on PSCCH and the $2^{nd}$ stage SCI on PSSCH as specified in clause 8.1 of TS 38.214 [7].

The MAC entity shall:
  1> for each PSCCH duration during which the MAC entity monitors PSCCH:
    2> if a $1^{st}$ stage SCI has been received on the PSCCH:
      3> determine the set of PSSCH durations in which reception of a $2^{nd}$ stage SCI and the transport block occur using the received part of the SCI;
      3> if the $2^{nd}$ stage SCI for this PSSCH duration has been received on the PSSCH:
        4> store the SCI as a valid SCI for the PSSCH durations corresponding to transmission(s) of the transport block and the associated HARQ information and QoS information;
  1> for each PSSCH duration for which the MAC entity has a valid SCI:
    2> deliver the SCI and the associated Sidelink transmission information to the Sidelink HARQ Entity.

5.22.2.2 Sidelink HARQ Operation 5.22.2.2.1 Sidelink HARQ Entity

There is at most one Sidelink HARQ Entity at the MAC entity for reception of the SL-SCH, which maintains a number of parallel Sidelink processes.

Each Sidelink process is associated with SCI in which the MAC entity is interested. This interest is determined by the Sidelink identification information of the SCI. The Sidelink HARQ Entity directs Sidelink transmission information and associated TBs received on the SL-SCH to the corresponding Sidelink processes.

The number of Receiving Sidelink processes associated with the Sidelink HARQ Entity is defined in TS 38.306 [5].

For each PSSCH duration, the Sidelink HARQ Entity shall:
  1> for each SCI valid for this PSSCH duration:
    2> if the NDI has been toggled compared to the value of the previous received transmission corresponding to the Sidelink identification information and the Sidelink process ID of the SCI or this is the very first received transmission for the pair of the Sidelink identification information and the Sidelink process ID of the SCI:
      3> if there is a Sidelink process associated with the Sidelink identification information and the Sidelink process ID of the SCI:
        4> consider the Sidelink process as unoccupied;
        4> flush the soft buffer for the Sidelink process.

3> allocate the TB received from the physical layer and the associated Sidelink identification information and Sidelink process ID to an unoccupied Sidelink process;
3> associate the Sidelink process with the Sidelink identification information and the Sidelink process ID of this SCI and consider this transmission to be a new transmission.
1> for each Sidelink process:
2> if the NDI has not been toggled compared to the value of the previous received transmission corresponding to the Sidelink identification information and the Sidelink process ID of the SCI for the Sidelink process according to its associated SCI:
3> allocate the TB received from the physical layer to the Sidelink process and consider this transmission to be a retransmission.

NOTE 2: A single sidelink process can only be (re-)associated to a single combination of Sidelink identification information and Sidelink process ID at a time and a single combination of Sidelink identification information and Sidelink process ID can only be (re-)associated to a single sidelink process at a time.

5.22.2.2.2 Sidelink Process

For each PSSCH duration where a transmission takes place for the Sidelink process, one TB and the associated HARQ information is received from the Sidelink HARQ Entity.

For each received TB and associated Sidelink transmission information, the Sidelink process shall:
1> if this is a new transmission:
2> attempt to decode the received data.
1> else if this is a retransmission:
2> if the data for this TB has not yet been successfully decoded:
3> instruct the physical layer to combine the received data with the data currently in the soft buffer for this TB and attempt to decode the combined data.
1> if the data which the MAC entity attempted to decode was successfully decoded for this TB; or
1> if the data for this TB was successfully decoded before:
2> if this is the first successful decoding of the data for this TB:
3> if this TB is associated to unicast, the DST field of the decoded MAC PDU subheader is equal to the 8 MSB of any of the Source Layer-2 ID(s) of the UE for which the 16 LSB are equal to the Destination ID in the corresponding SCI, and the SRC field of the decoded MAC PDU subheader is equal to the 16 MSB of any of the Destination Layer-2 ID(s) of the UE for which the 8 LSB are equal to the Source ID in the corresponding SCI; or
3> if this TB is associated to groupcast or broadcast and the DST field of the decoded MAC PDU subheader is equal to the 8 MSB of any of the Destination Layer-2 ID(s) of the UE for which the 16 LSB are equal to the Destination ID in the corresponding SCI:
4> deliver the decoded MAC PDU to the disassembly and demultiplexing entity;
2> consider the Sidelink process as unoccupied.
1> else:
2> instruct the physical layer to replace the data in the soft buffer for this TB with the data which the MAC entity attempted to decode.
1> if HARQ feedback is enabled by the SCI:
. . .
2> if negative-positive acknowledgement or unicast is indicated by the SCI according to clause 8.4.1 of TS 38.212 [9]:
3> if the data which the MAC entity attempted to decode was successfully decoded for this TB or the data for this TB was successfully decoded before:
4> instruct the physical layer to generate a positive acknowledgement of the data in this TB.
3> else:
4> instruct the physical layer to generate a negative acknowledgement of the data in this TB.

In 3GPP TS 38.211 V16.6.0, Cyclic Prefix (CP) extension for channel access procedure for orthogonal frequency-division multiplexing (OFDM) symbol base band signal generation is discussed in one or more parts quoted below:

5.3 OFDM Baseband Signal Generation 5.3.1 OFDM Baseband Signal Generation for all Channels Except PRACH and RIM-RS The time-continuous signal $s_l^{(p,\mu)}(t)$ on antenna port p and subcarrier spacing configuration $\mu$ for OFDM symbol $l \in \{0, 1, \ldots, N_{slot}^{subframe,\mu} N_{symb}^{slot} - 1\}$ in a subframe for any physical channel or signal except PRACH is defined by $$s_l^{(p,\mu)}(t) = \begin{cases} \bar{s}_l^{(p,\mu)}(t) & t_{start,l}^\mu \le t < t_{start,l}^\mu + T_{symb,l}^\mu \\ 0 & \text{otherwise} \end{cases}$$

$$\bar{s}_l^{(p,\mu)}(t) = \sum_{k=0}^{N_{grid,x}^{start,\mu} N_{sc}^{RB}-1} a_{k,l}^{(p,\mu)} e^{j2\pi \left(k+k_0^\mu - N_{grid,x}^{size,\mu} N_{sc}^{RB}/2\right) \Delta f \left(t - N_{CP,l}^\mu T_c - t_{start,l}^\mu\right)}$$

$$k_0^\mu = \left(N_{grid,x}^{start,\mu} + N_{grid,x}^{size,\mu}/2\right)N_{sc}^{RB} - \left(N_{grid,x}^{start,\mu_0} + N_{grid,x}^{size,\mu_0}/2\right)N_{sc}^{RB} 2^{\mu_0-\mu}$$

$$T_{symb,l}^\mu = \left(N_u^\mu + N_{CP,l}^\mu\right)T_c$$

where t=0 at the start of the subframe, $$N_u^\mu = 2048\kappa \cdot 2^{-\mu}$$

$$N_{CP,l}^\mu = \begin{cases} 512\kappa \cdot 2^{-\mu} & \text{extended cyclic prefix} \\ 144\kappa \cdot 2^{-\mu} + 16\kappa & \text{normal cyclic prefix, } l = 0 \text{ or } l = 7 \cdot 2^\mu \\ 144\kappa \cdot 2^{-\mu} & \text{normal cyclic prefix, } l \ne 0 \text{ and } l \ne 7 \cdot 2^\mu \end{cases}$$

and
$\Delta f$ is given by clause 4.2;
$\mu$ is the subcarrier spacing configuration;
$\mu_0$ is the largest $\mu$ value among the subcarrier spacing configurations by scs-SpecificCarrierList for each of uplink and downlink and by sl-SCS-SpecificCarrierList for sidelink In case of cyclic prefix extension of the first OFDM symbol l allocated for PUSCH, SRS, or PUCCH transmission, the time-continuous signal $s_{ext}^{(p,\mu)}(t)$ for the interval $t_{start,l}^\mu - T_{ext} \le t < t_{start,l}^\mu$ preceding the first OFDM symbol for PUSCH, SRS, or PUCCH is given by $$s_{ext}^{(p,\mu)}(t) = \bar{s}_l^{(p,\mu)}(t)$$

where t<0 refers to the signal in the previous subframe and for dynamically scheduled PUSCH, SRS, and PUCCH transmissions $$T_{ext}=\min(\max(T_{ext}',0),T_{symb,(l-1)mod\ 7\cdot 2^\mu})$$

$$T_{ext}'=\Sigma_{k=1}^{C_i}T_{symb,(l-k)mod\ 7\cdot 2^\mu}-\Delta_i$$

where $\Delta_i$ is given by Table 5.3.1-1 with $C_1=1$ for $\mu \in \{0,1\}$, $C_1=2$ for $\mu=2$, and $C_2$ and $C_3$ given by the higher-layer parameters cp-ExtensionC2 and cp-ExtensionC3, respectively, and $T_{TA}$ given by clause 4.3.1.

for a PUSCH transmission using configured grant $$T_{ext}=\Sigma_{k=1}^{2^\mu}T_{symb,(l-k)mod\ 7\cdot 2^\mu}-\Delta_i$$

where $\Delta_i$ is given by Table 5.3.1-2 with the index i given by the procedure in [6, TS 38.214].

The starting position of OFDM symbol 1 for subcarrier spacing configuration μ in a subframe is given by $$t_{start,l}^\mu = \begin{cases} 0 & l=0 \\ t_{start,l-1}^\mu + (N_u^\mu + N_{CP,l-1}^\mu)\cdot T_c & \text{otherwise} \end{cases}$$

TABLE 5.3.1-1

The variables $C_i$ and $\Delta_i$ for cyclic prefix extension

| $T_{ext}$ index i | $C_i$ | $\Delta_i$ |
|---|---|---|
| 0 | — | — |
| 1 | $C_1$ | $25 \cdot 10^{-6}$ |
| 2 | $C_2$ | $16 \cdot 10^{-6} + T_{TA}$ |
| 3 | $C_3$ | $25 \cdot 10^{-6} + T_{TA}$ |

TABLE 5.3.1-2

The variable $\Delta_i$ for cyclic prefix extension with configured grants.

| index i | $\Delta_i$ |
|---|---|
| 0 | $16 \cdot 10^{-6}$ |
| 1 | $25 \cdot 10^{-6}$ |
| 2 | $34 \cdot 10^{-6}$ |
| 3 | $43 \cdot 10^{-6}$ |
| 4 | $52 \cdot 10^{-6}$ |
| 5 | $61 \cdot 10^{-6}$ |
| 6 | $\Sigma_{k=1}^{2^\mu}T_{symb,(l-k)mod\ 7\cdot 2^\mu}$ |

In 3GPP TS 38.212 V16.6.0, Downlink Control Information (DCI) format, Configured Grant Uplink Control Information (CG-UCI), and Sidelink Control Information (SCI) format (in NR, for example) are discussed in one or more parts quoted below:

7.3.1 DCI Formats

The DCI formats defined in table 7.3.1-1 are supported.

TABLE 7.3.1-1

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |

TABLE 7.3.1-1-continued

| DCI format | Usage |
|---|---|
| 1_1 | Scheduling of PDSCH in one cell, and/or triggering one shot HARQ-ACK codebook feedback |
| 1_2 | Scheduling of PDSCH in one cell |
| 3_0 | Scheduling of NR sidelink in one cell |
| 3_1 | Scheduling of LTE sidelink in one cell |

7.3.1.1 DCI Formats for Scheduling of PUSCH 7.3.1.1.1 Format 0_0

DCI format 0_0 is used for the scheduling of PUSCH in one cell.

. . .

ChannelAccess-CPext—2 bits indicating combinations of channel access type and CP extension as defined in Table 7.3.1.1.1-4, or Table 7.3.1.1.1-4A, (if ChannelAccessMode-r16="semistatic" is provided) for operation in a cell with shared spectrum channel access; 0 bit otherwise.

. . .

TABLE 7.3.1.1.1-4

Channel access type & CP extension for DCI format 0_0 and DCI format 1_0 (if ChannelAccessMode-r16 = "dynamic" is provided)

| Bit field mapped to index | Channel Access Type | The CP extension T_"ext" index defined in Clause 5.3.1 of [4, TS 38.211] |
|---|---|---|
| 0 | Type2C-ULChannelAccess defined in [clause 4.2.1.2.3 in 37.213] | 2 |
| 1 | Type2A-ULChannelAccess defined in [clause 4.2.1.2.1 in 37.213] | 3 |
| 2 | Type2A-ULChannelAccess defined in [clause 4.2.1.2.1 in 37.213] | 1 |
| 3 | Type1-ULChannelAccess defined in [clause 4.2.1.1 in 37.213] | 0 |

TABLE 7.3.1.1.1-4A

Channel access type & CP extension if ChannelAccessMode-r16 = "semistatic" is provided

| Bit field mapped to index | Channel Access Type | The CP extension T_"ext" index defined in Clause 5.3.1 of [4, TS 38.211] |
|---|---|---|
| 0 | No sensing as defined in Clause 4.3 in TS 37.213 | 0 |
| 1 | No sensing as defined in Clause 4.3 in TS 37.213 | 2 |
| 2 | 9 us sensing within a 25 us interval as defined in Clause 4.3 in TS 37.213 | 0 |
| 3 | — | — |

7.3.1.1.2 Format 0_1

DCI format 0_1 is used for the scheduling of one or multiple PUSCH in one cell, or indicating CG downlink feedback information (CG-DFI) to a UE.

. . .

ChannelAccess-CPext-CAPC—0, 1, 2, 3, 4, 5 or 6 bits. The bitwidth for this field is determined as $\lceil \log_2(I) \rceil$ bits, where I is the number of entries in the higher layer parameter ul-AccessConfigListDCI-0-1 or in Table 7.3.1.1.1-4A (if ChannelAccessMode-r16="semistatic" is provided) for operation in a cell with shared spectrum channel access; otherwise 0 bit. One or more entries from Table 7.3.1.1.2-35 are configured by the higher layer parameter ul-AccessConfigListDCI-0-1.

. . .

TABLE 7.3.1.1.2-35

Allowed entries for DCI format 0_1, configured by higher layer parameter ul-AccessConfigListDCI-0-1

| Entry index | Channel Access Type | The CP extension T_"ext" index defined in Clause 5.3.1 of [4, 38.211] | CAPC |
| --- | --- | --- | --- |
| 0 | Type2C-ULChannelAccess defined in [clause 4.2.1.2.3 in 37.213] | 0 | 1 |
| 1 | Type2C-ULChannelAccess defined in [clause 4.2.1.2.3 in 37.213] | 0 | 2 |
| 2 | Type2C-ULChannelAccess defined in [clause 4.2.1.2.3 in 37.213] | 0 | 3 |
| 3 | Type2C-ULChannelAccess defined in [clause 4.2.1.2.3 in 37.213] | 0 | 4 |
| 4 | Type2C-ULChannelAccess defined in [clause 4.2.1.2.3 in 37.213] | 2 | 1 |
| 5 | Type2C-ULChannelAccess defined in [clause 4.2.1.2.3 in 37.213] | 2 | 2 |
| 6 | Type2C-ULChannelAccess defined in [clause 4.2.1.2.3 in 37.213] | 2 | 3 |
| 7 | Type2C-ULChannelAccess defined in [clause 4.2.1.2.3 in 37.213] | 2 | 4 |
| 8 | Type2B-ULChannelAccess defined in [clause 4.2.1.2.3 in 37.213] | 0 | 1 |
| 9 | Type2B-ULChannelAccess defined in [clause 4.2.1.2.3 in 37.213] | 0 | 2 |
| 10 | Type2B-ULChannelAccess defined in [clause 4.2.1.2.3 in 37.213] | 0 | 3 |
| 11 | Type2B-ULChannelAccess defined in [clause 4.2.1.2.3 in 37.213] | 0 | 4 |
| 12 | Type2B-ULChannelAccess defined in [clause 4.2.1.2.3 in 37.213] | 2 | 1 |
| 13 | Type2B-ULChannelAccess defined in [clause 4.2.1.2.3 in 37.213] | 2 | 2 |
| 14 | Type2B-ULChannelAccess defined in [clause 4.2.1.2.3 in 37.213] | 2 | 3 |
| 15 | Type2B-ULChannelAccess defined in [clause 4.2.1.2.3 in 37.213] | 2 | 4 |
| 16 | Type2A-ULChannelAccess defined in [clause 4.2.1.2.1 in 37.213] | 0 | 1 |
| 17 | Type2A-ULChannelAccess defined in [clause 4.2.1.2.1 in 37.213] | 0 | 2 |
| 18 | Type2A-ULChannelAccess defined in [clause 4.2.1.2.1 in 37.213] | 0 | 3 |
| 19 | Type2A-ULChannelAccess defined in [clause 4.2.1.2.1 in 37.213] | 0 | 4 |
| 20 | Type2A-ULChannelAccess defined in [clause 4.2.1.2.1 in 37.213] | 1 | 1 |
| 21 | Type2A-ULChannelAccess defined in [clause 4.2.1.2.1 in 37.213] | 1 | 2 |
| 22 | Type2A-ULChannelAccess defined in [clause 4.2.1.2.1 in 37.213] | 1 | 3 |
| 23 | Type2A-ULChannelAccess defined in [clause 4.2.1.2.1 in 37.213] | 1 | 4 |
| 24 | Type2A-ULChannelAccess defined in [clause 4.2.1.2.1 in 37.213] | 3 | 1 |
| 25 | Type2A-ULChannelAccess defined in [clause 4.2.1.2.1 in 37.213] | 3 | 2 |
| 26 | Type2A-ULChannelAccess defined in [clause 4.2.1.2.1 in 37.213] | 3 | 3 |
| 27 | Type2A-ULChannelAccess defined in [clause 4.2.1.2.1 in 37.213] | 3 | 4 |
| 28 | Type1-ULChannelAccess defined in [clause 4.2.1.1 in 37.213] | 0 | 1 |
| 29 | Type1-ULChannelAccess defined in [clause 4.2.1.1 in 37.213] | 0 | 2 |
| 30 | Type1-ULChannelAccess defined in [clause 4.2.1.1 in 37.213] | 0 | 3 |
| 31 | Type1-ULChannelAccess defined in [clause 4.2.1.1 in 37.213] | 0 | 4 |
| 32 | Type1-ULChannelAccess defined in [clause 4.2.1.1 in 37.213] | 1 | 1 |
| 33 | Type1-ULChannelAccess defined in [clause 4.2.1.1 in 37.213] | 1 | 2 |
| 34 | Type1-ULChannelAccess defined in [clause 4.2.1.1 in 37.213] | 1 | 3 |
| 35 | Type1-ULChannelAccess defined in [clause 4.2.1.1 in 37.213] | 1 | 4 |
| 36 | Type1-ULChannelAccess defined in [clause 4.2.1.1 in 37.213] | 2 | 1 |
| 37 | Type1-ULChannelAccess defined in [clause 4.2.1.1 in 37.213] | 2 | 2 |
| 38 | Type1-ULChannelAccess defined in [clause 4.2.1.1 in 37.213] | 2 | 3 |
| 39 | Type1-ULChannelAccess defined in [clause 4.2.1.1 in 37.213] | 2 | 4 |
| 40 | Type1-ULChannelAccess defined in [clause 4.2.1.1 in 37.213] | 3 | 1 |
| 41 | Type1-ULChannelAccess defined in [clause 4.2.1.1 in 37.213] | 3 | 2 |
| 42 | Type1-ULChannelAccess defined in [clause 4.2.1.1 in 37.213] | 3 | 3 |
| 43 | Type1-ULChannelAccess defined in [clause 4.2.1.1 in 37.213] | 3 | 4 |

7.3.1.2 DCI Formats for Scheduling of PDSCH

7.3.1.2.2 Format 1_1

DCI format 1_1 is used for the scheduling of PDSCH in one cell.

. . .

ChannelAccess-CPext—0, 1, 2, 3 or 4 bits. The bitwidth for this field is determined as $\lceil \log_2(I) \rceil$ bits, where I is the number of entries in the higher layer parameter ul-AccessConfigListDCI-1-1 or in Table 7.3.1.1.1-4A (if ChannelAccessMode-r16="semistatic" is provided) for operation in a cell with shared spectrum channel access; otherwise 0 bit. One or more entries from Table 7.3.1.2.2-6 are configured by the higher layer parameter ul-AccessConfigListDCI-1-1.

TABLE 7.3.1.2.2-6

Allowed entries for DCI format 1_1, configured by higher layer parameter ul-AccessConfigListDCI-1-1

| Entry index | Channel Access Type | The CP extension Text index defined in Clause 5.3.1 of [4, TS 38.211] |
| --- | --- | --- |
| 0 | Type2C-ULChannelAccess defined in [clause 4.2.1.2.3 in 37.213] | 0 |
| 1 | Type2C-ULChannelAccess defined in [clause 4.2.1.2.3 in 37.213] | 2 |

TABLE 7.3.1.2.2-6-continued

Allowed entries for DCI format 1_1, configured
by higher layer parameter ul-AccessConfigListDCI-1-1

| Entry index | Channel Access Type | The CP extension Text index defined in Clause 5.3.1 of [4, TS 38.211] |
|---|---|---|
| 2 | Type2B-ULChannelAccess defined in [clause 4.2.1.2.3 in 37.213] | 0 |
| 3 | Type2B-ULChannelAccess defined in [clause 4.2.1.2.3 in 37.213] | 2 |
| 4 | Type2A-ULChannelAccess defined in [clause 4.2.1.2.1 in 37.213] | 0 |
| 5 | Type2A-ULChannelAccess defined in [clause 4.2.1.2.1 in 37.213] | 1 |
| 6 | Type2A-ULChannelAccess defined in [clause 4.2.1.2.1 in 37.213] | 3 |
| 7 | Type1-ULChannelAccess defined in [clause 4.2.1.1 in 37.213] | 0 |
| 8 | Type1-ULChannelAccess defined in [clause 4.2.1.1 in 37.213] | 1 |
| 9 | Type1-ULChannelAccess defined in [clause 4.2.1.1 in 37.213] | 2 |
| 10 | Type1-ULChannelAccess defined in [clause 4.2.1.1 in 37.213] | 3 |

7.3.1.4 DCI Formats for Scheduling of Sidelink
7.3.1.4.1 Format 3_0

DCI format 3_0 is used for scheduling of NR PSCCH and NR PSSCH in one cell.

The following information is transmitted by means of the DCI format 3_0 with CRC scrambled by SL-RNTI or SL-CS-RNTI:

Resource pool index $-\lceil \log_2 I \rceil$ bits, where I is the number of resource pools for transmission configured by the higher layer parameter sl-TxPoolScheduling.

Time gap—3 bits determined by higher layer parameter sl-DCI-ToSL-Trans, as defined in clause 8.1.2.1 of [6, TS 38.214]

HARQ process number—4 bits as defined in clause 16.4 of [5, TS 38.213]

New data indicator—1 bit as defined in clause 16.4 of [5, TS 38.213]

Lowest index of the subchannel allocation to the initial transmission $-\lceil \log_2(N_{subChannel}^{SL}) \rceil$ bits as defined in clause 8.1.2.2 of [6, TS 38.214]

SCI format 1-A fields according to clause 8.3.1.1:
Frequency resource assignment.
Time resource assignment.
PSFCH-to-HARQ feedback timing indicator $-\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213]

PUCCH resource indicator—3 bits as defined in clause 16.5 of [5, TS 38.213].

. . .

8.3.1.1 SCI Format 1-A

SCI format 1-A is used for the scheduling of PSSCH and $2^{nd}$-stage-SCI on PSSCH The following information is transmitted by means of the SCI format 1-A:

Priority—3 bits as specified in clause 5.4.3.3 of [12, TS 23.287] and clause 5.22.1.3.1 of [8, TS 38.321].

Frequency resource assignment $$-\left\lceil \log_2\left(\frac{N_{subChannel}^{SL}(N_{subChannel}^{SL}+1)}{2}\right)\right\rceil$$

bits when the value of the higher layer parameter sl-MaxNumPerReserve is configured to 2; otherwise $$\left\lceil \log_2\left(\frac{N_{subChannel}^{SL}(N_{subChannel}^{SL}+1)(2N_{subChannel}^{SL}+1)}{6}\right)\right\rceil$$

bits when the value of the higher layer parameter sl-MaxNumPerReserve is configured to 3, as defined in clause 8.1.5 of [6, TS 38.214].

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

Resource reservation period $-\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.

. . .

$2^{nd}$-stage SCI format—2 bits as defined in Table 8.3.1.1-1.

. . .

TABLE 8.3.1.1-1

$2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits.

New data indicator—1 bit.

Redundancy version—2 bits as defined in Table 7.3.1.1.1-2.

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Cast type indicator—2 bits as defined in Table 8.4.1.1-1 and in clause 8.1 of [6, TS 38.214].

CSI request—1 bit as defined in clause 8.2.1 of [6, TS 38.214] and in clause 8.1 of [6, TS 38.214].

TABLE 8.4.1.1-1

Cast type indicator

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

8.4.1.2 SCI Format 2-B

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits.
New data indicator—1 bit.
Redundancy version—2 bits as defined in Table 7.3.1.1.1-2.
Source ID—8 bits as defined in clause 8.1 of [6, TS 38.214].
Destination ID—16 bits as defined in clause 8.1 of [6, TS 38.214].
HARQ feedback enabled/disabled indicator—1 bit as defined in clause 16.3 of [5, TS 38.213].
Zone ID—12 bits as defined in clause 5.8.11 of [9, TS 38.331].
Communication range requirement—4 bits determined by higher layer parameter sl-ZoneConfigMCR-Index.

One or more parts of 3GPP TS 38.213 V16.6.0 are quoted below:

16 UE Procedures for Sidelink

A UE is provided by SL-BWP-Config a BWP for SL transmissions (SL BWP) with numerology and resource grid determined as described in [4, TS 38.211]. For a resource pool within the SL BWP, the UE is provided by sl-NumSubchannel a number of sub-channels where each sub-channel includes a number of contiguous RBs provided by sl-SubchannelSize. The first RB of the first sub-channel in the SL BWP is indicated by sl-StartRB-Subchannel. Available slots for a resource pool are provided by timeresourcepool and occur with a periodicity of 10240 ms. For an available slot without S-SS/PSBCH blocks, SL transmissions can start from a first symbol indicated by sl-StartSymbol and be within a number of consecutive symbols indicated by sl-LengthSymbols.

16.2.1 PSSCH

A UE determines a power $P_{PSSCH,b,c}(i)$ for a PSSCH transmission on a resource pool in symbols where a corresponding PSCCH is not transmitted in PSCCH-PSSCH transmission occasion i on active SL BWP b of carrier f of serving cell c as:

$$P_{PSSCH}(i) = \min(P_{CMAX}, P_{MAX,CBR}, \min(P_{PSSCH,D}(i), P_{PSSCH,SL}(i)) \text{ [dBm]}$$

where $P_{CMAX}$ is defined in [8-1, TS 38.101-1]
$P_{MAX,CBR}$ is determined by a value of sl-MaxTransPower based on a priority level of the PSSCH transmission and a CBR range that includes a CBR measured in slot i−N [6, TS 38.214]; if sl-MaxTransPower-r16 is not provided, then $P_{MAX,CBR} = P_{CMAX}$;
if dl-P0-PSSCH-PSCCH is provided $$P_{PSSCH,D}(i) = P_{O,D} + 10\log_{10}(2^{\mu} \cdot M_{RB}^{PSSCH}(i)) + \alpha_D \cdot PL_D \text{ [dBm]}$$

else $$P_{PSSCH,D}(i) = \min(P_{CMAX}, P_{MAX,CBR}) \text{ [dBm]}$$

where $P_{O,D}$ is a value of dl-P0-PSSCH-PSCCH if provided
$\alpha_D$ is a value of dl-Alpha-PSSCH-PSCCH, if provided; else, $\alpha_D = 1$
$PL_D = PL_{b,f,c}(q_d)$ as described in clause 7.1.1 except that
 the RS resource is the one the UE uses for determining a power of a PUSCH transmission scheduled by a DCI format 0_0 in serving cell c when the UE is configured to monitor PDCCH for detection of DCI format 0_0 in serving cell c
 the RS resource is the one corresponding to the SS/PBCH block the UE uses to obtain MIB when the UE is not configured to monitor PDCCH for detection of DCI format 0_0 in serving cell c
$M_{RB}^{PSSCH}(i)$ is a number of resource blocks for the PSSCH transmission occasion i and $\mu$ is a SCS configuration if sl-P0-PSSCH-PSCCH is provided and if a SCI format scheduling the PSSCH transmission includes a cast type indicator field indicating unicast $$P_{PSSCH,SL}(i) = P_{O,SL} + 10\log_{10}(2^{\mu} \cdot M_{RB}^{PSSCH}(i)) + \alpha_{SL} \cdot PL_{SL} \text{ [dBm]}$$

else $$P_{PSSCH,SL}(i) = \min(P_{CMAX}, P_{PSSCH,D}(i)) \text{ [dBm]}$$

where $P_{O,SL}$ is a value of sl-P0-PSSCH-PSCCH, if provided
$\alpha_{SL}$ is a value of sl-Alpha-PSSCH-PSCCH, if provided; else, $\alpha_{SL} = 1$
$PL_{SL}$ = referenceSignalPower—higher layer filtered RSRP, where
 referenceSignalPower is obtained from a PSSCH transmit power per RE summed over the antenna ports of the UE, higher layer filtered across PSSCH transmission occasions using a filter configuration provided by sl-filterCoefficient, and
 higher layer filtered RSRP is a RSRP, as defined in [7, TS 38.215], that is reported to the UE from a UE receiving the PSCCH-PSSCH transmission and is obtained from a PSSCH DM-RS using a filter configuration provided by sl-filterCoefficient
$M_{RB}^{PSSCH}(i)$ is a number of resource blocks for PSCCH-PSSCH transmission occasion i and $\mu$ is a SCS configuration A UE determines a power $P_{PSSCH2,b,c}(i)$ for a PSSCH transmission on a resource pool in the symbols where a corresponding PSCCH is transmitted in PSCCH-PSSCH transmission occasion i on active SL BWP b of carrier f of serving cell c as $$P_{PSSCH2}(i) = 10\log_{10}\left(\frac{M_{RB}^{PSSCH}(i) - M_{RB}^{PSCCH}(i)}{M_{RB}^{PSSCH}(i)}\right) + P_{PSSCH}(i)[dBm]$$

where $M_{RB}^{PSCCH}(i)$ is a number of resource blocks for the corresponding PSCCH transmission in PSCCH-PSSCH transmission occasion i.

The UE splits the power $P_{PSSCH2}(i)$ equally across the antenna ports on which the UE transmits the PSSCH with non-zero power.

16.2.3 PSFCH

A UE with $N_{sch,Tx,PSFCH}$ scheduled PSFCH transmissions, and capable of transmitting a maximum of $N_{max,PSFCH}$ PSFCHs, determines a number $N_{Tx,PSFCH}$ of simultaneous PSFCH transmissions and a power $P_{PSFCH,k}(i)$ for a PSFCH transmission k, $1 \leq k \leq N_{Tx,PSFCH}$, on a resource pool in PSFCH transmission occasion i on active SL BWP b of carrier f of serving cell c as if dl-P0-PSFCH is provided, $P_{PSFCH,one} = P_{O,PSFCH} + 10 \log_{10}(2^\mu) + \alpha_{PSFCH} \cdot PL$ [dBm]

where
  $P_{O,PSFCH}$ is a value of dl-P0-PSFCH
  $\alpha_{PFSCH}$ is a value of dl-Alpha-PSFCH, if provided; else, $\alpha_{PFSCH} = 1$
  $PL = PL_{b,f,c}(q_d)$ as described in clause 7.1.1 except that
    the RS resource is the one the UE uses for determining a power of a PUSCH transmission scheduled by a DCI format 0_0 in serving cell c when the UE is configured to monitor PDCCH for detection of DCI format 0_0 in serving cell c
    the RS resource is the one corresponding to the SS/PBCH block the UE uses to obtain MIB when the UE is not configured to monitor PDCCH for detection of DCI format 0_0 in serving cell c if $N_{sch,Tx,PSFCH} \leq N_{max,PSFCH}$
  if $P_{PSFCH,one} + 10 \log_{10}(N_{sch,Tx,PSFCH}) \leq P_{CMAX}$, where $P_{CMAX}$ is determined for the $N_{sch,Tx,PSFCH}$ PSFCH transmissions according to [8-1, TS 38.101-1]
    $N_{Tx,PSFCH} = N_{sch,Tx,PSFCH}$ and
    $P_{PSFCH,k}(i) = P_{PSFCH,one}$ [dBm]
  else
    UE autonomously determines $N_{Tx,PSFCH}$ PSFCH transmissions with ascending priority order as described in clause 16.2.4.2 such that $N_{Tx,PSFCH} \geq \max(1, \Sigma_{i=1}^{K} M_i)$ where $M_i$ is a number of PSFCHs with priority value i and K is defined as
      the largest value satisfying $P_{PSFCH,one} + 10 \log_{10}(\max(1, \Sigma_{i=1}^{K} M_i)) \leq P_{CMAX}$ where $P_{CMAX}$ is determined according to [8-1, TS 38.101-1] for transmission of all PSFCHs assigned with priority values 1, 2, ..., K, if any
      zero, otherwise
    and $P_{PSFCH,k}(i) = \text{MIN}(P_{CMAX} - 10 \log_{10}(N_{Tx,PSFCH}), P_{PSFCH,one})$ [dBm]

where $P_{CMAX}$ is defined in [8-1, TS 38.101-1] and is determined for the N PSFCH transmissions
  else
    the UE autonomously selects $N_{max,PSFCH}$ PSFCH transmissions with ascending priority order as described in clause 16.2.4.2 if $P_{PSFCH,one} + 10 \log_{10}(N_{max,PSFCH}) \leq P_{CMAX}$, where $P_{CMAX}$ is determined for the $N_{max,PSFCH}$ PSFCH transmissions according to [8-1, TS 38.101-1]

$N_{Tx,PSFCH} = N_{max,PSFCH}$ and $P_{PSFCH,k}(i) = P_{PSFCH,one}$ [dBm]

else
      the UE autonomously selects $N_{Tx,PSFCH}$ PSFCH transmissions in ascending order of corresponding priority field values as described in clause 16.2.4.2 such that $N_{Tx,PSFCH} \geq \max(1, \Sigma_{i=1}^{K} M_i)$ where $M_i$ is a number of PSFCHs with priority value i and K is defined as
        the largest value satisfying $P_{PSFCH,one} + 10 \log_{10}(\max(1, \Sigma_{i=1}^{K} M_i)) \leq P_{CMAX}$ where $P_{CMAX}$ is determined according to [8-1, TS 38.101-1] for transmission of all PSFCHs assigned with priority values 1, 2, ..., K, if any
        zero, otherwise
      and $P_{PSFCH,k}(i) = \min(P_{CMAX} - 10 \log_{10}(N_{Tx,PSFCH}), P_{PSFCH,one})$ [dBm]

where $P_{CMAX}$ is determined for the $N_{Tx,PSFCH}$ simultaneous PSFCH transmissions according to [8-1, TS 38.101-1]
    else $P_{PSFCH,k}(i) = P_{CMAX} - 10 \log_{10}(N_{Tx,PSFCH})$ [dBm]

where the UE autonomously determines N Tx,PSFCH PSFCH transmissions with ascending priority order as described in clause 16.2.4.2 such that $N_{Tx,PSFCH} \geq 1$ and where $P_{CMAX}$ is determined for the $N_{Tx,PSFCH}$ PSFCH transmissions according to [8-1, TS 38.101-1]

...

16.3 UE Procedure for Reporting HARQ-ACK on Sidelink

A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period, a number of slots in a resource pool for a period of PSFCH transmission occasion resources. If the number is zero, PSFCH transmissions from the UE in the resource pool are disabled.

A UE expects that a slot $t'^{SL}_k$ ($0 \leq k < T'_{max}$) has a PSFCH transmission occasion resource if k mod $N_{PSSCH}^{PSFCH} = 0$, where $t'^{SL}_k$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period.

A UE may be indicated by higher layers to not transmit a PSFCH in response to a PSSCH reception [11, TS 38.321].

If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH, of the resource pool after a last slot of the PSSCH reception.

The second OFDM symbol l' of PSFCH transmission in a slot is defined as l'=startSLsymbols+lengthSLsymbols−2.

16.3.1 UE Procedure for Receiving HARQ-ACK on Sidelink

A UE that transmitted a PSSCH scheduled by a SCI format 2-A or a SCI format 2-B that indicates HARQ feedback enabled, attempts to receive associated PSFCHs according to PSFCH resources determined as described in clause 16.3. The UE determines an ACK or a NACK value for HARQ-ACK information provided in each PSFCH resource as described in [10, TS 38.133]. The UE does not determine both an ACK value and a NACK value at a same time for a PSFCH resource.

Some related texts in NR are quoted below from 3GPP TS 38.214 V16.6.0 (e.g., Rel-16):

8 Physical Sidelink Shared Channel Related Procedures

A UE can be configured by higher layers with one or more sidelink resource pools. A sidelink resource pool can be for transmission of PSSCH, as described in Clause 8.1, or for reception of PSSCH, as described in Clause 8.3 and can be associated with either sidelink resource allocation mode 1 or sidelink resource allocation mode 2.

In the frequency domain, a sidelink resource pool consists of sl-NumSubchannel contiguous sub-channels. A sub-channel consists of sl-SubchannelSize contiguous PRBs, where sl-NumSubchannel and sl-SubchannelSize are higher layer parameters.

The set of slots that may belong to a sidelink resource pool is denoted by $(t_0^{SL}, t_1^{SL}, \ldots, t_{T'_{max}-1}^{SL})$ where $$0 \leq t_i^{SL} < 10240 \times 2^\mu, 0 \leq i < T'_{max},$$

the slot index is relative to slot #0 of the radio frame corresponding to SFN 0 of the serving cell or DFN 0, the set includes all the slots except the following slots, $N_{S\_SSB}$ slots in which S-SS/PSBCH block (S-SSB) is configured, $N_{nonSL}$ slots in each of which at least one of Y-th, (Y+1)-th, ..., (Y+X−1)-th OFDM symbols are not semi-statically configured as UL as per the higher layer parameter tdd-UL-DL-ConfigurationCommon-r16 of the serving cell if provided or sl-TDD-Configuration-r16 if provided or sl-TDD-Config-r16 of the received PSBCH if provided, where Y and X are set by the higher layer parameters sl-StartSymbol and sl-LengthSymbols, respectively.

The reserved slots which are determined by the following steps.

1) the remaining slots excluding $N_{S\_SSB}$ slots and N nonSL slots from the set of all the slots are denoted by $$\left(l_0, l_1, \ldots, l_{(10240 \times 2^\mu - N_{S_{SSB}} - N_{nonSL} - 1)}\right)$$

arranged in increasing order of slot index.

2) a slot $l_r$ $(0 \leq r < 10240 \times 2^\mu - N_{S_{SSB}} - N_{nonSL})$ belongs to the reserved slots if $$r = \left\lfloor \frac{m \cdot (10240 \times 2^\mu - N_{S_{SSB}} - N_{nonSL})}{N_{reserved}} \right\rfloor,$$

here m=0, 1, ..., $N_{reserved}$−1 and $N_{reserved}$=(10240× $2^\mu$−$N_{S_{SSB}}$−$N_{nonSL}$)mod $L_{bitmap}$ where $L_{bitmap}$ denotes the length of bitmap configured by higher layers.

The slots in the set are arranged in increasing order of slot index.

The UE determines the set of slots assigned to a sidelink resource pool as follows:

a bitmap $(b_0, b_1, \ldots, b_{L_{bitmap}-1})$ associated with the resource pool is used where $L_{bitmap}$ the length of the bitmap is configured by higher layers.

a slot $t_k^{SL}$ $(0 \leq \leq 10240 \times 2^\mu N_{S_{SSB}} - N_{nonSL} - N_{reserved})$ belongs to the set if $b_{k'}=1$ where k'=k mod $L_{bitmap}$.

The slots in the set are re-indexed such that the subscripts i of the remaining slots $t'^{SL}_i$ are successive {0, 1, ..., $T'_{max}$−1} where $T'_{max}$ is the number of the slots remaining in the set.

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;

L1 priority, $prio_{TX}$;

the remaining packet delay budget;

the number of sub-channels to be used for the PSSCH/PSCCH transmission in a slot, $L_{subCH}$;

optionally, the resource reservation interval, $P_{rsvp\_TX}$, in units of msec.

The following higher layer parameters affect this procedure:

sl-SelectionWindowList: internal parameter $T_{2min}$ is set to the corresponding value from higher layer parameter sl-SelectionWindowList for the given value of $prio_{TX}$.

sl-Thres-RSRP-List: this higher layer parameter provides an RSRP threshold for each combination $(p_i, p_j)$, where $p_i$ is the value of the priority field in a received SCI format 1-A and $p_j$ is the priority of the transmission of the UE selecting resources; for a given invocation of this procedure, $p_j=prio_{TX}$.

sl-RS-ForSensing selects if the UE uses the PSSCH-RSRP or PSCCH-RSRP measurement, as defined in clause 8.4.2.1.

sl-ResourceReservePeriodList sl-SensingWindow: internal parameter $T_0$ is defined as the number of slots corresponding to sl-SensingWindow msec sl-TxPercentageList: internal parameter X for a given $prio_{TX}$ is defined as sl-TxPercentageList ($prio_{TX}$) converted from percentage to ratio The resource reservation interval, $P_{rsvp\_TX}$, if provided, is converted from units of msec to units of logical slots, resulting in $P'_{rsvp\_TX}$ according to clause 8.1.7.

Notation:

$(t'^{SL}_0, t'^{SL}_1, t'^{SL}_2, \ldots)$ denotes the set of slots which belongs to the sidelink resource pool and is defined in Clause 8.

The following steps are used:

1) A candidate single-slot resource for transmission $R_{x,y}$ is defined as a set of $L_{subCH}$ contiguous sub-channels with sub-channel x+j in slot $t'^{SL}_y$ where j=0, ..., $L_{subCH}$−1. The UE shall assume that any set of $L_{subCH}$ contiguous sub-channels included in the corresponding resource pool within the time interval [n+$T_1$, n+$T_2$] correspond to one candidate single-slot resource, where selection of $T_1$ is up to UE implementation under $0 \leq T_1 \leq T_{proc,1}{}^{SL}$, where $T_{proc,1}{}^{SL}$ is defined in slots in Table 8.1.4-2 where $\mu_{SL}$ is the SCS configuration of the SL BWP;

if $T_{2min}$ is shorter than the remaining packet delay budget (in slots) then $T_2$ is up to UE implementation subject to $T_{2min} \leq T_2 \leq$ remaining packet delay budget (in slots); otherwise $T_2$ is set to the remaining packet delay budget (in slots).

The total number of candidate single-slot resources is denoted by $M_{total}$.

2) The sensing window is defined by the range of slots $[n-T_0, n-T_{proc,0}{}^{SL}]$ where $T_0$ is defined above and $T_{proc,0}{}^{SL}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

3) The internal parameter $Th(p_i, p_j)$ is set to the corresponding value of RSRP threshold indicated by the i-th field in sl-Thres-RSRP-List, where $i = p_i + (p_j - 1) * 8$.

4) The set $S_A$ is initialized to the set of all the candidate single-slot resources.

5) The UE shall exclude any candidate single-slot resource $R_{x,y}$ from the set $S_A$ if it meets all the following conditions:
   the UE has not monitored slot $t'_m{}^{SL}$ in Step 2.
   for any periodicity value allowed by the higher layer parameter sl-ResourceReservePeriodList and a hypothetical SCI format 1-A received in slot $t'_m{}^{SL}$ with 'Resource reservation period' field set to that periodicity value and indicating all subchannels of the resource pool in this slot, condition c in step 6 would be met.

5a) If the number of candidate single-slot resources $R_{x,y}$ remaining in the set $S_A$ is smaller than $X \cdot M_{total}$, the set $S_A$ is initialized to the set of all the candidate single-slot resources as in step 4.

6) The UE shall exclude any candidate single-slot resource $R_{x,y}$ from the set $S_A$ if it meets all the following conditions:
   a) the UE receives an SCI format 1-A in slot $t'_m{}^{SL}$, and 'Resource reservation period' field, if present, and 'Priority' field in the received SCI format 1-A indicate the values $P_{rsvp\_RX}$ and $prio_{RX}$, respectively according to Clause 16.4 in [6, TS 38.213];
   b) the RSRP measurement performed, according to clause 8.4.2.1 for the received SCI format 1-A, is higher than $Th(prio_{RX}, prio_{TX})$;
   c) the SCI format received in slot $t'_m{}^{SL}$ or the same SCI format which, if and only if the 'Resource reservation period' field is present in the received SCI format 1-A, is assumed to be received in slot(s) $t'_{m+q \times P_{rsvp\_RX}}{}^{SL}$ determines according to clause 8.1.5 the set of resource blocks and slots which overlaps with $R_{x,y+j \times P_{rsvp\_TX}}$, for $q = 1, 2, \ldots, Q$ and $j = 0, 1, \ldots, C_{resel} - 1$. Here, is $P_{rsvp\_RX}$ converted to units of logical slots according to clause 8.1.7, $$Q = \left\lceil \frac{T_{scal}}{P_{rsvp\_RX}} \right\rceil$$

if $P_{rsvp\_RX} < T_{scal}$ and $n' - m \leq P_{rsvp\_RX}'$, where $t'_n{}^{SL} = n$ if slot n belongs to the set $(t'_0{}^{SL}, t'_1{}^{SL}, \ldots, t'_{T'_{max}-1}{}^{SL})$, otherwise slot $t'_n{}^{SL}$ is the first slot after slot n belonging to the set $(t'_0{}^{SL}, t'_1{}^{SL}, \ldots, t'_{T'_{max}-1}{}^{SL})$; otherwise Q=1. $T_{scal}$ is set to selection window size $T_2$ converted to units of msec.

7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4.

The UE shall report set $S_A$ to higher layers.

In 3GPP TS 37.213 V16.6.0, one or more abbreviations, channel access procedure, and protocol related to channel access procedure in unlicensed spectrum (and/or share spectrum) are discussed in one or more parts quoted below:

4 Channel Access Procedure 4.0 General

Unless otherwise noted, the definitions below are applicable for the following terminologies used in this specification:

A channel refers to a carrier or a part of a carrier consisting of a contiguous set of resource blocks (RBs) on which a channel access procedure is performed in shared spectrum.

A channel access procedure is a procedure based on sensing that evaluates the availability of a channel for performing transmissions. The basic unit for sensing is a sensing slot with a duration $T_{sl} = 9$ us. The sensing slot duration $T_{sl}$ is considered to be idle if an eNB/gNB or a UE senses the channel during the sensing slot duration, and determines that the detected power for at least 4 us within the sensing slot duration is less than energy detection threshold $X_{Thresh}$. Otherwise, the sensing slot duration $T_{sl}$ is considered to be busy.

A channel occupancy refers to transmission(s) on channel(s) by eNB/gNB/UE(s) after performing the corresponding channel access procedures in this clause.

A Channel Occupancy Time refers to the total time for which eNB/gNB/UE and any eNB/gNB/UE(s) sharing the channel occupancy perform transmission(s) on a channel after an eNB/gNB/UE performs the corresponding channel access procedures described in this clause. For determining a Channel Occupancy Time, if a transmission gap is less than or equal to 25 us, the gap duration is counted in the channel occupancy time. A channel occupancy time can be shared for transmission between an eNB/gNB and the corresponding UE(s).

A DL transmission burst is defined as a set of transmissions from an eNB/gNB without any gaps greater than 16 us. Transmissions from an eNB/gNB separated by a gap of more than 16 us are considered as separate DL transmission bursts. An eNB/gNB can transmit transmission(s) after a gap within a DL transmission burst without sensing the corresponding channel(s) for availability.

A UL transmission burst is defined as a set of transmissions from a UE without any gaps greater than 16 us. Transmissions from a UE separated by a gap of more than 16 us are considered as separate UL transmission bursts. A UE can transmit transmission(s) after a gap within a UL transmission burst without sensing the corresponding channel(s) for availability.

4.1.1 Type 1 DL Channel Access Procedures

This clause describes channel access procedures to be performed by an eNB/gNB where the time duration spanned by the sensing slots that are sensed to be idle before a downlink transmission(s) is random. The clause is applicable to the following transmissions:

Transmission(s) initiated by an eNB including PDSCH/PDCCH/EPDCCH, or

Any transmission(s) initiated by a gNB.

The eNB/gNB may transmit a transmission after first sensing the channel to be idle during the sensing slot durations of a defer duration $T_d$ and after the counter N is zero in step 4. The counter N is adjusted by sensing the channel for additional sensing slot duration(s) according to the steps below:

1) set $N=N_{init}$, where $N_{init}$ is a random number uniformly distributed between 0 and $CW_p$, and go to step 4;
2) if N>0 and the eNB/gNB chooses to decrement the counter, set N=N−1;
3) sense the channel for an additional sensing slot duration, and if the additional sensing slot duration is idle, go to step 4; else, go to step 5;
4) if N=0, stop; else, go to step 2.
5) sense the channel until either a busy sensing slot is detected within an additional defer duration $T_d$ or all the sensing slots of the additional defer duration $T_d$ are detected to be idle;
6) if the channel is sensed to be idle during all the sensing slot durations of the additional defer duration $T_d$, go to step 4; else, go to step 5;

The defer duration $T_d$ consists of duration $T_f=16$ us immediately followed by $m_p$ consecutive sensing slot durations $T_{sl}$, and $T_f$ includes an idle sensing slot duration $T_{sl}$ at start of $T_f$.

If an eNB/gNB transmits discovery burst(s) as described in clause 4.1.2 when N>0 in the procedure above, the eNB/gNB shall not decrement N during the sensing slot duration(s) overlapping with discovery burst(s).

TABLE 4.1.1-1

Channel Access Priority Class (CAPC)

| Channel Access Priority Class (p) | $m_p$ | $CW_{min, p}$ | $CW_{max, p}$ | $T_{m\ cot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

4.1.2 Type 2 DL Channel Access Procedures

This clause describes channel access procedures to be performed by an eNB/gNB where the time duration spanned by sensing slots that are sensed to be idle before a downlink transmission(s) is deterministic.

Type 2A channel access procedures as described in clause 4.1.2.1 are only applicable to the following transmission(s) performed by an eNB/gNB:

Transmission(s) by an eNB/gNB following transmission(s) by a UE after a gap of 25 us in a shared channel occupancy as described in clause 4.1.3.

Type 2B or Type 2C DL channel access procedures as described in clause 4.1.2.2 and 4.1.2.3, respectively, are applicable to the transmission(s) performed by a gNB following transmission(s) by a UE after a gap of 16 us or up to 16 us, respectively, in a shared channel occupancy as described in clause 4.1.3.

4.1.2.1 Type 2A DL Channel Access Procedures

An eNB/gNB may transmit a DL transmission immediately after sensing the channel to be idle for at least a sensing interval $T_{short\_dl}=25$ us. $T_{short\_dl}$ consists of a duration $T_f=16$ us immediately followed by one sensing slot and $T_f$ includes a sensing slot at start of $T_f$. The channel is considered to be idle for $T_{short\_dl}$ if both sensing slots of $T_{short\_dl}$ are sensed to be idle.

4.1.2.2 Type 2B DL Channel Access Procedures

A gNB may transmit a DL transmission immediately after sensing the channel to be idle within a duration of $T_f=16$ us. $T_f$ includes a sensing slot that occurs within the last 9 us of $T_f$. The channel is considered to be idle within the duration $T_f$ if the channel is sensed to be idle for a total of at least 5 us with at least 4 us of sensing occurring in the sensing slot.

4.1.2.3 Type 2C DL Channel Access Procedures

When a gNB follows the procedures in this clause for transmission of a DL transmission, the gNB does not sense the channel before transmission of the DL transmission. The duration of the corresponding DL transmission is at most 584 us.

4.1.3 DL Channel Access Procedures in a Shared Channel Occupancy

. . .

If a gNB shares a channel occupancy initiated by a UE using the channel access procedures described in clause 4.2.1.1 on a channel, the gNB may transmit a transmission that follows a UL transmission on scheduled resources or a PUSCH transmission on configured resources by the UE after a gap as follows:

The transmission shall contain transmission to the UE that initiated the channel occupancy and can include non-unicast and/or unicast transmissions where any unicast transmission that includes user plane data is only transmitted to the UE that initiated the channel occupancy.

If the higher layer parameters ul-toDL-COT-SharingED-Threshold-r16 is not provided, the transmission shall not include any unicast transmissions with user plane data and the transmission duration is not more than the duration of 2, 4 and 8 symbols for subcarrier spacing of 15, 30 and 60 kHz of the corresponding channel, respectively.

If the gap is up to 16 us, the gNB can transmit the transmission on the channel after performing Type 2C DL channel access as described in clause 4.1.2.3.

If the gap is 25 us or 16 us, the gNB can transmit the transmission on the channel after performing Type 2A or Type 2B DL channel access procedures as described in clause 4.1.2.1 and 4.1.2.2, respectively.

For the case where a gNB shares a channel occupancy initiated by a UE with configured grant PUSCH transmission, the gNB may transmit a transmission that follows the configured grant PUSCH transmission by the UE as follows:

If the higher layer parameter ul-toDL-COT-SharingED-Threshold-r16 is provided, the UE is configured by cg-COT-SharingList-r16 where cg-COT-SharingList-r16 provides a table configured by higher layer. Each row of the table provides a channel occupancy sharing information given by higher layer parameter CG-COT-Sharing-r16. One row of the table is configured for indicating that the channel occupancy sharing is not available.

If the 'COT sharing information' in CG-UCI detected in slot n indicates a row index that corresponds to a CG-COT-Sharing-r16 that provides channel occupancy sharing information, the gNB can share the UE channel occupancy assuming a channel access priority class p=channelAccessPriority-r16, starting from slot n+O, where O=offset-r16 slots, for a duration of D=duration-r16 slots where duration-r16, offset-r16, and channelAccessPriority-r16 are higher layer parameters provided by CG-COT-Sharing-r16.

If the higher layer parameter ul-toDL-COT-SharingED-Threshold-r16 is not provided, and if 'COT sharing information' in CG-UCI indicates '1', the gNB can share the UE channel occupancy and start the DL transmission X=cg-COT-SharingOffset-r16 symbols from the end of the slot where CG-UCI is detected, where cg-COT-SharingOffset-r16 is provided by higher layer. The transmission shall not include any unicast transmissions with user plane data and the transmission duration is not more than the duration of 2, 4 and 8 symbols for subcarrier spacing of 15, 30 and 60 kHz of the corresponding channel, respectively.

For the case where a gNB uses channel access procedures as described in clause 4.1.1 to initiate a transmission and shares the corresponding channel occupancy with a UE that transmits a transmission as described in clause 4.2.1.2, the gNB may transmit a transmission within its channel occupancy that follows the UE's transmission if any gap between any two transmissions in the gNB channel occupancy is at most 25 us. In this case the following applies:

If the gap is 25 us or 16 us, the gNB can transmit the transmission on the channel after performing Type 2A or 2B DL channel access procedures as described in clause 4.1.2.1 and 4.1.2.2, respectively.

If the gap is up to 16 us, the gNB can transmit the transmission on the channel after performing Type 2C DL channel access as described in clause 4.1.2.3.

4.2 Uplink Channel Access Procedures

A UE performing transmission(s) on LAA Scell(s), an eNB scheduling or configuring UL transmission(s) for a UE performing transmission(s) on LAA Scell(s), and a UE performing transmission(s) on channel(s) and a gNB scheduling or configuring UL transmission(s) for a UE performing transmissions on channel(s) shall perform the procedures described in this clause for the UE to access the channel(s) on which the transmission(s) are performed.

In this clause, transmissions from a UE are considered as separate UL transmissions, irrespective of having a gap between transmissions or not, and $X_{Thresh}$ for sensing is adjusted as described in clause 4.2.3 when applicable.

4.2.1 Channel Access Procedures for Uplink Transmission(s)

A UE can access a channel on which UL transmission(s) are performed according to one of Type 1 or Type 2 UL channel access procedures. Type 1 channel access procedure is described in clause 4.2.1.1. Type 2 channel access procedure is described in clause 4.2.1.2.

If a UL grant scheduling a PUSCH transmission indicates Type 1 channel access procedures, the UE shall use Type 1 channel access procedures for transmitting transmissions including the PUSCH transmission unless stated otherwise in this clause.

A UE shall use Type 1 channel access procedures for transmitting transmissions including the autonomous or configured grant PUSCH transmission on configured UL resources unless stated otherwise in this clause.

If a UL grant scheduling a PUSCH transmission indicates Type 2 channel access procedures, the UE shall use Type 2 channel access procedures for transmitting transmissions including the PUSCH transmission unless stated otherwise in this clause.

If a UE is scheduled by a gNB to transmit PUSCH and one or more SRSs by a single UL grant in non-contiguous transmissions, or a UE is scheduled by a gNB to transmit PUCCH and/or SRSs by a single DL assignment in non-contiguous transmissions, the UE shall use the channel access procedure indicated by the scheduling DCI for the first UL transmission scheduled by the scheduling DCI. If the channel is sensed by the UE to be continuously idle after the UE has stopped transmitting the first transmission, the UE may transmit further UL transmissions scheduled by the scheduling DCI using Type 2 channel access procedures or Type 2A UL channel access procedures without applying a CP extension if the further UL transmissions are within the gNB Channel Occupancy Time. Otherwise, if the channel sensed by the UE is not continuously idle after the UE has stopped transmitting the first UL transmission or the further UL transmissions are outside the gNB Channel Occupancy Time, the UE may transmit the further UL transmissions using Type 1 channel access procedure, without applying a CP extension.

TABLE 4.2.1-1

Channel Access Priority Class (CAPC) for UL

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\ cot,p}$ = 10 ms if the higher layer parameter absenceOfAnyOtherTechnology-r14 or absenceOfAnyOtherTechnology-r16 is provided, otherwise, $T_{ulm\ cot,p}$ = 6 ms.

NOTE 2:
When $T_{ulm\ cot,p}$ = 6 ms it may be increased to 8 ms by inserting one or more gaps. The minimum duration of a gap shall be 100 us. The maximum duration before including any such gap shall be 6 ms.

4.2.1.0 Channel Access Procedures and UL Related Signaling

. . .

If a UE determines the duration in time domain and the location in frequency domain of a remaining channel occupancy initiated by the gNB from a DCI format 2_0 as described in clause 11.1.1 of [7], the following is applicable:

The UE may switch from Type 1 channel access procedures as described in clause 4.2.1.1 to Type 2A channel access procedures as described in clause 4.2.1.2.1 for its corresponding UL transmissions within the determined duration in time and location in frequency domain of the remaining channel occupancy. In this case, if the UL transmissions are PUSCH transmissions on configured resources, the UE may assume any priority class for the channel occupancy shared with the gNB.

4.2.1.0.1 Channel Access Procedures for Consecutive UL Transmission(s)

For contiguous UL transmission(s), the following are applicable:

If a UE is scheduled to transmit a set of UL transmissions using one or more UL grant(s) or DL assignment(s), and if the UE cannot access the channel for a transmission in the set prior to the last transmission according to one of Type 1, Type 2, or Type 2A UL channel access procedures, the UE shall attempt to transmit the next transmission according to the channel access type indicated in the corresponding UL grant or DL assignment. Otherwise, if the UE cannot access the channel for a transmission in the set prior to the last transmission according to Type 2B UL channel access procedure, the UE shall attempt to transmit the next transmission according to Type 2A UL channel access procedure.

If a UE is scheduled by a gNB to transmit a set of UL transmissions including PUSCH or SRS symbol(s) using a UL grant, the UE shall not apply a CP extension for the remaining UL transmissions in the set after the first UL transmission after accessing the channel.

If a UE is scheduled to transmit a set of consecutive UL transmissions without gaps including PUSCH using one or more UL grant(s), PUCCH using one or more DL grant(s), or SRS with one or more DL grant(s) or UL grant(s) and the UE transmits one of the scheduled UL transmissions in the set after accessing the channel according to one of Type 1, Type 2, Type 2A, Type 2B or Type 2C UL channel access procedures, the UE may continue transmission of the remaining UL transmissions in the set, if any.

If a UE is configured to transmit a set of consecutive PUSCH or SRS transmissions on resources configured by the gNB, the time domain resource configuration defines multiple transmission occasions, and if the UE cannot access the channel according to Type 1 UL channel access procedure for transmitting in a transmission occasion prior to the last transmission occasion, the UE shall attempt to transmit in the next transmission occasion according to Type 1 UL channel access procedure. If the UE transmits in one of the multiple transmission occasions after accessing the channel according to Type 1 UL channel access procedure, the UE may continue transmission in the remaining transmission occasions in the set, wherein each transmission occasion starts at the starting symbol of a configured grant PUSCH within the duration of the COT.

If a UE is configured by the gNB to transmit a set of consecutive UL transmissions without gaps including PUSCH, periodic PUCCH, or periodic SRS and the UE transmits one of the configured UL transmissions in the set after accessing the channel according to Type 1 UL channel access procedures, the UE may continue transmission of the remaining UL transmissions in the set, if any.

. . .
. . .

4.2.1.1 Type 1 UL Channel Access Procedure

This clause describes channel access procedures by a UE where the time duration spanned by the sensing slots that are sensed to be idle before a UL transmission(s) is random. The clause is applicable to the following transmissions:
PUSCH/SRS transmission(s) scheduled or configured by eNB/gNB, or
PUCCH transmission(s) scheduled or configured by gNB, or
Transmission(s) related to random access procedure.

A UE may transmit the transmission using Type 1 channel access procedure after first sensing the channel to be idle during the slot durations of a defer duration $T_d$, and after the counter N is zero in step 4. The counter N is adjusted by sensing the channel for additional slot duration(s) according to the steps described below.

1) set $N=N_{init}$, where $N_{init}$ is a random number uniformly distributed between 0 and $CW_p$, and go to step 4;
2) if N>0 and the UE chooses to decrement the counter, set N=N−1;
3) sense the channel for an additional slot duration, and if the additional slot duration is idle, go to step 4; else, go to step 5;
4) if N=0, stop; else, go to step 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5;

The defer duration $T_d$ consists of duration $T_f=16$ us immediately followed by $m_p$ consecutive slot durations where each slot duration is $T_{sl}=9$ us, and $T_f$ includes an idle slot duration $T_{sl}$ at start of $T_f$.

4.2.1.2 Type 2 UL Channel Access Procedure

This clause describes channel access procedures by UE where the time duration spanned by the sensing slots that are sensed to be idle before a UL transmission(s) is deterministic.

If a UE is indicated by an eNB to perform Type 2 UL channel access procedures, the UE follows the procedures described in clause 4.2.1.2.1.

4.2.1.2.1 Type 2A UL Channel Access Procedure

If a UE is indicated to perform Type 2A UL channel access procedures, the UE uses Type 2A UL channel access procedures for a UL transmission. The UE may transmit the transmission immediately after sensing the channel to be idle for at least a sensing interval $T_{short\_ul}=25$ us·$T_{short\_ul}$ consists of a duration $T_f=16$ us immediately followed by one slot sensing slot and $T_f$ includes a sensing slot at start of $T_f$. The channel is considered to be idle for $T_{short\_ul}$ if both sensing slots of $T_{short\_ul}$ are sensed to be idle.

4.2.1.2.2 Type 2B UL Channel Access Procedure

If a UE is indicated to perform Type 2B UL channel access procedures, the UE uses Type 2B UL channel access procedure for a UL transmission. The UE may transmit the transmission immediately after sensing the channel to be idle within a duration of $T_f=16$ us. $T_f$ includes a sensing slot that occurs within the last 9 us of $T_f$. The channel is considered to be idle within the duration $T_f$ if the channel is sensed to be idle for total of at least 5 us with at least 4 us of sensing occurring in the sensing slot.

4.2.1.2.3 Type 2C UL Channel Access Procedure

If a UE is indicated to perform Type 2C UL channel access procedures for a UL transmission, the UE does not sense the channel before the transmission. The duration of the corresponding UL transmission is at most 584 us.

4.2.3 Energy Detection Threshold Adaptation Procedure

A UE accessing a channel on which UL transmission(s) are performed, shall set the energy detection threshold ($X_{Thresh}$) to be less than or equal to the maximum energy detection threshold $X_{Thresh\_max}$.

$X_{Thresh\_max}$ is determined as follows:
If the UE is configured with higher layer parameter maxEnergyDetectionThreshold-r14 or maxEnergyDetectionThreshold-r16,
$X_{Thresh\_max}$ is set equal to the value signalled by the higher layer parameter;
otherwise
the UE shall determine $X'_{Thresh\_max}$ according to the procedure described in clause 4.2.3.1;

if the UE is configured with higher layer parameter energyDetectionThresholdOffset-r14 or energyDetectionThresholdOffset-r16

$X_{Thresh\_max}$ is set by adjusting $X'_{Thresh\_max}$ according to the offset value signalled by the higher layer parameter;

otherwise the UE shall set $X_{Thresh\_max} = X'_{Thresh\_max}$.

If the higher layer parameter absenceOfAnyOtherTechnology-r16 is not configured to a UE, and the higher layer parameter ul-toDL-COT-SharingED-Threshold-r16 is configured to the UE, the gNB should use the gNB's transmit power in determining the resulting energy detection threshold ul-toDL-COT-SharingED-Threshold-r16.

For the case where a UE performs channel access procedures as described in clause 4.2.1.1 for a UL transmission and CG-UCI is absent in the UL transmission or CG-UCI is present in the UL transmission and indicates COT-sharing information other than 'COT sharing not available', $X_{Thresh\_max}$ is set equal to the value provided by the higher layer parameter ul-toDL-COT-SharingED-Threshold-r16, if provided.

4.2.3.1 Default Maximum Energy Detection Threshold Computation Procedure

If the higher layer parameter absenceOfAnyOtherTechnology-r14 or absenceOfAnyOtherTechnology-r16 is provided $$X'_{Thresh\_max} = \min\left\{ \begin{array}{l} T_{max} + 10dB \\ X_r \end{array} \right\}$$

where $X_r$ is Maximum energy detection threshold defined by regulatory requirements in dBm when such requirements are defined, otherwise $X_r = T_{max} + 10$ dB otherwise $$X'_{Thresh\_max} = \max\left\{ \begin{array}{l} -72 + 10 \cdot \log 10(BWMHz/20\,\text{MHz})\text{dBm}, \\ \min\left\{ \begin{array}{l} T_{max}, \\ T_{max} - T_A + (P_H + 10 \cdot \log 10(BWMHz/20\,\text{MHz}) - P_{TX}) \end{array} \right\} \end{array} \right\}$$

where $T_A = 10$ dB;

$P_H = 23$ dBm;

$P_{TX}$ is the set to the value of $P_{CMAX\_H,c}$ as defined in [3];

$T_{max}(\text{dBm}) = 10 \cdot \log 10 \ (3.16228 \cdot 10^{-8} \ (\text{mW/MHz}) \cdot \text{BWMHz (MHz)});$ BWMHz is the single channel bandwidth in MHz.

Brief description of different types of Listen Before Talk (LBT) (e.g., different kinds of LBT) and/or channel access procedure is provided in one or more parts of 5G New Radio Unlicensed: Challenges and Evaluation quoted below:

2) LTE-LAA-/NR-U-based Systems: To facilitate 5G NR-U (also LTE-LAA) operation over unlicensed bands, four LBT Categories (CATs) have been defined:

CAT1-LBT (Type 2C): A gNB can access the channel immediately without performing LBT. The COT can be up to 584 microseconds.

CAT2-LBT (Type 2A and 2B): An NR-U device must sense the channel for a fixed time duration, Tfixed. If the channel remains idle during this period, the device can access the channel. In Type 2A, Tfixed is 25 microseconds, while in Type 2B, it is 16 microseconds.

CAT3-LBT: An NR-U device must back off for a random period of time before accessing the channel. This random period is sampled from a fixed-size contention window. The option of CAT3-LBT has been excluded from the specifications.

CAT4-LBT (Type 1): An NR-U device must back off according to the CSMA/CA procedure with exponential backoff New Radio (NR) Rel-16 provides a release (e.g., an initial release) for NR sidelink Vehicle to Everything (V2X). Current standard (e.g., NR standard provided in NR Rel-16) meets some and/or all requirements defined in SA1 (Technical Specification Group Service and System Aspects (TSG SA) Working Group (WG) 1) (e.g., discussed in 3GPP TR 22.886 V16.2.0). Considering the future, with an increased amount of devices requiring higher throughput and/or higher data rate, sidelink (SL) transmission on wider frequency resources may be desired. However, current band supporting PC5 interface (e.g., an interface for communication between devices) or sidelink transmission may not be enough (e.g., the current band that is configured for supporting communication over PC5 interface and/or sidelink transmission may not be sufficient for accommodating the increased amount of devices, the higher throughput and/or the higher data rate). Thus, introduction of sidelink transmission on unlicensed/shared spectrum with large spectrum availability may be a targeted solution. Listen before talk (LBT) may be required in order to have fair coexistence with other devices that are in the same radio access technology (RAT) or different RAT and/or that use different techniques (e.g., WiFi) in unlicensed spectrum. LBT comprises an energy detection and/or sensing technique. In some examples, according to a LBT result (e.g., the LBT result may be idle or busy) before transmission, a device may determine whether or not the transmission is allowed to be performed. There is a short introduction of New Radio-Unlicensed for Uu interface (e.g., an interface for communication between a device and a network node) in 3GPP TS 37.213 V16.6.0 and 5G New Radio Unlicensed: Challenges and Evaluation. LBT may separate (e.g., briefly separate) into short LBT (e.g., Category 1 LBT (CAT1-LBT) and/or Category 2 LBT (CAT2-LBT)) and long LBT (e.g., Category 4 LBT (CAT4-LBT)). For short LBT, a device may be allowed to perform transmission with a relatively short LBT (e.g., shorter LBT relative to long LBT) or without LBT, whereas for long LBT, a device may need to perform transmission with LBT with a relatively long time, such as longer LBT relative to short LBT (e.g., compared to short LBT, long LBT may be performed with more sensing slots being idle and/or with back off). For example, sensing performed in long LBT may be performed on a longer duration of time than sensing that is performed in short LBT. In an example, long LBT may be successful based on a UE sensing idle over a first duration of time and/or a first number of sensing slots, whereas short LBT may be successful based on a UE sensing idle over a second duration of time and/or a second number of sensing slots, where the first duration of time and/or the first number of sensing slots (associated with long LBT) are larger than the second duration of time and/or the second number of sensing slots (associated with short LBT). For sidelink reception, continuously monitoring, receiving and/or detecting sidelink resources may be an assumption in sidelink device. With the need of LBT to meet regulation of unlicensed spectrum and/or provide fair coexistence with other devices, a first issue is how to design LBT for sidelink transmission. Short LBT corresponds to type-2 channel access procedure, type-2A channel access procedure, type-2B channel access procedure, or type-2C channel access procedure. Long LBT corresponds to type-1 channel access procedure. One LBT type corresponds one of type-1 channel access procedure, type-2 channel access procedure, type-2A channel access procedure, type-2B channel access procedure, or type-2C channel access procedure.

As introduced in NR-Unlicensed (NR-U) for Uu interface downlink (DL) transmission and/or Uu interface uplink (UL) transmission, short LBT may be performed when a device performs transmission in a channel occupancy time (COT) of the device and/or when there is a different device that initiates a COT and shares the COT to the device. Short LBT may have the benefit of shorter latency (relative to long LBT, for example). A second issue may be how a device determines whether to use long LBT or to use short LBT before performing sidelink transmission. For example, how a device determines whether or use long LBT or to use short LBT may not be clear and/or may require design.

As introduced in NR Rel-16, sidelink transmission may be broadcast, groupcast, or unicast. For groupcast and unicast sidelink transmission, a TX device (transmitter device) may enable Sidelink Hybrid Automatic Repeat Request (SL HARQ) feedback for the sidelink transmission (and/or the TX device may set SL HARQ feedback to enable for the sidelink transmission). For example, if SL HARQ feedback is enabled (e.g., set to enable) for the sidelink transmission, one or more RX devices (one or more receiver devices) may need to perform Physical Sidelink Feedback Channel (PSFCH) transmission delivering SL HARQ feedback (e.g., the one or more RX devices may transmit the PSFCH transmission, to the TX device, in response to the sidelink transmission). However, considering sidelink transmission on unlicensed spectrum, it may not always be guaranteed that the one or more RX devices can perform LBT successfully (e.g., it may not be guaranteed that the one or more RX devices sense channel to be idle) for transmitting PSFCH. Accordingly, a third issue may be how to improve PSFCH transmission and/or SL HARQ feedback reliability.

Regarding power control for sidelink transmission, transmit power for a sidelink transmission may depend on sidelink pathloss between a pair of UEs, downlink pathloss between a transmitter UE and network, and/or sidelink transmission resource bandwidth. Detailed element for transmit power of different sidelink channel (e.g., transmit power $P_{PSSCH}(i)$ for PSSCH, and/or transmit power $P_{PSFCH,k}(i)$ for PSFCH) is discussed in (3GPP TS 38.213 V16.6.0). In an example, different transmit powers for sidelink channel from different transmitters may occur due to an upper bound of DL transmit power (e.g., the different transmitters may use the different transmit powers for transmissions on the sidelink channel in order to avoid interference, of the transmissions, with DL transmissions by a network), different sidelink transmission resource bandwidths (e.g., different sub-channels, different numbers of Physical Sidelink Shared Channels (PSSCHs), and/or different Physical Resource Blocks (PRBs) of PSFCH and/or PSSCH), and/or different maximum transmit powers. Since a first transmitter device and a second transmit device may have different transmit powers for sidelink transmission (e.g., the first transmitter device may have a first transmit power for sidelink transmission and the second transmitter device may have a second transmit power for sidelink transmission, where the first transmit power is different than the second transmit power), it may be difficult (and/or impossible) for the first transmitter device, that initiates a COT, to shares the COT with the second transmitter device (for performing sidelink transmission, for example). It may be difficult (and/or impossible) for the first transmitter device to share the COT with the second transmitter device because the first transmitter device may use the first transmit power for determining a threshold to perform LBT, and a COT in response to the LBT (e.g., successful LBT) may be based on the energy sensing/detection being lower than the threshold. Therefore, if the second transmitter device uses a higher transmit power (e.g., the second transmit power that is higher than the first transmit power associated with the first transmitter device) for performing sidelink transmission on the resources associated with the COT shared by the first transmitter device, unwanted interference may occur with one or more neighboring devices. Accordingly, a fourth issue may be how to reduce interference due to shared COT and/or how to improve COT sharing for sidelink transmission. For example, how to reduce interference due to shared COT and/or how to improve COT sharing for sidelink transmission may require further design.

Thus, implementation of one or more of the techniques provided herein may solve and/or improve one or more issues comprising one, some and/or all of the aforementioned issues, such as the first issue, the second issue, the third issue and/or the fourth issue. In an example, the present disclosure may provide one or more techniques that enable UEs to exchange information for improving and/or solving the one or more issues (e.g., implementation one or more of the techniques of the present disclosure may enable UEs to exchange necessary information required to improve and/or solve the one or more issues).

Concept 1:

Concept 1 of the present disclosure is that a first UE may transmit LBT type/cyclic prefix (CP) extension information to a second UE. In the present disclosure, the term "LBT type/CP extension information" may refer to information associated with a LBT type and/or a CP extension (e.g., information that is indicative of a LBT type and/or a CP extension status, such as information that identifies a LBT type and/or identifies a CP extension status). In some examples, CP extension status may correspond to a type of CP extension (e.g., at least one of short CP extension, long CP extension, etc.) to be applied for a transmission and/or whether or not CP extension should be applied for a transmission. The second UE may determine which type of LBT to perform (e.g., the second UE may select the type of LBT) based on the LBT type/CP extension information. The first UE transmits a first sidelink transmission, including the LBT type/CP extension information, to the second UE. The second UE transmits a second sidelink transmission in response to the first sidelink transmission.

The LBT type/CP extension information may be carried by PSSCH, Physical Sidelink Control Channel (PSCCH), and/or PSFCH.

The LBT type/CP extension information may be indicated by 1st stage Sidelink Control Information (SCI) (e.g., SCI format 1-A), 2nd stage SCI (e.g., SCI format 2-A, SCI format 2-B, or SCI format 2-X wherein X=C, D, E, F, or other letter and/or value), a 3rd stage SCI indicated by 2nd stage SCI and/or 1st stage SCI, Medium Access Control (MAC) Control Element (CE), and/or PC5-Radio Resource Control (RRC) signaling.

In some examples, 1st stage SCI indicates a 2nd stage SCI format, such one 2nd stage SCI format (e.g., the 1st stage SCI indicates one 2nd stage SCI format of a plurality of 2nd stage SCI formats). In some examples, 1st stage SCI indicates one 2nd stage SCI format of the following 2nd stage SCI formats: (i) SCI format 2-A; (ii) SCI format 2-B; (iii) SCI format 2-A with one or more fields associated with LBT type/CP extension information; (iv) SCI format 2-B with one or more fields associated with LBT type/CP extension information). In some examples, 1st stage SCI indicates one 2nd stage SCI format of the following 2nd stage SCI formats: (i) SCI format 2-A; (ii) SCI format 2-B; (iii) SCI format 2-C associated with long LBT; (iv) SCI format 2-D which is associated with short LBT.

FIG. 5 illustrates a table 500 associated with LBT type/CP extension information. As shown in the table 500, LBT type information (e.g., information associated with a LBT type, such as information indicative of a LBT type) may be indicated by fields A-D, and CP extension information (e.g., information associated with a CP extension, such as information indicative of a CP extension) may be indicated by fields E-H. Each field of one, some and/or all of fields A~D may be indicative of long LBT or short LBT (e.g., one or more first fields of fields A~D may be indicative of long LBT and/or one or more second fields of fields A~D may be indicative of short LBT). Each field of one, some and/or all of fields A~D may be indicative of type-1 channel access, type-2A channel access, type-2B channel access, or type-2C channel access (e.g., one or more first fields of fields A~D may be indicative of type-1 channel access, one or more second fields of fields A~D may be indicative of type-2A channel access, one or more third fields of fields A~D may be indicative of type-2B channel access, and/or one or more fourth fields of fields A~D may be indicative of type-2C channel access). Each field of one, some and/or all of fields E~H may be indicative of an entry/$t_{ext}$ index (e.g., an entry index and/or a $t_{ext}$ index, such as any entry index and/or any $t_{ext}$ index), such as an entry/$t_{ext}$ index defined in clause 5.3.1 of 3GPP TS 38.211 V16.6.0 (e.g., any entry/text index defined in clause 5.3.1 of 3GPP TS 38.211 V16.6.0). For example, each field of one, some and/or all of fields E~H may be indicative of a CP extension $t_{ext}$ index (defined in clause 5.3.1 of 3GPP TS 38.211 V16.6.0, for example). In the example shown in FIG. 5, the LBT type/CP extension information may be indicated by an entry index. In an example (as shown in FIG. 5), an entry index of 0 may be indicative of LBT type information corresponding to field A and CP extension information corresponding to field E, an entry index of 1 may be indicative of LBT type information corresponding to field B and CP extension information corresponding to field F, etc. In some examples, ceil(log$_2$(M+1)) bits may be needed for indicating LBT type/CP extension information (e.g., ceil(log$_2$(M+1)) bits may correspond to a number of bits needed to identify M).

In some examples, COT sharing information comprises LBT type/CP extension information. FIG. 6 illustrates a table 600 associated with LBT type/CP extension information. As shown in the table 600, LBT type information (e.g., information associated with a LBT type, such as information indicative of a LBT type) may be indicated by fields A~C, CP extension information (e.g., information associated with a CP extension, such as information indicative of a CP extension) may be indicated by fields D~F, Channel Access Priority Class (CAPC) may be indicated by fields G~I, time offset and/or starting position of a shared COT may be indicated by fields J~L, duration and/or ending position of the shared COT may be indicated by fields N~P, and/or energy threshold (e.g., energy detection (ED) threshold) may be indicated by fields Q~S. In some examples, the first UE would transmit COT sharing information as illustrated in FIG. 6. In some examples, a COT sharing information (e.g., one COT sharing information, such as one COT sharing information indicated by one entry index) may comprise LBT type, CP extension (and/or a CP extension $t_{ext}$ index, such as CP extension $t_{ext}$ index defined in clause 5.3.1 of 3GPP TS 38.211 V16.6.0), CAPC, time offset, duration, and/or energy detection threshold. In some examples, ceil (log$_2$(M+1)) bits may be needed for indicating an entry (e.g., one entry), such as an entry corresponding to a COT sharing information (e.g., one COT sharing information).

In some examples, the first sidelink transmission may be PSCCH and/or PSSCH.

In some examples, the second sidelink transmission may be PSFCH. The second sidelink transmission may transmit (e.g., may comprise transmission of) sidelink HARQ feedback associated with the first sidelink transmission (e.g., the second sidelink transmission may comprise transmission of sidelink HARQ feedback associated with the first sidelink transmission based on the first sidelink transmission having SL HARQ feedback enabled).

Alternatively and/or additionally, the second sidelink transmission may be PSCCH and/or PSSCH. In some examples, the second sidelink transmission may comprise transmission of sidelink information/data and/or sidelink MAC CE, wherein the sidelink information/data and/or the sidelink MAC CE may be transmitted (via the second sidelink transmission, for example) in response to the first sidelink transmission. In some examples, the sidelink information/data and/or the sidelink MAC CE may comprise SL Channel State Information (CSI) report, SL Reference Signal Received Power (RSRP) report, SL power headroom report, SL buffer status report, inter-UE coordination report (e.g., inter-UE coordination resource report), and/or resource collision indication. The first sidelink transmission may indicate a trigger and/or request for one or more reports comprised in the second sidelink transmission (e.g., the first transmission may indicate a trigger and/or request for the CSI report, the SL RSRP report, the SL power headroom report, the SL buffer status report, the inter-UE coordination report, and/or the resource collision indication).

The first UE determines the LBT type/CP extension information based on: (i) whether or not the second sidelink transmission (transmitted by the second UE) is outside a COT initiated by the first UE; (ii) a structure of a COT initiated by the first UE; (iii) whether or not there is a gap (e.g., a pause) before the second sidelink transmission; (iv) whether or not there is a gap (e.g., a pause), before the second sidelink transmission, in which the first UE does not perform sidelink transmission; (v) whether or not there is a gap (e.g., a pause) between the second sidelink transmission and the first sidelink transmission; and/or (vi) a length of the gap (e.g., a length of the pause).

In some examples, the COT initiated by the first UE comprises the transmitting time of the first sidelink transmission.

In some examples, the first UE can expect the transmitting time of the second sidelink transmission from the second UE. The first UE can expect whether the second sidelink transmission is outside or inside a COT initiated by the first UE.

In some examples, based on (e.g., in response to) the second sidelink transmission (transmitted by the second UE) being outside a COT initiated by the first UE, the first UE may determine (e.g., set and/or generate) the LBT type/CP extension information to correspond to (e.g., to be indicative of) long LBT and/or to correspond to (e.g., to be indicative of) being with CP extension or being without CP extension (and/or the first UE may indicate the LBT type/CP extension information as corresponding to long LBT and/or as corresponding to being with CP extension or being without CP extension). In an example, based on (e.g., in response to) the second sidelink transmission (transmitted by the second UE) being outside a COT initiated by the first UE, the first UE may determine (e.g., set and/or generate) the LBT type/CP extension information to correspond to (e.g., to be indicative of) long LBT and/or to correspond to (e.g., to be indicative of) being without CP extension (and/or the first UE may indicate the LBT type/CP extension information as corresponding to long LBT and/or as corresponding to being without CP extension). In some examples, based on (e.g., in response to) the second sidelink transmission (transmitted by the second UE) being outside a COT initiated by the first UE, the first UE may determine (e.g., set and/or generate) the LBT type/CP extension information to correspond to (e.g., to be indicative of) "no COT sharing" or "outside COT" (and/or the first UE may indicate the LBT type/CP extension information as corresponding to "no COT sharing" or "outside COT"). The second UE may determine to perform long LBT based on the indication of "no COT sharing" or the indication of "outside COT" (in the LBT type/CP extension information, for example).

In some examples, based on (e.g., in response to) the second sidelink transmission (transmitted by the second UE) being inside a COT initiated by the first UE, the first UE may determine (e.g., set and/or generate) the LBT type/CP extension information to correspond to (e.g., to be indicative of) short LBT and/or to correspond to (e.g., to be indicative of) being with CP extension or being without CP extension (and/or the first UE may indicate the LBT type/CP extension information as corresponding to short LBT and/or as corresponding to being with CP extension or being without CP extension). In an example, based on (e.g., in response to) the second sidelink transmission (transmitted by the second UE) being inside a COT initiated by the first UE, the first UE may determine (e.g., set and/or generate) the LBT type/CP extension information to correspond to (e.g., to be indicative of) short LBT and/or to correspond to (e.g., to be indicative of) being with CP extension (and/or the first UE may indicate the LBT type/CP extension information as corresponding to short LBT and/or as corresponding to being with CP extension). In some examples, based on (e.g., in response to) the second sidelink transmission (transmitted by the second UE) being inside a COT initiated by the first UE, the first UE may determine (e.g., set and/or generate) the LBT type/CP extension information to correspond to (e.g., to be indicative of) "COT sharing" or "inside COT" (and/or the first UE may indicate the LBT type/CP extension information as corresponding to "COT sharing" or "inside COT"). The second UE may determine to perform short LBT based on the indication of "COT sharing" or the indication of "inside COT" (in the LBT type/CP extension information, for example).

In some examples, based on (e.g., in response to) structure of the COT initiated by the first UE comprising at least one gap (e.g., at least one pause), the first UE may determine (e.g., set and/or generate) the LBT type/CP extension information to correspond to (e.g., to be indicative of) long LBT and/or to correspond to (e.g., to be indicative of) being with CP extension or being without CP extension (and/or the first UE may indicate the LBT type/CP extension information as corresponding to long LBT and/or as corresponding to being with CP extension or being without CP extension). In some examples, the gap (e.g., the pause) is between the first sidelink transmission and the second sidelink transmission in time domain. In some examples, the gap (e.g., the pause) may comprise one or more symbols (e.g., one or more consecutive symbols). In some examples, the one or more symbols (e.g., the one or more consecutive symbols) may be larger than a threshold (e.g., a number of symbols of the one or more symbols may be larger than the threshold and/or a length of the one or more symbols may be larger than the threshold. In some examples, the one or more symbols may be associated with one or more DL symbols, one or more UL symbols, one or more reserved symbols, and/or one or more gap symbols. In some examples, the first sidelink transmission is associated with (e.g., is in) a first sidelink resource pool. The second sidelink transmission is associated with (e.g., is in) a second sidelink resource pool. In some examples, the one or more symbols are not associated with (e.g., do not belong to) the first sidelink resource pool or the second sidelink resource pool. In some examples, the one or more symbols are not associated with UL symbol configured by RRC signaling. Alternatively and/or additionally, based on (e.g., in response to) structure of the COT initiated by the first UE comprising at least one gap (e.g., at least one pause), the first UE may determine (e.g., set and/or generate) the LBT type/CP extension information to correspond to (e.g., to be indicative of) short LBT and/or to correspond to (e.g., to be indicative of) being with CP extension or being without CP extension (and/or the first UE may indicate the LBT type/CP extension information as corresponding to short LBT and/or as corresponding to being with CP extension or being without CP extension). In some examples, the second UE may perform LBT based on the LBT type/CP extension information. In some examples, if the gap (e.g., the pause) is sensed as idle (according to the LBT, for example), the second UE may perform the second sidelink transmission. In some examples, if the gap (e.g., the pause) is sensed as busy (according to the LBT, for example), the second UE is not allowed to perform the second sidelink transmission (e.g., the second UE is not allowed to perform the second sidelink transmission at an original transmission timing of the second sidelink transmission), and/or the second UE may perform long LBT for performing the second sidelink transmission at a later timing (e.g., the second UE may perform the second sidelink transmission at a time after the original transmission timing of the second sidelink transmission).

In some examples, based on (e.g., in response to) structure of the COT initiated by the first UE not comprising one gap (e.g., one pause), the first UE may determine (e.g., set and/or generate) the LBT type/CP extension information to correspond to (e.g., to be indicative of) short LBT and/or to correspond to (e.g., to be indicative of) being with CP extension or being without CP extension (and/or the first UE may indicate the LBT type/CP extension information as corresponding to short LBT and/or as corresponding to being with CP extension or being without CP extension). In some examples, based on (e.g., in response to) structure of the COT initiated by the first UE not comprising any gap (e.g., any pause) that comprises one or more consecutive symbols larger than a threshold (e.g., based on structure of the COT initiated by the first UE not comprising any gap and/or any pause that comprises one or more consecutive symbols having a number of symbols and/or a length larger than the threshold), the first UE may determine (e.g., set and/or generate) the LBT type/CP extension information to correspond to (e.g., to be indicative of) short LBT and/or to correspond to (e.g., to be indicative of) being with CP extension or being without CP extension (and/or the first UE may indicate the LBT type/CP extension information as corresponding to short LBT and/or as corresponding to being with CP extension or being without CP extension.

In some examples, the LBT type/CP extension information corresponding to (e.g., being indicative of) being with CP extension may correspond to the LBT type/CP extension information corresponding to (e.g., being indicative of) transmission with CP extension (e.g., the LBT type/CP extension information may be indicative of the second sidelink transmission being performed with application of CP extension).

In some examples, the LBT type/CP extension information corresponding to (e.g., being indicative of) being without CP extension may correspond to the LBT type/CP extension information corresponding to (e.g., being indicative of) transmission without CP extension (e.g., the LBT type/CP extension information may be indicative of the second sidelink transmission being performed without application of CP extension).

In some examples, the long LBT may be based on Quality of Service (QoS), priority and/or priority class associated with the second sidelink transmission or the first sidelink transmission. For example, if the second sidelink transmission is in response to the first sidelink transmission (such as where the first sidelink transmission is PSCCH and/or PSSCH and/or where the second sidelink transmission is PSFCH that is in response to the first sidelink transmission), the second UE may perform long LBT based on QoS, priority and/or priority class associated with the first sidelink transmission. Alternatively and/or additionally, if the second sidelink transmission is associated with (e.g., scheduled by) the first sidelink transmission (such as where the first sidelink transmission is PSCCH and/or PSSCH and/or where the second sidelink transmission is PSCCH and/or PSSCH), the second UE may perform long LBT based on QoS, priority and/or priority class associated with the second sidelink transmission. In an example, if there is more than one QoS associated with the second sidelink transmission (e.g., the second sidelink transmission comprises one or more logical channels with different QoSs), the QoS (associated with the second sidelink transmission) based on which the second UE performs long LBT may be the highest QoS among the different QoSs, the most important QoS among the different QoSs, and/or a QoS with the smallest priority value among the different QoSs. Alternatively and/or additionally, if there is more than one priority associated with the second sidelink transmission (e.g., the second sidelink transmission comprises one or more logical channels with different priorities), the priority (associated with the second sidelink transmission) based on which the second UE performs long LBT may be the highest priority among the different priorities, the most important priority among the different priorities, and/or a priority with the smallest priority value among the different priorities.

In some examples, if a length of the gap (e.g., the pause) is smaller than 16 microseconds (μs), the second UE may perform short LBT (e.g., type-2C channel access procedure) or may not need to perform LBT. For example, based on a determination that the length of the gap is smaller than 16 μs, the second UE may perform short LBT (e.g., type-2C channel access procedure) for the second sidelink transmission or the second UE may not perform LBT for the second sidelink transmission.

In some examples, if the length of the gap (e.g., the pause) is larger than or equal to 16 μs and smaller than 25 μs, the second UE may perform short LBT (e.g., type-2B channel access procedure). For example, based on a determination that the length of the gap is larger than or equal to 16 μs and smaller than 25 μs, the second UE may perform short LBT (e.g., type-2B channel access procedure) for the second sidelink transmission.

In some examples, if the length of the gap (e.g., the pause) is larger than or equal to 25 μs, the second UE may perform short LBT (e.g., type-2A channel access procedure). For example, based on a determination that the length of the gap is larger than or equal to 25 μs, the second UE may perform short LBT (e.g., type-2A channel access procedure) for the second sidelink transmission.

Figure 7:
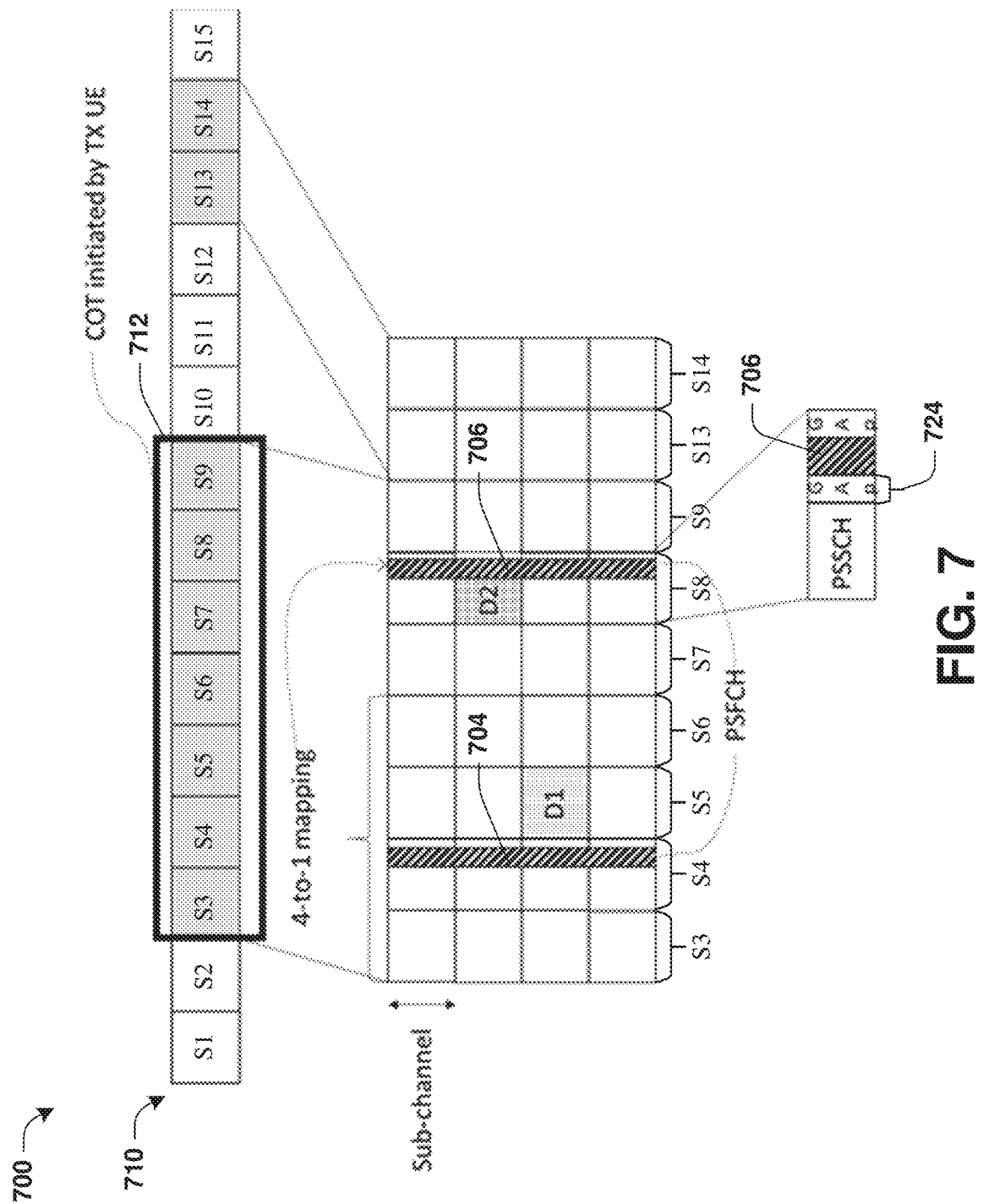
FIG. 7 is a diagram illustrating an exemplary scenario associated with sidelink slots and/or initiation of a channel occupancy time (COT) according to one exemplary embodiment.

FIG. 7 illustrates a scenario 700 associated with sidelink slots and/or initiation of a COT. Each square of a slot diagram 710 is representative of a physical slot (e.g., one physical slot) comprising DL, UL, SL, reserved, and/or gap symbols. Gray-filled squares in the slot diagram 710 are representative of slots that are associated with (e.g., that are in) one or more sidelink resource pools. For clarity, the slots shown in the slot diagram 710 are labeled S1 (Slot 1), S2 (Slot 2), . . . , S15 (Slot 15). In the example shown in FIG. 7, a periodicity of PSFCH resources in the sidelink resource pool is assumed to be 4 slots (e.g., a period of 4 slots may separate a first PSFCH resource 704 from a second PSFCH resource 706), and a time relation between 4 slots comprising PSSCH and 1 slot comprising PSFCH may have a sidelink slot offset equal to 2. In other words, the 1st through 4th slots comprising PSSCH may be associated with PSFCH (e.g., PSFCH resource 706) in the 6th sidelink slot while the 5th through 8th slots comprising PSSCH may be associated with PSFCH in the 10th sidelink slot (the 10th sidelink slot is not shown in FIG. 7). In the example shown in FIG. 7, the 1st through 4th slots comprising PSSCH correspond to slots S3~S6, wherein the 6th sidelink slot (comprising the PSFCH resource 706) corresponds to slot S8. The 1st through 4th slots comprising PSSCH may be mapped to the PSFCH in the 6th sidelink slot (via 4-to-1 mapping, for example). A first UE initiates a COT 712 comprising the 3rd through 9th slots (e.g., physical slots S3~S9), (e.g., the COT 712 comprises the 1st through 7th sidelink slots). The first UE may perform sidelink transmission D1 to a second UE in the COT 712. The first UE may perform sidelink transmission D2 to the second UE in the COT 712.

In a first example, the first UE may indicate LBT type/CP extension information along with a sidelink transmission, such as the sidelink transmission D1 and/or the sidelink transmission D2 (e.g., the sidelink transmission, such as the sidelink transmission D1 and/or the sidelink transmission D2, comprises the LBT type/CP extension information). Based on (e.g., in response to) the COT 712 comprising the 6th sidelink slot (e.g., slot S8), the first UE may indicate the LBT type/CP extension information as short LBT and no CP extension when performing sidelink transmission D1. For example, based on (e.g., in response to) the COT 712 comprising the 6th sidelink slot (e.g., slot S8), the first UE may determine (e.g., set and/or generate) the LBT type/CP extension information to correspond to (e.g., to be indicative of) short LBT and to correspond to (e.g., to be indicative of) no CP extension. Alternatively and/or additionally, based on (e.g., in response to) the COT 712 comprising the 6th sidelink slot (e.g., slot S8), the sidelink transmission D1 may comprise the LBT type/CP extension information that corresponds to (e.g., is indicative of) short LBT and corresponds to (e.g., is indicative of) no CP extension.

In a second example, the first UE may determine whether or not the first UE performs (and/or whether or not the UE can perform) a sidelink transmission between the sidelink transmission D1 and PSFCH symbols (e.g., PSFCH resource 706) in the 6th sidelink slot (e.g., slot S8). In some examples, if the first UE has sidelink transmission (e.g., any other sidelink transmission other than the sidelink transmission D1) on the 4th sidelink slot (e.g., slot S6), the 5th sidelink slot (e.g., slot S7), and/or the 6th sidelink slot (e.g., slot S8) and/or if the first UE has shared COT to the 4th, 5th, and 6th sidelink slots (e.g., slots S6~S8), the first UE may indicate the LBT type/CP extension information as short LBT and no CP extension when performing sidelink transmission D1. For example, based on (e.g., in response to) the first UE having sidelink transmission (e.g., any other sidelink transmission other than the sidelink transmission D1) on the 4th sidelink slot (e.g., slot S6), the 5th sidelink slot (e.g., slot S7), and/or the 6th sidelink slot (e.g., slot S8) and/or the first UE having shared COT to the 4th, 5th, and 6th sidelink slots (e.g., slots S6~S8), the first UE may determine (e.g., set and/or generate) the LBT type/CP extension information to correspond to (e.g., to be indicative of) short LBT and to correspond to (e.g., to be indicative of) no CP extension. Alternatively and/or additionally, based on (e.g., in response to) the first UE having sidelink transmission (e.g., any other sidelink transmission other than the sidelink transmission D1) on the 4th sidelink slot (e.g., slot S6), the 5th sidelink slot (e.g., slot S7), and/or the 6th sidelink slot (e.g., slot S8) and/or the first UE having shared COT to the 4th, 5th, and 6th sidelink slots (e.g., slots S6~S8), the sidelink transmission D1 may comprise the LBT type/CP extension information that corresponds to (e.g., is indicative of) short LBT and corresponds to (e.g., is indicative of) no CP extension. In some examples, if the first UE cannot keep the COT 712 and/or if the first UE cannot keep performing sidelink transmission in the COT 712 before PSFCH (e.g., PSFCH resource 706) in the 6th sidelink slot (e.g., slot S8), the first UE may indicate the LBT type/CP extension information based on a length of a duration (e.g., a gap, such as a pause) between D1 (e.g., one or more D1 symbols on which the sidelink transmission D1 is performed) and PSFCH (e.g., PSFCH resource 706) in the 6th sidelink slot (e.g., slot S8). For example, based on the first UE not being able to keep sidelink transmission before PSFCH (e.g., PSFCH resource 706) in the 6th sidelink slot (e.g., slot S8), the first UE may determine (e.g., set and/or generate) the LBT type/CP extension information based on the length of the duration between D1 (e.g., one or more D1 symbols on which the sidelink transmission D1 is performed) and PSFCH (e.g., PSFCH resource 706) in the 6th sidelink slot (e.g., slot S8). Alternatively, if the first UE cannot keep sidelink transmission before PSFCH (e.g., PSFCH resource 706) in the 6th sidelink slot (e.g., slot S8), the first UE may indicate (and/or determine) the LBT type/CP extension information based on a length of a duration (e.g., a gap, such as a pause) between a last symbol or slot in which the first UE can control and/or transmit and PSFCH (g., PSFCH resource 706) in the 6th sidelink slot (e.g., slot S8). For example, if the first UE transmits PSSCH D2 in the 6th sidelink slot (e.g., slot S8), the first UE may indicate (and/or determine) the LBT type/CP extension information based on a length of a gap 724 between PSSCH D2 and PSFCH (e.g., PSFCH resource 706) in the 6th sidelink slot. The first UE may indicate (and/or determine) the LBT type/CP extension information based on a length of a gap between PSSCH D1 and PSSCH D2 and a length of the gap 724 between PSSCH D2 and PSFCH (e.g., PSFCH resource 706) in the 6th sidelink slot (e.g., slot S8). For example, a length of the gap 725 may be 1 symbol depending on numerology and/or subcarrier spacing (SCS) of 1 symbol, the 1 symbol may correspond to 73 µs according to SCS of 15 kHz, 35 µs according to SCS of 30 kHz, 17 µs according to SCS of 60 kHz). The first UE may indicate short LBT and no CP extension to the second UE (e.g., the first UE may transmit, to the second UE, the LBT type/CP extension information that is indicative of short LBT and is indicative of no CP extension). Alternatively and/or additionally, if the UE does not perform sidelink transmission (before the PSFCH, such as the PSFCH resource 706) on the 6th sidelink slot (e.g., slot S8), the length of the gap before the PSFCH in the 6th slot may increase. According to the length of the gap, the first UE may determine the LBT type/CP extension information along with D1 (e.g., the sidelink transmission D1) sent to the second UE.

In a third example, the first UE may indicate, to the second UE, LBT type/CP extension information as long LBT with or without CP extension. For example, the first UE may determine (e.g., set and/or generate) the LBT type/CP extension information to correspond to (e.g., to be indicative of) long LBT and to correspond to (e.g., to be indicative of) being with CP extension or without CP extension, and/or the UE may transmit the LBT type/CP extension information to the second UE. The first UE may indicate the LBT type/CP extension information (as long LBT with or without CP extension) to the second UE since the PSFCH that is in response to D2 (e.g., sidelink transmission D2) is located in the 10th sidelink slot (e.g., a sidelink slot that is after slot S15) which is outside the COT 712 of the first UE where the 10th sidelink slot, the PSFCH that is in response to D2 and/or the COT 712 cannot be controlled by the first UE, for example).

In some examples, the first UE may initiate a COT, wherein a length of the COT is min{a number of consecutive slot (e.g., consecutive physical slots) associated with a sidelink resource pool, a maximum time associated with a CAPC} (e.g., the length of the COT corresponds to a minimum length of: (i) a first length corresponding to the number of consecutive slots associated with the sidelink resource pool; and (ii) a second length corresponding to the maximum time associated with the CAPC). In an example shown in a slot diagram 810 in FIG. 8, the 6th and 7th physical slot (e.g., slots S6 and S7) are two consecutive slots available for sidelink (associated with a sidelink resource pool, for example). In the example, if the first UE initiates a COT from the beginning of the 6th slot (e.g., slot S6), a maximum length of the COT may be 2 slots.

Figure 8:
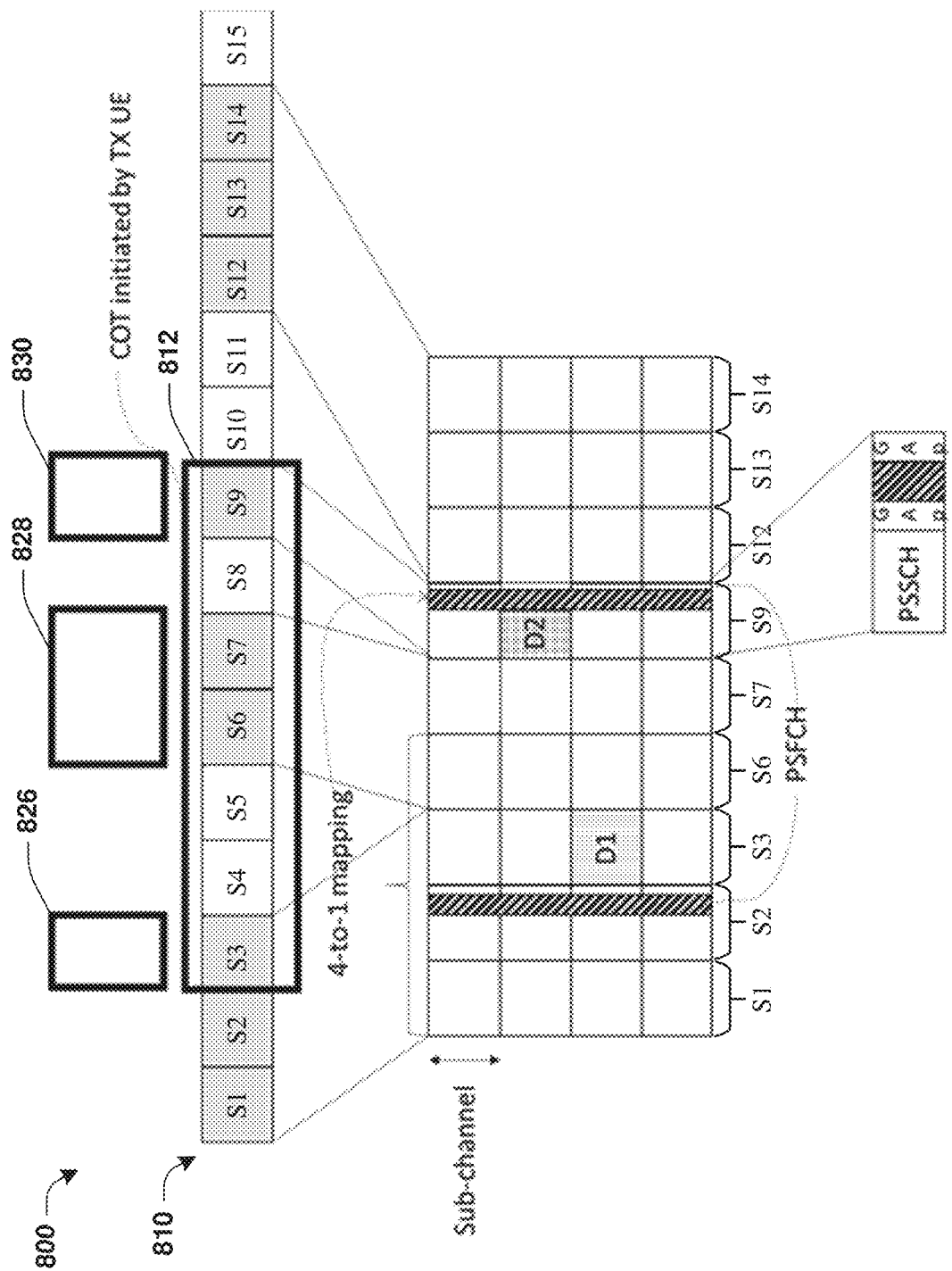
FIG. 8 is a diagram illustrating an exemplary scenario associated with sidelink slots and/or initiation of a COT according to one exemplary embodiment.

FIG. 8 illustrates a scenario 800 associated with sidelink slots and/or initiation of a COT. Each square of the slot diagram 810 is representative of a physical slot (e.g., one physical slot) comprising DL, UL, SL, reserved, and/or gap symbols. Gray-filled squares in the slot diagram 810 are representative of slots that are associated with (e.g., that are in) one or more sidelink resource pools. For clarity, the slots shown in the slot diagram 810 are labeled S1 (Slot 1), S2 (Slot 2), . . . , S15 (Slot 15). A first UE initiates a COT 812 comprising the 3rd through 9th slots (e.g., physical slots S3~S9). Sidelink slots in the COT 812 may not be contiguous (e.g., slots S4, S5 and S8 in the COT 812 may not be associated with sidelink and/or may separate sidelink slots in the COT 812). The first UE may perform sidelink transmission D1 to a second UE in the COT 812. The first UE may perform sidelink transmission D2 to the second UE in the COT 812. In an example, in the scenario 800 shown in FIG. 8, based on (e.g., in response to) the COT structure (e.g., structure of the COT 812) comprising a gap (e.g., a pause), the first UE may indicate LBT type/CP extension information as long LBT and with or without CP extension. For example, based on (e.g., in response to) the COT structure comprising a gap (e.g., a pause), the first UE may determine (e.g., set and/or generate) the LBT type/CP extension information to correspond to (e.g., to be indicative of) long LBT and to correspond to (e.g., to be indicative of) being with CP extension or without CP extension (and/or the UE may transmit the LBT type/CP extension information to the second UE). In some examples, in the scenario 800 shown in FIG. 8, based on (e.g., in response to) the 6th sidelink slot being in the COT 812, the first UE may indicate LBT type/CP extension information as short LBT without CP extension. For example, based on (e.g., in response to) the 6th sidelink slot being in the COT 812, the first UE may determine (e.g., set and/or generate) the LBT type/CP extension information to correspond to (e.g., to be indicative of) short LBT and to correspond to (e.g., to be indicative of) being without CP extension (and/or the UE may transmit the LBT type/CP extension information to the second UE). In some examples, for D2 (e.g., sidelink transmission D2), based on (e.g., in response to) the 10th sidelink slot (not shown in FIG. 8) being outside the COT 812, the first UE may indicate LBT type/CP extension information as long LBT and with or without CP extension.

Alternatively and/or additionally, according to contiguous sidelink slots, the first UE may perform long LBT for each contiguous set of sidelink slots. In an example, in the scenario 800 shown in FIG. 8, if the first UE may perform successful LBT for the 3rd slot, 6th slot, and 9th slot (of physical slots) (e.g., slots S3, S6 and S9), the first UE may have three COTs, respectively, comprising a first COT 826 (comprising slot S3 associated with sidelink, for example), a second COT 828 (comprising slots S6 and S7 associated with sidelink, for example) and a third COT 830 (comprising slot S9 associated with sidelink, for example). When the first UE performs sidelink transmission D1 to a second UE in the first COT 826, the first UE may not know whether or not the second COT 828 and/or the third COT 830 are available. In some examples, when the first UE performs sidelink transmission (D1) to a second UE in the first COT, the first UE may expect (e.g., assume) the 6th slot (e.g., slot S6 associated with sidelink) is not in a COT.

In some examples, the first sidelink transmission is unicast, groupcast, or broadcast.

In some examples, the second sidelink transmission is unicast, groupcast, or broadcast.

In some examples, the first sidelink transmission is with SL HARQ feedback enabled (e.g., SL HARQ feedback is enabled for the first sidelink transmission, such as where a recipient of the first sidelink transmission is configured to transmit SL HARQ feedback in response to the first sidelink transmission).

In some examples, the first sidelink transmission is with SL HARQ feedback disabled (e.g., SL HARQ feedback is disabled for the first sidelink transmission, such as where a recipient of the first sidelink transmission is not configured to transmit SL HARQ feedback in response to the first sidelink transmission).

In some examples, when the first sidelink transmission is with SL HARQ feedback disabled (e.g., when SL HARQ feedback is disabled for the first sidelink transmission, such as where a recipient of the first sidelink transmission is not configured to transmit SL HARQ feedback in response to the first sidelink transmission), the first sidelink transmission may not comprise the LBT type/CP extension information (e.g., the first sidelink transmission may comprise no field for the LBT type/CP extension information, or one or more fields for the LBT type/CP extension information may be set to one or more values, such as one or more specific values). Alternatively and/or additionally, when the first sidelink transmission is with SL HARQ feedback disabled and/or the first sidelink transmission does not trigger and/or request any report from the second UE, the first sidelink transmission may not comprise the LBT type/CP extension information (e.g. the first sidelink transmission may comprise no field for the LBT type/CP extension information, or one or more fields for the LBT type/CP extension information may be set to one or more values, such as one or more specific values). Alternatively and/or additionally, when the first sidelink transmission is with SL HARQ feedback disabled and/or the first sidelink transmission does not trigger and/or request any report from the second UE, the first sidelink transmission may comprise the LBT type/CP extension information.

In some examples, in the present disclosure, "LBT type/CP extension information" may refer to, may be used interchangeably with and/or may be replaced by "LBT type and/or CP extension".

In some examples, the first UE is associated with a group. In some examples, the group may comprise the first UE and the second UE (and/or one or more other UEs in addition to the first UE and the second UE). In some examples, in response to a UE (e.g., one UE) in the group (e.g., the first UE) accessing and/or obtaining a channel (after performing LBT successfully, such as after performing successful LBT), one or more other UEs (e.g., the second UE) in the group may share the COT (e.g., the COT 712 and/or the COT 812) initiated by the UE (e.g., the first UE) that accessed and/or obtained the channel. In some examples, the one or more other UEs in the group may perform sidelink transmission with short LBT (instead of using long LBT, for example). In some examples, in response to the first UE transmitting a groupcast sidelink transmission (e.g., a groupcast sidelink transmission that is targeted to the group) to the group (e.g., a destination ID of the groupcast sidelink transmission may be associated with the group), the one or more other UEs in the group may share the COT initiated by the first UE. In some examples, the first UE may indicate whether or not to share the COT to the group. For example, the first UE may indicate, to the one or more other UEs, whether or not the one or more other UEs share the COT via explicit signaling, such as by transmitting, to the one or more other UEs, an indication (e.g., an explicit indication) of whether or not to share the COT. In some examples, the first UE may indicate COT sharing information to the group (e.g., the first UE may transmit information, indicative of the COT sharing information, to the group). In some examples, an entry of status for COT sharing information (e.g., one entry of status for COT sharing information) may indicate no COT sharing (e.g., entry index 0). In some examples, the first UE may be a leader UE of the group. In some examples, the first UE may be a scheduler UE of the group. In some examples, the COT sharing information may be associated with a set of resources preferred to the second UE (e.g., white list preferred for the second UE performing sidelink transmission). For example, the set of resources associated with the COT sharing information may comprise resources that the second UE prefers to use for sidelink transmission (wherein the set of resources may be indicated by a white list associated with sidelink transmission of the second UE).

In some examples, when the second UE, based on the first sidelink transmission, identifies LBT type for the second sidelink transmission as short LBT, the second UE may assume COT sharing (until the end of the second sidelink transmission) from the first UE or the second UE may perform short LBT for a third sidelink transmission during a time duration between the first sidelink transmission and the second sidelink transmission. In some examples, the second UE may share the COT initiated by the first UE (e.g., the second UE may share the COT until the end of the second sidelink transmission) based on identification of LBT type corresponding to short LBT (e.g., the identification of LBT type corresponding to short LBT is based on the first sidelink transmission, for example). Alternatively and/or additionally, the second UE may perform short LBT for the third sidelink transmission (during the time duration between the first sidelink transmission and the second sidelink transmission) based on the identification of LBT type corresponding to short LBT. In some examples, the third sidelink transmission from the second UE is transmitted to the first UE (e.g., the third sidelink transmission from the second UE is restricted to being transmitted to the first UE). In some examples, the third sidelink transmission from the second UE is transmitted to the group comprising the first UE and the second UE (e.g., the third sidelink transmission from the second UE is restricted to being transmitted to the group).

Concept 2:

Concept 2 of the present disclosure is that a first UE may transmit COT sharing information to a second UE. The first UE may initiate a COT (after a successful long LBT, for example). The second UE, based on the COT sharing information, may identify the COT and/or determine (e.g., identify) information associated with the COT. Alternatively and/or additionally, the COT sharing information may be transmitted to a third UE. The third UE, based on the COT sharing information, may identify the COT and/or determine (e.g., identify) information associated with the COT. In some examples, the third UE and the second UE are UEs performing NR sidelink communication. In some examples, the second UE may have unicast connection to the first UE. The second UE may have (and/or may be included in) a group comprising the second UE and the first UE (and/or one or more other UEs in addition to the first UE and the second UE). In some examples, the third UE may not have unicast connection to the first UE. The third UE may not have (and/or may not be included in) a group comprising the third UE and the first UE.

In some examples, one, some and/or all of the techniques provided herein with respect to the second UE may be applicable to the third UE. In accordance with some embodiments, throughout the present disclosure (e.g., throughout parts of the disclosure relevant to Concept 2), one, some and/or all instances of "second UE" may be replaced with and/or used interchangeably with "third UE".

The COT sharing information may comprise: (i) whether or not to share the COT initiated by the first UE; (ii) the shared starting timing (of the COT, for example), such as a timing (e.g., a time) of a beginning of at least a portion, of the COT, that is shared between the first UE and the second UE; (iii) the shared ending timing (of the COT, for example), such as a timing (e.g., a time) of an end of at least a portion, of the COT, that is shared between the first UE and the second UE; (iv) ending position/timing (of the COT, for example), such as a position and/or a timing (e.g., a time) of an end of the COT; (v) remaining COT duration, such as duration between a current time and an end of the COT; (vi) CAPC (for the COT, for example); (vii) energy threshold (for the successful long LBT initiating the COT, for example); (viii) channel access type/LBT type that may be indicative of a channel access type/LBT type for the second UE to initiate a second COT (different than the COT) for sidelink transmission, wherein the second COT may be initiated by a long LBT; (ix) CP extension (indicating a type of CP extension for the second UE to initiate the second COT for sidelink transmission, for example); (x) channel access type/LBT type (for initiating the COT, for example); and/or (xi) CP extension (for initiating the COT, for example). In the present disclosure, the term "channel access type/LBT type" may correspond to a channel access type and/or a LBT type. In the present disclosure, the term "position/timing" may correspond to a position and/or a timing (e.g., a time).

The second UE, based on the COT sharing information, may determine (e.g., identify): (i) whether or not to share the COT initiated by the first UE; (ii) the shared starting timing (of the COT, for example); (iii) the shared ending timing (of the COT, for example); (iv) ending position/timing (of the COT, for example); (v) remaining COT duration; (vi) CAPC (for the COT, for example); (vii) energy threshold (for the successful long LBT initiating the COT, for example); (viii) channel access type/LBT type that may be indicative of a channel access type/LBT type for the second UE to initiate a second COT (different than the COT) for sidelink transmission, wherein the second COT may be initiated by a long LBT; (ix) CP extension (indicating a type of CP extension for the second UE to initiate the second COT for sidelink transmission, for example); (x) channel access type/LBT type (for initiating the COT, for example); and/or (xi) CP extension (for initiating the COT, for example).

In some examples, based on (e.g., in response to) the COT sharing information (e.g., in response to receiving the COT sharing information from the first UE), the second UE may determine whether or not the second sidelink transmission is within the COT that is initiated by the first UE (and shared to the second UE, for example).

In some examples, based on (e.g., in response to) the second sidelink transmission being within the COT shared by the first UE (and/or if the second sidelink transmission is within the COT shared by the first UE), the second UE may perform a short LBT before (and/or for) transmitting the second sidelink transmission.

In some examples, based on (e.g., in response to) the second sidelink transmission being within the remaining COT duration (and/or if the second sidelink transmission is within the remaining COT duration), the second UE may perform a short LBT before (and/or for) transmitting the second sidelink transmission.

In some examples, based on (e.g., in response to) a starting timing of the second sidelink transmission being after the shared starting timing (of the COT, for example) (and/or if the starting timing of the second sidelink transmission is after the shared starting timing), the second UE may perform a short LBT before (and/or for) transmitting the second sidelink transmission.

In some examples, based on (e.g., in response to) an ending timing of the second sidelink transmission being before the shared ending timing (of the COT, for example) (and/or if the ending timing of the second sidelink transmission is before the shared ending timing), the second UE may perform a short LBT before (and/or for) transmitting the second sidelink transmission.

In response to the second UE sensing the channel as idle according to short LBT (e.g., in response to the second UE determining that the channel is idle via sensing the channel according to short LBT), the second UE may transmit the second sidelink transmission.

In some examples, based on (e.g., in response to) at least a portion of the second sidelink transmission being outside (e.g., not being within) the COT shared by the first UE (and/or if at least a portion of the second sidelink transmission is not within the COT shared by the first UE), the second UE does not perform and/or is not allowed to perform a short LBT before (and/or for) transmitting the second sidelink transmission, and/or the second UE may perform long LBT before (and/or for) the second sidelink transmission.

In some examples, based on (e.g., in response to) at least a portion of the second sidelink transmission being outside (e.g., not being within) the remaining COT duration (and/or if at least a portion of the second sidelink transmission is not within the remaining COT duration), the second UE does not perform and/or is not allowed to perform a short LBT before (and/or for) transmitting the second sidelink transmission, and/or the second UE may perform long LBT before (and/or for) the second sidelink transmission.

In some examples, based on (e.g., in response to) a starting timing of the second sidelink transmission being before the shared starting timing (of the COT, for example) (and/or if the starting timing of the second sidelink transmission is before the shared starting timing), the second UE does not perform and/or is not allowed to perform a short LBT before (and/or for) transmitting the second sidelink transmission, and/or the second UE may perform a long LBT before (and/or for) transmitting the second sidelink transmission.

In some examples, based on (e.g., in response to) an ending timing of the second sidelink transmission being after the shared ending timing (of the COT, for example) (and/or if the ending timing of the second sidelink transmission is after the shared ending timing), the second UE does not perform and/or is not allowed to perform a short LBT before (and/or for) transmitting the second sidelink transmission, and/or the second UE may perform a long LBT before (and/or for) transmitting the second sidelink transmission.

In response to the second UE sensing the channel as idle according to long LBT (e.g., in response to the second UE determining that the channel is idle via sensing the channel according to long LBT), the second UE may transmit the second sidelink transmission.

In some examples, based on (e.g., in response to) the COT sharing information (e.g., in response to receiving the COT sharing information from the first UE), the second UE may determine which kind of data may be included in the second sidelink transmission.

For the second sidelink transmission within the COT, the second UE may include data, Logical Channel (LCH), radio bearers and/or MAC CE in the second sidelink transmission.

In an example, such as in a scenario in which the second UE senses the channel as idle according to short LBT), for the second sidelink transmission within the COT (e.g., the COT shared by the first UE), the second UE may include data, LCH, radio bearers and/or MAC CE associated with (e.g., targeted to) the first UE (and/or one or more other UEs in addition to the first UE). For example, the data, the LCH, the radio bearers and/or the MAC CE associated with (e.g., targeted to) the first UE may be included in the second sidelink transmission within the COT.

In an example, such as in a scenario in which the second UE senses the channel as idle according to short LBT), for the second sidelink transmission within the COT (e.g., the COT shared by the first UE), the second UE may include data, LCH, radio bearers and/or MAC CE associated with (e.g., targeted to) a group comprising the first UE and the second UE (and/or comprising one or more other UEs other than the first UE and the second UE). For example, the data, the LCH, the radio bearers and/or the MAC CE associated with (e.g., targeted to) the group may be included in the second sidelink transmission within the COT.

In some examples, the second UE may include, in the second sidelink transmission, data, LCH, radio bearers, and/or MAC CE with 5G QoS Identifier (5QI) value associated with a CAPC value that is the same as or higher than a CAPC value (e.g., a specific CAPC value) associated with a COT. For example, the second UE may include the data, the LCH, the radio bearers and/or the MAC CE (with 5QI value associated with the same CAPC value or associated with CAP with higher value) in the second sidelink transmission based on (e.g., in response to) the second sidelink transmission being within the COT.

In some examples, the second UE may include, in the second sidelink transmission, data, LCH, radio bearers, and/or MAC CE with 5QI value associated with a CAPC value that is the same as or lower than a CAPC value (e.g., a specific CAPC value) associated with a COT. For example, the second UE may include the data, the LCH, the radio bearers and/or the MAC CE (with 5QI value associated with the same CAPC value or associated with CAP with lower value) in the second sidelink transmission based on (e.g., in response to) the second sidelink transmission being within the COT.

In some examples, for data, LCH, radio bearers, and/or MAC CE with 5QI value associated with a CAPC value that is different than and/or lower than a CAPC value (e.g., a specific CAPC value) associated with a COT, the second UE does not include and/or is not allowed to include the data, the LCH, the radio bearers and/or the MAC CE in the second sidelink transmission (that is transmitted in the COT initiated by the first UE, for example).

In response to the COT sharing information (e.g., in response to receiving the COT sharing information from the first UE), the second UE may determine a limitation of sidelink transmit power for sidelink transmission (e.g. the second sidelink transmission) in the shared COT (e.g., the COT, initiated by the first UE, that is shared with the second UE). In some examples, the second sidelink transmission may be performed based upon the limitation of sidelink transmit power (e.g., a transmit power with which the second sidelink transmission is performed may be based upon the limitation of sidelink transmit power). In some examples, a rationale (for determining and/or applying the limitation of sidelink transmit power) is to avoid excessive interference to one or more neighboring devices. In some examples, the second UE may determine sidelink transmission power (for the second sidelink transmission, for example) based on (e.g., equal to) a power value equal to min{a first derived sidelink transmit power, a first maximum sidelink transmit power, a second maximum sidelink transmit power} (e.g., the sidelink transmit power is based on the minimum power of: (i) the first derived sidelink transmit power; (ii) the first maximum sidelink transmit power; and (iii) the second maximum sidelink transmit power).

In some examples, the first derived sidelink transmit power is based on target received power ($P_{0,D}$, or $P_{0,S}$), number of PRBs, DL pathloss ($PL_D$), DL pathloss compensation ($\alpha D$), SL pathloss ($PL_S$), and/or SL pathloss compensation ($\alpha S$). In some examples, the first maximum sidelink transmit power is a maximum transmit power ($P_{CMAX}$) of the second UE (and/or the first maximum sidelink transmit power is associated with, such as based on, the maximum transmit power ($P_{CMAX}$) of the second UE). In some examples, the second maximum sidelink transmit power is provided by the COT sharing information (e.g., which is derived from energy threshold) and/or the second maximum sidelink transmit power is associated with the COT sharing information. In some examples, the second maximum sidelink transmit power is determined based on (e.g., derived from) the COT sharing information (e.g., the second maximum sidelink transmit power may be determined based on the energy threshold). In some examples, the COT sharing information is indicative of the energy threshold.

In an example, the first UE indicates the energy threshold as −60 decibels per milliwatt (dBm) (i.e., negative 60 dBm) in the COT sharing information to the second UE (e.g., the first UE may generate the COT sharing information to be indicative of the energy threshold being 60 dBm, and/or the UE may transmit the COT sharing information to the second UE). The second UE may determine (e.g., identify) an energy level with which the first UE accesses the channel. In some examples, the energy threshold is an energy detection threshold. Based on (e.g., in response to) the energy detection threshold (e.g., in response to receiving the COT sharing information indicative of the energy detection threshold), the second UE may determine a sidelink transmission power, for sidelink transmission, that is under −60 dbm (e.g., the energy detection threshold) (e.g., the second UE may determine and/or use the sidelink transmission power when performing sidelink transmission within the shared COT). In some examples, based on (e.g., in response to) the energy detection threshold (e.g., in response to receiving the COT sharing information indicative of the energy detection threshold), the second UE may determine (e.g., derive) a maximum sidelink transmit power (e.g. the second maximum sidelink transmit power) based on the energy detection threshold. In an example, the indicated energy detection threshold is $X_{Thresh}$ and a bandwidth of the second sidelink transmission is $M_{BW}$. In some examples, the maximum sidelink transmit power may be $(-72+23-X_{Thresh})$ dBm/20 megahertz (MHz). In some examples, the maximum sidelink transmit power may be $(-72+23-X_{Thresh}+10 \cdot \log_{10}(M_{BW}$ MHz/20 MHz$))$ dBm. In some examples, the maximum sidelink transmit power may be $(T_{value}-X_{Thresh}+10 \cdot \log_{10}(M_{BW}$ MHz/20 MHz$))$ dBm, wherein $T_{value}$ is a value (e.g., a specific and/or fixed value) and/or a value derived and/or defined by regulatory requirements in decibels (dB) or dBm.

In response to the COT sharing information (e.g., in response to receiving the COT sharing information from the first UE), the second UE may determine a channel access type/LBT type and/or CP extension before (and/or for) the second sidelink transmission. For example, in response to the COT sharing information (e.g., in response to receiving the COT sharing information from the first UE), the second UE may determine, before (and/or for) the second sidelink transmission, which channel access type/LBT type and/or CP extension is indicated by the COT sharing information and/or is to be used for the second sidelink transmission.

In some examples, the second sidelink transmission comprises data transmitted to the first UE (and/or the second sidelink transmission comprises other content in addition to the data). In some examples, the data (and/or the other content in addition to the data) may be included in the second sidelink transmission if the second UE senses the channel, for the second sidelink transmission, as idle according to short LBT in response to the COT sharing information.

In some examples, the second sidelink transmission comprises one or more logical channels targeted to the first UE (and/or the second sidelink transmission comprises other content in addition to the one or more logical channels). In some examples, the one or more logical channels (and/or the other content in addition to the one or more logical channels) may be included in the second sidelink transmission if the second UE senses the channel, for the second sidelink transmission, as idle according to short LBT in response to the COT sharing information.

In some examples, the second sidelink transmission comprises one or more logical channels targeted to a group comprising the first UE and the second UE (and/or the second sidelink transmission comprises other content in addition to the one or more logical channels). In some examples, the one or more logical channels (and/or the other content in addition to the one or more logical channels) may be included in the second sidelink transmission if the second UE senses the channel, for the second sidelink transmission, as idle according to short LBT in response to the COT sharing information.

In some examples, the second sidelink transmission is not allowed to be transmitted to a destination UE that is different than the first UE and/or that is not a UE of the group.

Alternatively and/or additionally, the second UE may not include data, LCH, radio bearers and/or MAC CE, that are not associated with (and/or not transmitted to) at least the first UE and/or the group (comprising the first UE and the second UE), in the second sidelink transmission within the COT (shared by the first UE). For example, data, LCH, radio bearers and/or MAC CE may not be included in the second sidelink transmission within the COT (shared by the first UE) based upon a determination that the data, the LCH, the radio bearers and/or the MAC CE are not associated with (and/or not transmitted to) at least the first UE and/or the group (comprising the first UE and the second UE)

In some examples, for sidelink transmission (e.g., a sidelink transmission by the second UE) during the COT initiated and/or shared by the first UE, the second UE may prioritize one or more logical channels that have a destination associated with (e.g., a destination that is to) the first UE and/or the group (comprising the first UE and the second UE). In some examples, for a sidelink transmission (e.g., a sidelink transmission by the second UE) occurring in a COT initiated and/or shared by the first UE, the second UE may select a destination from one or more destinations, where the one or more destinations have SL data and/or MAC CE available for transmission (and/or the one or more destinations satisfy one or more destination selection conditions, such as destination selection condition discussed in 3GPP TS 38.321 V16.5.0) and the one or more destinations are associated with the first UE or the group. In some examples, the one or more destinations may not comprise a destination that is not associated with the first UE and/or the group. Alternatively and/or additionally, the second UE may select a third destination, that is not associated with the first UE and/or is not associated with the group, for the sidelink transmission if (e.g., when and/or based on a determination that) no SL data or MAC CE is available for destinations associated with the first UE and/or the group (e.g., no SL data or MAC CE is available for all destinations associated with the first UE and/or the group).

Alternatively and/or additionally, for a sidelink transmission that occurs in a timing that is within both a first COT shared by a first UE and a second COT shared by a third UE, the second UE may select a destination from one or more destinations that are associated with the first UE, the group and/or the third UE (e.g., the one or more destinations may have SL data available for transmission). For example, the destination may be selected as a destination of the sidelink transmission (that occurs in the first COT shared by the first UE and the second COT shared by the third UE).

In the present disclosure, the term "timing" may correspond to at least one of a time, a time period, a time unit, a slot, a symbol, etc.

In an example with respect to the scenario 700 of FIG. 7, a first UE initiates a COT 712 comprising the 3rd through 9th slots (e.g., physical slots S3~S9), (e.g., the COT 712 comprises the 1st through 7th sidelink slots), and a second UE receives a COT sharing information (e.g., COT sharing information associated with the COT 712) from the first UE. The COT sharing information may indicate that the second UE may use 4th through 7th sidelink slots (e.g., the COT sharing information may comprise information associated with the second UE using the 4th through 7th sidelink slots). In a first example, for a sidelink transmission transmitted by the second UE in a slot (e.g., one slot) of 4th through 7th sidelink slots (e.g., slots S6~S9) (e.g., the sidelink transmission may be transmitted by the second UE according to short LBT), the second UE may prioritize LCH that is associated with (e.g., that is targeted to) the first UE for transmission, and/or the second UE may include data and/or LCH associated with (e.g., targeted to) the first UE in the sidelink transmission. In a second example, the second UE performs long LBT successfully for accessing the channel for the 8th sidelink slot and the 9th sidelink slot (e.g., slots S13 and S14). The second UE may perform sidelink transmission comprising prioritized data and/or LCH. In some examples, the second UE does not prioritize data or LCH for a given UE (e.g., destination UE) (e.g., the second UE does not prioritize data or LCH for the given UE for the sidelink transmission in a shared COT, such as the COT 712 initiated by the first UE). In some examples, if Logical Channel Prioritization (LCP) procedure is performed before determining to use shared COT initiated by the first UE, the second UE does not prioritize data and/or LCH associated with (e.g., data and/or LCH targeted to) the first UE. In some examples, if LCP procedure is performed after determining to use shared COT initiated by the first UE (and if the sidelink transmission is within the shared COT, for example), the second UE may prioritize data and/or LCH associated with (e.g., targeted to) the first UE (e.g., the second UE may prioritize data and/or LCH associated with the first UE for the sidelink transmission in the shared COT).

The second UE may perform short LBT for a second sidelink transmission, wherein the second sidelink transmission is within the COT 712 of the first UE (e.g., the COT 712 initiated by the first UE). The second UE, based on the COT sharing information, may transmit the second sidelink transmission The first UE may determine which LBT is performed by the second UE, and generate corresponding LBT type/CP extension information. The first UE transmits a first sidelink transmission comprising the LBT type/CP extension information to the second UE. The second UE transmits a second sidelink transmission in response to the first sidelink transmission.

For the second sidelink transmission, the second UE may determine a channel access/LBT type (e.g., the second UE may determine which channel access/LBT type to perform for the second sidelink transmission) and/or determine whether or not to perform CP extension (e.g., the second UE may determine whether or not to perform CP extension for the second sidelink transmission), based on the COT sharing information by the first UE.

For the second sidelink transmission, the second UE may determine a channel access/LBT type (e.g., the second UE may determine which channel access/LBT type to perform for the second sidelink transmission) and/or determine whether or not to perform CP extension (e.g., the second UE may determine whether or not to perform CP extension for the second sidelink transmission), based on whether the transmission timing of the second sidelink transmission is inside the shared COT or outside of the shared COT.

In some examples, the COT sharing information is in SCI format 2-A or SCI format 2-B.

In some examples, the COT sharing information is in SCI format 2-C or SCI format 2-D.

In some examples, the COT sharing information is indicated (e.g., explicitly indicated) by SCI format 2-A or SCI format 2-B.

In some examples, the COT sharing information is indicated (e.g., explicitly indicated) by SCI format 2-C or SCI format 2-D.

In some examples, the COT sharing information is indicated by MAC CE.

In some examples, the COT sharing information is indicated by a 3rd stage SCI (e.g., SCI format 3-A).

In some examples, the COT sharing information may be carried by PSSCH, PSCCH, or PSFCH.

In some examples, the COT sharing information is common and/or broadcast to one or more UEs (e.g., one or more UEs performing NR sidelink communication) when the first device initiates the COT and/or transmits the COT sharing information for sharing the COT (e.g., first device may broadcast the COT sharing information in response to initiating the COT to share the COT with one, some and/or all of the one or more UEs).

In some examples, one or more code-points in one or more fields in SCI format 1-A may indicate whether or not SCI format 2-X comprises one or more fields indicating COT sharing information, where X=A, B, C, or D (e.g., X=A, B, C, or D may mean that SCI format 2-X corresponds to SCI format 2-A, SCI format 2-B, SCI format 2-C, or SCI format 2-D).

In some examples, there is a code-point (e.g., one code-point) in a COT sharing information field (e.g., a COT sharing information field in the SCI format 2-X, where X=A, B, C, or D) indicating "no COT sharing".

In some examples, there is a field (e.g., one field) in the COT sharing information indicating no COT sharing.

In an example with respect to table 600 shown in FIG. 6, COT sharing information may be indicated by entry index 0~M. In some examples, as shown in table 600, COT sharing information may comprise Channel Access/LBT Type, CP extension (and/or a CP extension $t_{ext}$ index, such as CP extension $t_{ext}$ index defined in clause 5.3.1 of 3GPP TS 38.211 V16.6.0), CAPC, Time offset or starting position of shared COT, ending position of shared COT, duration of shared COT, and/or energy threshold (e.g., energy detection threshold). In some examples, a COT sharing information (e.g., one COT sharing information) may be associated with (e.g., indicated by) an entry index. In an example (as shown in FIG. 6), an entry index of 0 may be indicative of COT sharing information comprising: (i) channel access/LBT type information corresponding to field A; (ii) CP extension information corresponding to field D; (iii) CAPC corresponding to field G; (iv) time offset and/or starting position of a shared COT corresponding to field J; (v) duration and/or ending position of the shared COT corresponding to field N; (vi) and/or energy threshold (e.g., energy detection threshold) corresponding to field Q. In an example (as shown in FIG. 6), an entry index of 1 may be indicative of COT sharing information comprising: (i) channel access/LBT type information corresponding to field B; (ii) CP extension information corresponding to field E; (iii) CAPC corresponding to field H; (iv) time offset and/or starting position of a shared COT corresponding to field K; (v) duration and/or ending position of the shared COT corresponding to field O; (vi) and/or energy threshold (e.g., energy detection threshold) corresponding to field R. In some examples, LBT type information (e.g., information associated with a LBT type, such as information indicative of a long LBT, short LBT and/or a more detailed type of LBT) may be indicated by fields A~C, CP extension information (e.g., information associated with a CP extension, such as information indicative of a CP extension) may be indicated by fields D~F (e.g., fields D~F may be associated with CP extension as defined in 3GPP TS 38.211 V16.6.0), CAPC may be indicated by fields G~I (e.g., G~I may be associated with a CAPC, such as one CAPC, which may be 1 to 4), time offset and/or starting position of a shared COT may be indicated by fields J~L (e.g., fields J~L may be associated with a time offset, such as one time offset), duration and/or ending position of the shared COT may be indicated by fields N~P (e.g., fields N~P may be associated with duration or ending position of shared COT), and/or energy threshold (e.g., energy detection threshold) may be indicated by fields Q~S (e.g., fields Q~S may be associated with a value, such as one value, of energy threshold, such as energy detection threshold). In some examples, based on a value (e.g., one value) of fields J~L and the timing receiving the COT sharing information (e.g., a timing in which the second UE receives the COT sharing information), the second UE may determine a starting position of shared COT initiated by the first UE. In some examples, there may be an entry (e.g., entry index 0) indicating no COT sharing.

In some examples, based on SCI format 1-A, the second UE may determine whether or not SCI format 2-X (e.g., where X=A, B, C, D, E, or F) comprises COT sharing information, and/or the second UE may determine whether or not the first UE shares its COT (e.g., whether or not the COT initiated by the first UE is shared with the second UE). An example is shown in FIG. 9 illustrating a table 900. In some examples, the table 900 shows information indicated by a field (e.g., 2nd stage SCI format field), of a SCI format 1-A, based on which the second UE may determine whether or not SCI format 2-X (e.g., where X=A, B, C, D, E, or F) comprises COT sharing information, and/or based on which the second UE may determine whether or not the COT initiated by the first UE is shared with the second UE. In the example shown in FIG. 9, a field (e.g., one field) in SCI format 1-A may have code-point associated with SCI format 2-X (e.g., where X=A, B, C, D, E, or F) with or without COT sharing information and/or with or without LBT type and/or CP extension. In the example shown in FIG. 9, if the second UE receives a SCI format 1-A indicating "00" (e.g., if the 2nd stage SCI format field of the SCI format 1-A comprises "00"), the second UE may consider no COT sharing (e.g., the second UE may determine that the COT initiated by the first UE is not shared with the second UE). This may happen (e.g., the second UE may receive the SCI format 1-A indicating "00" and/or the second UE may consider no COT sharing) due to the first UE not wanting to share the COT initiated by the first UE, due to there being no remaining COT (initiated by the first UE) to share to the second UE, due to the first UE also obtaining a COT based on short LBT, and/or based on COT sharing information of a fourth UE. Alternatively and/or additionally, in the example shown in FIG. 9, the SCI format 1-A indicating "00" (e.g., the 2nd stage SCI format field of the SCI format 1-A comprising "00") may be indicative of SCI format 2-A. Alternatively and/or additionally, in the example shown in FIG. 9, the SCI format 1-A indicating "01" (e.g., the 2nd stage SCI format field of the SCI format 1-A comprising "01") may be indicative of SCI format 2-B. Alternatively and/or additionally, in the example shown in FIG. 9, the SCI format 1-A indicating "10" (e.g., the 2nd stage SCI format field of the SCI format 1-A comprising "10") may be indicative of: (i) SCI format 2-C; (ii) SCI format 2-A with COT sharing information; and/or (iii) SCI format 2-A with LBT type/CP extension information. Alternatively and/or additionally, in the example shown in FIG. 9, the SCI format 1-A indicating "11" (e.g., the 2nd stage SCI format field of the SCI format 1-A comprising "11") may be indicative of: (i) SCI format 2-D; (ii) SCI format 2-B with COT sharing information; and/or (iii) SCI format 2-B with LBT type/CP extension information.

Concept 3:

Concept 3 of the present disclosure is that COT sharing information and LBT type/CP extension information may be separated (e.g., separated from each other). For example, the COT sharing information and the LBT type/CP extension information may be transmitted separately (e.g., the COT sharing information may be included in a first message and/or the LBT type/CP extension information may be included in a second message). Alternatively and/or additionally, the COT sharing information and the LBT type/CP extension information may be included in separate fields (e.g., one or more first fields of a first message may be used to indicate the COT sharing information and/or one or more second fields of a second message may be used to indicate the LBT type/CP extension information, wherein the first message may be the same as the second message or the first message may be different than the second message). In some examples, the separation of the COT sharing information and the LBT type/CP extension information may be based on different fields in SCI format 1-A and/or different fields in SCI format 2-X (e.g., where X=A, B, C, D, E, or F), such as where the COT sharing information is indicated by one or more first fields in the SCI format 1-A and/or the SCI format 2-X and/or the LBT type/CP extension information is indicated by one or more second fields in the SCI format 1-A and/or the SCI format 2-X, wherein the one or more first fields are separate from (e.g., different than) the one or more second fields. In some examples, the separation of the COT sharing information and the LBT type/CP extension information may be based on different stage SCI (e.g., one in SCI format 1-A and the other in SCI format 2-X, such as where X=A, B, C, D, E, or F), such as where the COT sharing information is indicated by SCI format 1-A and the LBT type/CP extension information is indicated by SCI format 2-X, or where the COT sharing information is indicated by the SCI format 2-X and the LBT type/CP extension information is indicated by the SCI format 1-A. In some examples, the separation of the COT sharing information and the LBT type/CP extension information may be based on different layer signaling (e.g., one is in SCI and the other is in MAC CE or RRC signaling), such as where the COT sharing information is indicated by SCI signaling and the LBT type/CP extension information is indicated by MAC CE signaling or RRC signaling, or where the COT sharing information is indicated by MAC CE signaling or RRC signaling and the LBT type/CP extension information is indicated by SCI signaling. A first UE may initiate a COT (after a successful long LBT, for example). The first UE may transmit a first sidelink transmission to a second UE (and/or one or more other UEs in addition to the second UE). The first sidelink transmission may indicate COT sharing information and/or LBT type/CP extension information. The second UE transmits a second sidelink transmission in response to the first sidelink transmission.

In some examples, based on the separation (e.g., the separation of the COT sharing information and the LBT type/CP extension information), the second UE may determine (e.g., know) either the COT sharing information or the LBT type/CP extension information. Alternatively, the second UE may determine (e.g., know) both the LBT type/CP extension information and the COT sharing information.

In some examples, the second UE may determine whether or not to use LBT type and/or CP extension based on whether HARQ feedback of the first sidelink transmission is enabled or disabled. In an example, if the first sidelink transmission is set as disable HARQ feedback (e.g., if HARQ feedback of the first sidelink transmission is disabled), the second UE may ignore and/or may not use LBT type/CP extension information. In an example, if the first sidelink transmission is set as disable HARQ feedback (e.g., if HARQ feedback of the first sidelink transmission is disabled), the first sidelink transmission may not indicate COT sharing information and/or may not indicate LBT type/CP extension information.

In some examples, the second UE may determine whether or not to use LBT type and/or CP extension based on whether or not the second sidelink transmission is triggered and/or requested by the first sidelink transmission. In an example, if the first sidelink transmission does not trigger and/or request the second sidelink transmission, the second UE may ignore and/or may not use LBT type/CP extension information. In an example, if the first sidelink transmission does not trigger and/or request the second sidelink transmission, the first sidelink transmission may not indicate COT sharing information and/or may not indicate LBT type/CP extension information.

Embodiments 1-2 are provided herein for separating COT sharing information and LBT type/CP extension information.

Embodiment 1

Embodiment 1 is associated with different format separation. In Embodiment 1, different 2nd stage SCI formats may be provided for separating COT sharing information and/or LBT type/CP extension information.

In some examples, with currently supported SCI format 2-A and/or SCI format 2-B, SCI format 2-A with LBT type/CP extension information may be an additional SCI format (e.g., SCI format 2-A with LBT type/CP extension information may be supported as a SCI format). In some examples, so does the SCI format 2-B with LBT type/CP extension information. For example, SCI format 2-B with LBT type/CP extension information may be supported as a SCI format.

In some examples, with currently supported SCI format 2-A and/or SCI format 2-B, SCI format 2-A with COT sharing information may be an additional SCI format (e.g., SCI format 2-A with COT sharing information may be supported as a SCI format). In some examples, so does the SCI format 2-B with COT sharing information. For example, SCI format 2-B with COT sharing information may be supported as a SCI format.

FIG. 10 illustrates a table 1000 indicative of example 2nd stage SCI formats (e.g., six possible 2nd stage SCI formats). SCI format 1-A may comprise a field (e.g., 2nd stage SCI format field shown in the table 1000) indicating which 2nd stage SCI format is to be used. For example, as shown in FIG. 10, different values of the field may be indicative of different 2nd stage SCI formats (e.g., value "000" may be indicative of SCI format 2-A, value "001" may be indicative of SCI format 2-B, etc.). With SCI format 2-C, SCI format 2-D, SCI format 2-E, and/or SCI format 2-F, the second UE may perform short LBT for the second sidelink transmission if the second sidelink transmission is within the COT initiated by the first UE. In some examples, the COT sharing information may not comprise (and/or may not need to comprise) a code-point or (and/or entry) pointing to no COT sharing. In some examples, the second UE would determine (e.g., identify) whether or not there is COT sharing based on the field indicating 2nd stage SCI format. For example, with respect to the table 1000 in FIG. 10, for SCI format 2-X, where X=A, B, C, or D, there is no COT sharing. For example, based on the field being indicative of SCI format 2-X, where X=A, B, C, or D (e.g., based on the field comprising "000", "001", "010", or "011"), the second UE may determine that there is no COT sharing and/or that the COT initiated by the first UE is not shared to the second UE. In some examples, for SCI format 2-X, where X=E or F, COT sharing information may be indicated. For example, based on the field being indicative of SCI format 2-X, where X=E or F (e.g., based on the field comprising "100", or "101"), the second UE may determine that there is COT sharing and/or that the COT initiated by the first UE is shared to the second UE.

Embodiment 2

Embodiment 2 is associated with different fields. In Embodiment 2, different fields may be provided in 1st stage and/or 2nd stage SCI format for separating COT sharing information and/or LBT type/CP extension information.

In some examples, with currently supported SCI format 2-A and/or SCI format 2-B, SCI format 2-A with COT sharing formation and LBT type/CP extension information may be an additional SCI format (e.g., SCI format 2-A with COT sharing formation and LBT type/CP extension information may be supported as a SCI format). In some examples, so does the SCI format 2-B with COT sharing formation and LBT type/CP extension information. For example, SCI format 2-B with COT sharing formation and LBT type/CP extension information may be supported as a SCI format.

FIG. 11 illustrates a table 1100 indicative of example 2nd stage SCI formats (e.g., four possible 2nd stage SCI formats). SCI format 1-A may comprise a field (e.g., 2nd stage SCI format field shown in the table 1100) indicating which 2nd stage SCI format is to be used. For example, as shown in FIG. 11, different values of the field may be indicative of different 2nd stage SCI formats (e.g., value "00" may be indicative of SCI format 2-A, value "01" may be indicative of SCI format 2-B, etc.). With SCI format 2-C and/or 2-D, the second UE may perform short LBT for the second sidelink transmission if the second sidelink transmission is within the COT initiated by the first UE. In some examples, the COT sharing information may not comprise (and/or may not need to comprise) a code-point (and/or entry) pointing to no COT sharing. Alternatively and/or additionally, the COT sharing information may comprise a code-point (and/or entry) pointing to no COT sharing. In some examples, the second UE may determine (e.g., identify) whether or not there is COT sharing based on the field, in the 1st stage SCI, indicating 2nd stage SCI format. For example, with respect to the table 1100 in FIG. 11, for SCI format 2-X, where X=A or B, there is no COT sharing. For example, based on the field being indicative of SCI format 2-X, where X=A or B (e.g., based on the field comprising "00" or "01"), the second UE may determine that there is no COT sharing and/or that the COT initiated by the first UE is not shared to the second UE. In some examples, for SCI format 2-X, where X=C or D, COT sharing information may indicate no COT sharing. For example, based on the field being indicative of SCI format 2-X, where X=C or D (e.g., based on the field comprising "10" or "11"), the second UE may determine whether or not there is COT sharing (and/or whether or not the COT initiated by the first UE is shared to the second UE) based on the COT sharing information. In some examples, LBT type/CP extension information may comprise a code-point (and/or entry) pointing to no LBT type and/or CP extension. In some examples, if (and/or when) HARQ feedback indicator in the 2nd stage SCI format indicates disable (e.g., the HARQ feedback indicator indicates that HARQ feedback of the first sidelink transmission is disabled), the first UE may set LBT type/CP extension information to the code-point (and/or entry) pointing to the no LBT type and/or CP extension (e.g., no LBT type and no CP extension). For example, based on the HARQ feedback indicator in the 2nd stage SCI format indicating disable (e.g., based on the HARQ feedback indicator indicating that HARQ feedback of the first sidelink transmission is disabled), the first UE may set LBT type/CP extension information to the code-point (and/or entry) pointing to the no LBT type and/or CP extension (e.g., no LBT type and no CP extension).

Concept 4:

Concept 4 of the present disclosure is that based on (e.g., in response to receiving) a COT sharing information for a COT initiated by a first UE, a second UE prioritizes to include and/or select data, LCH, radio bearers and/or MAC CE associated with (e.g., targeted to) the first UE in a second sidelink transmission. In some examples, in response to receiving a COT sharing information for a COT initiated by the first UE, the second UE prioritizes to include and/or select data, LCH, radio bearers and/or MAC CE associated with (e.g., targeted to) a group comprising the first UE and the second UE (and/or comprising one or more other UEs in addition to the first UE and the second UE) in a second sidelink transmission. In some examples, based on the COT sharing information, the second sidelink transmission is within the COT initiated by the first UE (e.g., based on the COT sharing information, the second UE may determine that the second sidelink transmission is within the COT and/or the second UE may perform the second sidelink transmission to be within the COT based on the COT sharing information). Alternatively and/or additionally, for selecting a destination for the second sidelink transmission, the second UE may select from one or more destinations associated with the first UE if (e.g., when and/or based on a determination that) the second sidelink transmission occurs in the COT. For example, if (e.g., when and/or based on a determination that) the second sidelink transmission occurs in the COT, the second UE may not select a destination, for the second sidelink transmission, from other destinations (other than the one or more destinations) that are not associated with the first UE. Alternatively or additionally, the second UE may select from the other destinations not associated with the first UE if (e.g., when): (i) there is no SL data available for the one or more destinations associated with the first UE; (ii) sidelink grant associated with the second sidelink transmission is not allowed (and/or does not allow) for transmitting data from LCH associated with the first UE; and/or (iii) the sidelink grant associated with the second sidelink transmission is set to HARQ feedback disabled, and the LCH associated with the one or more destinations associated with the first UE is set to HARQ feedback enabled.

Concept 5:

Concept 5 of the present disclosure is that a second UE may provide power-related information to a first UE (and/or one or more other UEs in addition to the first UE). In some examples, the power-related information may be provided based on PC5-RRC signaling. In some examples, the second UE and the first UE may exchange power-related information with each other.

Embodiment 3

In Embodiment 3, when the first UE performs LBT for accessing the channel, the first UE may determine (e.g., set) an energy threshold based on the power-related information. In some examples, the first UE transmits a first sidelink transmission to a second UE (and/or one or more other UEs in addition to the second UE). In some examples, the first UE determines (e.g., derives) a first transmit power for the first sidelink transmission. In some examples, in a scenario in which the power-related information from the second UE is not considered (for determining energy threshold, for example), the first UE may determine (e.g., set) energy threshold to be equal to the first transmit power and/or may determine (e.g., set) the energy threshold based on the first transmit power and/or a maximum transmit power of the first UE. In some examples, in a scenario in which the power-related information from the second UE is considered (for determining energy threshold, for example), the first UE may perform LBT and/or sense the channel based on the energy threshold (e.g., the energy threshold determined based on the power-related information).

In some examples, the power-related information may be a maximum transmit power of the second UE. In some examples, the power-related information may be a second transmit power for a second sidelink transmission (from the second UE, for example). In some examples, the power-related information may be DL pathloss which is between the second UE and the network. In some examples, the power-related information may be SL pathloss which is between the second UE and the first UE. In some examples, the power-related information may be a second energy threshold suggested and/or utilized by the second UE.

In some examples, if the first transmit power is larger than or equal to the second transmit power, the first UE determines (e.g., sets) the energy threshold based on the first transmit power.

In some examples, if the first transmit power is smaller than or equal to the second transmit power, the first UE determines (e.g., sets) the energy threshold based on the second transmit power or the power-related information.

In some examples, the first UE may determine (e.g., derive) a first maximum transmit power based on the power-related information.

In some examples, if the first transmit power is larger than or equal to the first maximum transmit power, the first UE determines (e.g., sets) the energy threshold based on the first transmit power.

In some examples, if the first transmit power is smaller than or equal to the first maximum transmit power, the first UE determines (e.g., sets) the energy threshold based on the first maximum transmit power and/or the power-related information.

In some examples, a second energy threshold determined based on (e.g., derived and/or obtained from) the power-related information is $X_{Thresh2}$ and bandwidth of the first sidelink transmission from the first UE is $M_{BW1}$. In some examples, the first maximum sidelink transmit power may be $(-72+23-X_{Thresh2})$ dBm/20 MHz. In some examples, the first maximum sidelink transmit power may be $(-72+23-X_{Thresh2}+10 \cdot \log_{10}(M_{BW1} \text{ MHz}/20 \text{ MHz}))$ dBm. In some examples, the first maximum sidelink transmit power may be $(T_{value}-X_{Thresh2}+10 \cdot \log_{10}(M_{BW1} \text{ MHz}/20 \text{ MHz}))$ dBm, wherein T value may be a specific and/or fixed value and/or a value derived and/or defined by regulatory requirements in dB or dBm.

Embodiment 4

In Embodiment 4, the first UE may receive a power-related information from the second UE. The first UE may determine whether or not to share a COT to the second UE based on the power-related information and/or an energy threshold associated with LBT for initiating the COT. In some examples, if a second sidelink transmit power determined based on (e.g., derived and/or obtained from) the power-related information may provide energy larger than the energy threshold, the first UE does not share the COT to the second UE. Alternatively and/or additionally, if a second sidelink transmit power determined based on (e.g., derived and/or obtained from) the power-related information may provide energy larger than the energy threshold, the first UE shares the COT to the second UE and/or provides the energy threshold (for initiating the COT) to the second UE. In some examples, if a second energy threshold determined based on (e.g., derived and/or obtained from) the power-related information is larger than the energy threshold, the first UE does not share the COT to the second UE. Alternatively and/or additionally, if a second energy threshold determined based on (e.g., derived and/or obtained from) the power-related information is larger than the energy threshold, the first UE shares the COT to the second UE and/or provides the energy threshold (for initiating the COT) to the second UE.

In some examples, the first UE transmits a first sidelink transmission to the second UE (and/or one or more other UEs in addition to the second UE), wherein the first sidelink transmission comprises information associated with the energy threshold for initiating the COT (e.g., the first sidelink transmission comprises information indicative of the energy threshold for initiating the COT). In some examples, the first UE determines (e.g., derives) a first transmit power for the first sidelink transmission.

The second UE may determine a transmit power (of the second UE) for a sidelink transmission limited (e.g., bounded) by the energy threshold (if the sidelink transmission is within the COT initiated by the first UE, for example). For example, a transmit power for a sidelink transmission may be at most equal to a value that is based on (e.g., equal to) the energy threshold if the sidelink transmission is within the COT initiated by the first UE. In some examples, the second UE may determine (e.g., derive) a second maximum transmit power based on the energy threshold. The second UE may determine a transmit power (of the second UE) for a sidelink transmission limited (e.g., bounded) by the second maximum transmit power (if the sidelink transmission is within the COT initiated by the first UE, for example). For example, a transmit power for a sidelink transmission may be at most equal to a value that is based on (e.g., equal to) the second maximum transmit power if the sidelink transmission is within the COT initiated by the first UE.

In some examples, if a transmit power derived from the power-related information is smaller than power associated with the energy threshold, the first UE may not provide the energy threshold to the second UE. In some examples, if a transmit power derived from the power-related information (e.g. with respect to bandwidth of the first sidelink transmission) is smaller than a power value determined based on (e.g., derived from) the energy threshold (e.g. with respect to bandwidth of the first sidelink transmission), the first UE may not provide the energy threshold to the second UE. In some examples, if a second energy threshold determined based on (e.g., derived from) the power-related information is smaller than the energy threshold, the first UE may not provide the energy threshold to the second UE.

In some examples, the energy threshold is $X_{Thresh1}$ and bandwidth of a sidelink transmission from the second UE is $M_{BW2}$. In some examples, the second maximum sidelink transmit power may be $(-72+23-X_{Thresh1})$ dBm/20 MHz. In some examples, the second maximum sidelink transmit power may be $(-72+23-X_{Thresh1}+10 \cdot \log_{10}(MBW2 \text{ MHz}/20 \text{ MHz}))$ dBm. In some examples, the second maximum sidelink transmit power may be $(T_{value}-X_{Thresh1}+10 \cdot \log_{10}(MBW2 \text{ MHz}/20 \text{ MHz}))$ dBm, wherein T value may be a specific and/or fixed value and/or a value derived and/or defined by regulatory requirements in dB or dBm.

In some examples, the power-related information may be maximum transmit power of the second UE. In some examples, the power-related information may be a second transmit power for a second sidelink transmission (from the second UE, for example). In some examples, the power-related information may be DL pathloss which is between the second UE and the network. In some examples, the power-related information may be SL pathloss which is between the second UE and the first UE. In some examples, the power-related information may be a second energy threshold suggested/utilized by the second UE.

Embodiment 5

In Embodiment 5, without obtaining the power-related information, a first UE may share a COT to a second UE and may provide an energy threshold (for initiating the COT) to the second UE. The second UE may determine a transmit power (of the second UE) for a sidelink transmission limited (e.g., bounded) by the energy threshold (if the sidelink transmission is within the COT initiated by the first UE, for example). For example, a transmit power (of the second UE) for a sidelink transmission may be at most equal to a value that is based on (e.g., equal to) the energy threshold if the sidelink transmission is within the COT initiated by the first UE. The second UE may determine a transmit power (of the second UE) for a sidelink transmission limited (e.g., bounded) by a second maximum transmit power, wherein the second maximum transmit power is determined based on (e.g., derived from) the energy threshold (if the sidelink transmission from the second UE is within the COT initiated by the first UE, for example). For example, a transmit power for a sidelink transmission (of the second UE) may be at most equal to a value that is based on (e.g., equal to) the second maximum transmit power, wherein the second maximum transmit power is based on the energy threshold if the sidelink transmission is within the COT initiated by the first UE. In some examples, the energy threshold may be indicated in COT sharing information provided by the first UE.

Embodiment 6

In Embodiment 6, (e.g., without exchanging the power-related information), a second UE may initiate (e.g., trigger)

a power report when the second UE detects transmit power change (e.g., sidelink transmit power change), DL pathloss change, and/or SL pathloss change larger than a change_threshold. For example, the second UE may initiate the power report in response to determining (e.g., detecting) that the transmit power change, the DL pathloss change and/or the SL pathloss change are larger than the change_threshold. In some examples, the second UE transmits a second sidelink transmission to the first UE, wherein the second sidelink transmission comprises the power report. In some examples, the second UE may perform long LBT for accessing the channel (for transmitting the second sidelink transmission, for example).

In some examples, there may be multiple change_thresholds, wherein each change_threshold of the multiple change_thresholds may be respectively associated with transmit power change (e.g., sidelink transmit power change), DL pathloss change, or SL pathloss.

In some examples, the sidelink transmit power change is determined based on (e.g., derived from) one or more sidelink transmissions from the second UE to the first UE.

In some examples, based on the power report, the first UE may determine (e.g., know) a latest power-related information from the second UE.

In some examples, the first UE may determine (e.g., set) energy threshold based on the power report.

In some examples, the first UE has a unicast link and/or unicast connection to the second UE.

In some examples, the first UE may have PC5-RRC connection with the second UE.

In some examples, the SL pathloss is determined (e.g., derived) for the unicast link and/or unicast connection between the second UE and the first UE. In some examples, the SL pathloss is determined (e.g., derived) for the unicast link/connection from the first UE to the second UE.

In some examples, the change_threshold may be 1, 2, . . . or 10 dB.

In some examples, the power report may be a sidelink Power Headroom Report (PHR).

In some examples, the power report may comprise: (i) a derived transmit power for sidelink transmission from the second UE; (ii) a difference (with quantization level/step, for example) between the second UE's maximum transmit power and a derived transmit power for sidelink transmission from the second UE (to the first UE, for example), wherein the difference may be positive or negative; (iii) maximum sidelink transmit power derived from DL pathloss; (iv) maximum sidelink transmit power derived from SL pathloss; and/or (v) min{maximum sidelink transmit power derived from DL pathloss, maximum sidelink transmit power derived from SL pathloss} (e.g., minimum power of: (i) the maximum sidelink transmit power derived from DL pathloss; and (ii) the maximum sidelink transmit power derived from SL pathloss).

In some examples, pathloss is determined (e.g., derived) based on L3-RSRP (Layer 3-RSRP).

In an example, the first UE may receive and/or maintain power-related information indicative of 5 dBm from the second UE. The second UE may transmit a power report due to a transmit power change of the second UE being larger than (or equal to) a change_threshold (e.g., the change_threshold may be 3 dB). In an example, the second UE may perform sidelink transmission to the first UE with 8 dBm (e.g., 8 dBm=5 dBm+3 dB). When the first UE shares its initiated COT to the second UE, an energy threshold for LBT (performed by the first UE to initiate a COT, for example) may need to be updated based on the power report (e.g., the power report is indicative of 8 dBm).

Figure 12:
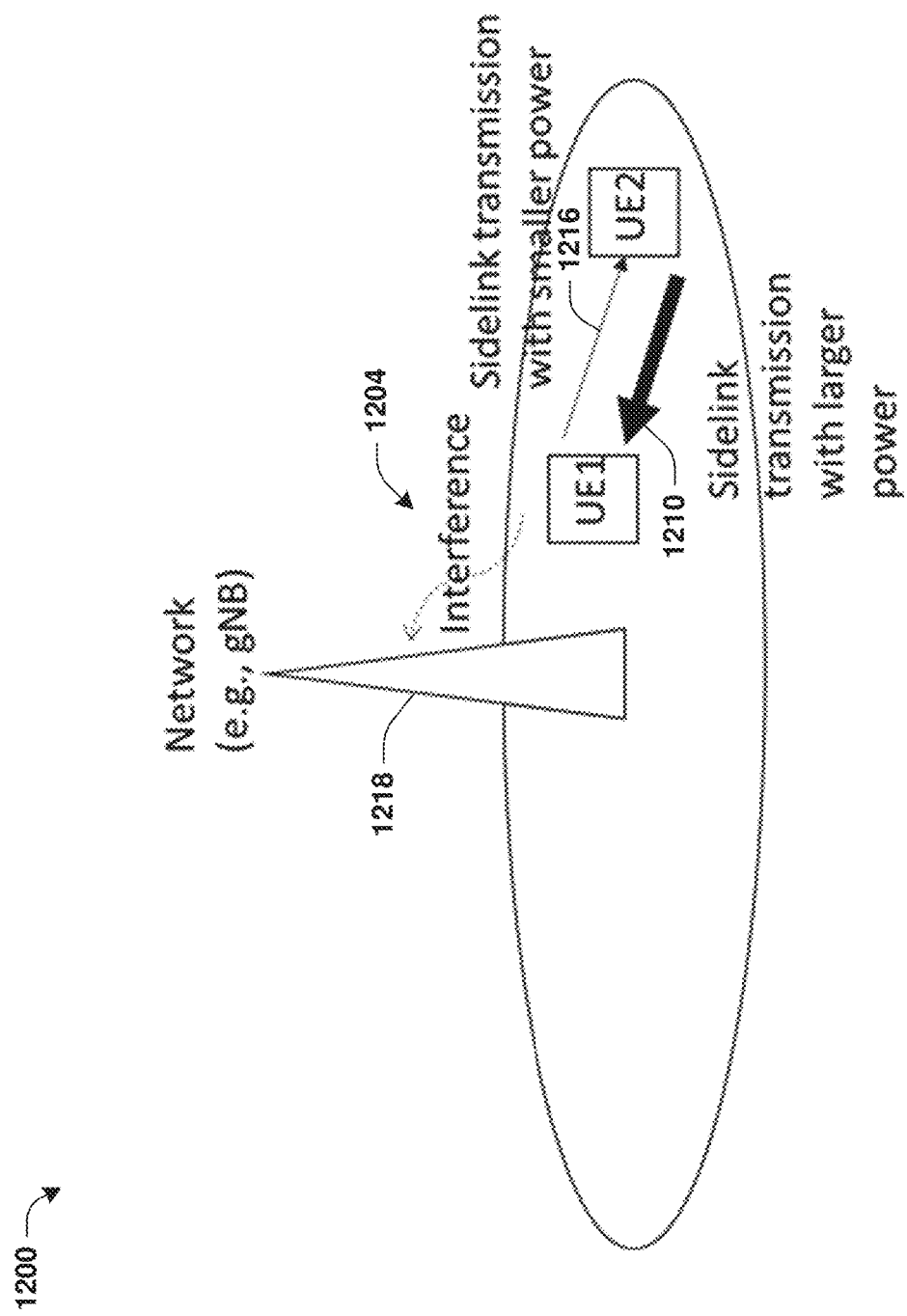
FIG. 12 is a diagram illustrating an exemplary scenario associated with sidelink communication between UEs according to one exemplary embodiment.

FIG. 12 illustrates a scenario 1200 associated with sidelink communication between UEs. The scenario 1200 may comprise a network 1218 (e.g., a gNB). Embodiments are contemplated in which the scenario 1200 does not comprise the network 1218. In some examples, in the scenario 1200 a transmit power of a sidelink transmission 1216 from UE1 may be lower than a transmit power of a sidelink transmission 1210 from UE2. In some examples, the transmit power of the sidelink transmission 1216 from UE1 may be lower than the transmit power of the sidelink transmission 1210 from UE2 to avoid and/or mitigate interference 1204 caused by the sidelink transmission 1216. Alternatively and/or additionally, the transmit power of the sidelink transmission 1216 from UE1 may be lower than the transmit power of the sidelink transmission 1210 from UE2 due to a first DL pathloss (for avoiding and/or mitigating interference to the network 1218) associated with UE1 being larger than a second DL pathloss (for avoiding and/or mitigating interference to the network 1218) associated with UE2. If UE1 performs LBT for accessing a channel (on which the sidelink transmission 1216 is performed, for example) based on an energy threshold associated with the smaller transmit power of UE1, when UE1 shares the COT to UE2, UE2's larger transmit power may cause interference to a neighboring node (e.g., a non-NR sidelink device).

Thus, according to one or more of the techniques provided herein (such as one or more of the techniques provided in the foregoing description), (i) Embodiment 3 may provide a method to exchange power-related information between UE1 and UE2, wherein UE1 sets the energy threshold based on the power-related information (for satisfying UE2's transmit power, for example); (ii) Embodiment 4 may provide for exchanging power-related information and/or determining (e.g., considering) whether or not to allow COT sharing to UE2 and/or whether or not to provide energy threshold to UE2; (iii) Embodiment 5 may be implemented without exchanging power-related information, wherein UE1 may provide energy threshold to UE2, and wherein UE2 may be required to avoid using energy, for sidelink transmission by UE2, that is larger than the energy threshold (e.g., the energy may be derived from a transmit power of UE2 and/or the energy used for sidelink transmission by UE2 may be limited by the energy threshold); and/or Embodiment 6 provides for avoiding this issue (e.g., interference) based on power report, wherein once DL pathloss change and/or SL pathloss change become larger than a change_threshold, UE1 and/or UE2 may initiate (e.g., trigger) the power report to inform peer UE.

Accordingly, implementation of one or more of the techniques provided herein with respect to Concept 5, Embodiment 3, Embodiment 4, Embodiment 5 and/or Embodiment 6 may mitigate and/or avoid interference (e.g., interference to a neighboring node, such as a non-NR sidelink device) caused by UE1 and/or UE2.

One, some and/or all of the foregoing examples, concepts, techniques and/or embodiments can be formed and/or combined to a new embodiment.

In some examples, embodiments disclosed herein, such as embodiments described with respect to Concept 1, Concept 2, Concept 3, Concept 4, Concept 5, Embodiment 1, Embodiment 2, Embodiment 3, Embodiment 4, Embodiment 5 and Embodiment 6, may be implemented independently and/or separately. Alternatively and/or additionally, a combination of embodiments described herein, such as embodiments described with respect to Concept 1, Concept 2, Concept 3, Concept 4, Concept 5, Embodiment 1, Embodiment 2, Embodiment 3, Embodiment 4, Embodiment 5 and/or Embodiment 6, may be implemented. Alternatively and/or additionally, a combination of embodiments described herein, such as embodiments described with respect to Concept 1, Concept 2, Concept 3, Concept 4, Concept 5, Embodiment 1, Embodiment 2, Embodiment 3, Embodiment 4, Embodiment 5 and/or Embodiment 6, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

One or more embodiments herein, such as one or more techniques, devices, concepts, methods, example scenarios and/or alternatives described above and/or below, may be used to solve and/or improve one or more issues comprising one, some and/or all of the aforementioned issues, such as the first issue, the second issue, the third issue and/or the fourth issue.

With respect to one or more embodiments herein, such as one or more techniques, devices, concepts, methods, example scenarios and/or alternatives described above, in some examples, LBT may be replaced by channel access procedure.

With respect to one or more embodiments herein, in some examples, channel access procedure may be type-1 channel access procedure, type-2 channel access procedure, type-2A channel access procedure, type-2B channel access procedure, or type-2C channel access procedure.

With respect to one or more embodiments herein, in some examples, LBT may be CAT1-LBT, CAT2-LBT, CAT3-LBT, or CAT4-LBT.

With respect to one or more embodiments herein, in some examples, ending timing of a sidelink transmission may comprise OFDM symbol for gap. In some examples, a UE cannot transmit the sidelink transmission on the OFDM symbol for gap.

Alternatively and/or additionally, in some examples, ending timing of a sidelink transmission does not comprise OFDM symbol for gap.

With respect to one or more embodiments herein, in some examples, a slot in a sidelink resource pool may comprise n-th~m-th symbols for sidelink.

With respect to one or more embodiments herein, in some examples, gap symbol (e.g., an OFDM symbol of a gap) is the m-th symbol or the (m+1)-th symbol.

With respect to one or more embodiments herein, in some examples, energy threshold (e.g., energy detection threshold) being transmitted to the second UE may comprise a quantized energy threshold (e.g., a quantized energy detection threshold).

With respect to one or more embodiments herein, in some examples, steps of quantized energy threshold may be 1 dB, 2 dB, . . . , 20 dB.

With respect to one or more embodiments herein, in some examples, the steps may be fixed, configured (e.g., preconfigured), and/or based on PC5-RRC signaling.

With respect to one or more embodiments herein, in some examples, the second UE may transmit unicast sidelink transmission on the shared COT (e.g., the shared COT initiated by the first UE) if the unicast sidelink transmission is targeted to the first UE.

With respect to one or more embodiments herein, in some examples, the second UE may transmit broadcast sidelink transmission or groupcast sidelink transmission on the shared COT (e.g., the shared COT initiated by the first UE) if the broadcast sidelink transmission or the groupcast sidelink transmission includes a target UE as the first UE.

With respect to one or more embodiments herein, in some examples, the second UE does not transmit and/or is not allowed to transmit unicast sidelink transmission on the shared COT (e.g., the shared COT initiated by the first UE) if the unicast sidelink transmission is not targeted to the first UE.

With respect to one or more embodiments herein, in some examples, the second UE does not transmit and/or is not allowed to transmit broadcast or groupcast sidelink transmission on the shared COT (e.g., the shared COT initiated by the first UE) if the broadcast or groupcast sidelink transmission does not include a target UE as the first UE.

With respect to one or more embodiments herein, in some examples, the first sidelink transmission is scheduled by a 1st stage SCI and a 2nd stage SCI.

With respect to one or more embodiments herein, in some examples, the first sidelink transmission is scheduled by a SCI format 1-A and a SCI format 2-X, wherein X may be A, B, C, D, E, or F.

With respect to one or more embodiments herein, in some examples, a UE performing a successful LBT corresponds to the UE sensing a channel to be idle according to a required duration of the LBT.

With respect to one or more embodiments herein, in some examples, a UE performing a LBT failure corresponds to the UE sensing a channel as busy and/or not idle according to a required duration of the LBT.

With respect to one or more embodiments herein, in some examples, a UE performing a successful LBT corresponds to an energy of the channel sensed by the UE being lower than or equal to an energy threshold (e.g., energy detection threshold).

With respect to one or more embodiments herein, in some examples, a UE performing a LBT failure corresponds to an energy of the channel sensed by the UE being larger than an energy threshold (e.g., energy detection threshold).

With respect to one or more embodiments herein, in some examples, an energy threshold (e.g., energy detection threshold) may be $X_{Thresh}$.

With respect to one or more embodiments herein, in some examples, an energy threshold (e.g., energy detection threshold) may be lower than a maximum energy detection threshold.

With respect to one or more embodiments herein, in some examples, an energy threshold (e.g., energy detection threshold) is based on transmit power of sidelink transmission.

With respect to one or more embodiments herein, in some examples, the first sidelink transmission is associated with (e.g., is in) a first sidelink resource pool. In some examples, the second sidelink transmission is associated with (e.g., is in) a second sidelink resource pool. In some examples, the first sidelink resource pool and the second sidelink resource pool are the same sidelink resource pool. Alternatively and/or additionally, the first sidelink resource pool may be different than the second sidelink resource pool. In some examples, the first sidelink resource pool is associated with (e.g., is in) a first carrier/cell. In the present disclosure, the term "carrier/cell" may correspond to a carrier and/or a cell.

In some examples, the second sidelink resource pool is associated with (e.g., is in) a second carrier/cell. In some examples, the first carrier/cell and the second carrier/cell are the same carrier/cell. Alternatively and/or additionally, the first carrier/cell may be different than the second carrier/cell. In some examples, the first carrier/cell is associated with a shared and/or unlicensed spectrum. In some examples, the second carrier/cell is associated with a shared and/or unlicensed spectrum. In some examples, a UE (e.g., the first UE or the second UE) would perform one or more types of LBT (e.g., one or more kinds of LBT) before performing sidelink transmission. In some examples, the UE may perform sensing (on one or more sensing slots, for example) before performing sidelink transmission.

With respect to one or more embodiments herein, in some examples, the first UE operates in shared spectrum channel access.

With respect to one or more embodiments herein, in some examples, the second UE operates in shared spectrum channel access.

With respect to one or more embodiments herein, in some examples, a UE performing CP extension for a sidelink transmission (and/or the UE applying CP extension for the sidelink transmission) means that one or more symbols of the sidelink transmission, comprising a first symbol (e.g., initial symbol) of the sidelink transmission, are with CP extension, wherein one or more remaining symbols of the sidelink transmission (other than the one or more symbols comprising the initial symbol, for example) may be without CP extension.

With respect to one or more embodiments herein, in some examples, for a first OFDM symbol (e.g., initial OFDM symbol) of a sidelink transmission with CP starting at timing t, application of CP extension for the sidelink transmission (and/or the sidelink transmission being performed with CP extension) may mean that the UE would transmit the sidelink transmission from the timing t to the timing $t_{ext}$.

With respect to one or more embodiments herein, in some examples, $t_{ext}$ may be derived from CP extension index in 3GPP TS 38.211 V16.6.0.

With respect to one or more embodiments herein, in some examples, based on PC5-RRC signaling for the first and the second UE, the first and/or the second UE may determine (e.g., know) one or more CP extension indexes. Thus, the one or more CP extension indexes and/or one or more CP extensions may be indicated by SCI, MAC CE and/or COT sharing information.

With respect to one or more embodiments herein, in some examples, one or more CP extension indexes and/or one or more CP extensions may be configured (e.g., pre-configured) (e.g., a UE may be configured, such as pre-configured, with the one or more CP extension indexes and/or the one or more CP extensions).

With respect to one or more embodiments herein, in some examples, one or more CP extension indexes and/or one or more CP extensions may be based on QoS requirement, resource pool, cast type, priority, carrier, and/or congestion control.

With respect to one or more embodiments herein, in some examples, for one or more CP extension indexes and/or one or more CP extensions based on congestion control and/or for a congested channel (e.g., a channel with a Channel Busy Ratio (CBR) larger than CBR_threshold, and/or with a channel occupancy ratio (CR) larger than CR_threshold), the first UE and/or the second UE may use longer CP extension. For example, CP extension used by the first UE and/or the second UE may be longer if the CBR and/or CR are larger than the CBR_threshold and/or CR_threshold as compared to the CBR and/or CR being smaller than the CBR_threshold and/or CR_threshold. In some examples, the rationale here (e.g., the rationale for the CP extension being larger if the CBR and/or CR are larger than the CBR_threshold and/or CR_threshold as compared to the CBR and/or CR being smaller than the CBR_threshold and/or CR_threshold) is to occupy the channel as soon as possible. Alternatively, the first or the second UE may use shorter CP extension (e.g., CP extension used by the first UE and/or the second UE may be smaller if the CBR and/or CR are larger than the CBR_threshold and/or CR_threshold as compared to the CBR and/or CR being smaller than the CBR_threshold and/or CR_threshold).

With respect to one or more embodiments herein, in some examples, for one or more CP extension indexes and/or one or more CP extensions based on priority and/or for a sidelink transmission with a priority to initiate a COT (e.g., the priority being larger than priority_threshold), the first UE and/or the second UE may use longer CP extension (e.g., CP extension used by the first UE and/or the second UE may be longer if the priority is larger than the priority_threshold as compared to the priority being smaller than the priority_threshold). Alternatively, the first UE and/or the second UE may use shorter CP extension (e.g., CP extension used by the first UE and/or the second UE may be shorter if the priority is larger than the priority_threshold as compared to the priority being smaller than the priority_threshold).

With respect to one or more embodiments herein, in some examples, for one or more CP extension indexes and/or one or more CP extensions based on resource pool and/or carrier, it may be beneficial for the first or the second UE to share the COT to one or more NR UEs performing sidelink communication.

With respect to one or more embodiments herein, in some examples, for a COT initiated by network, a network may share the COT to one or more UEs using (e.g., based on) common signaling (e.g., group common signaling) such as Downlink Control Information (DCI) format 2_0, uplink grant, Random Access Response (RAR) grant, and/or DL assignment. In an example, a UE of the one or more UEs may receive a DL assignment indicating to use short LBT (e.g., the UE receiving the DL assignment indicating to use short LBT may mean that the UE may perform short LBT before transmitting a signal and/or channel in response to the DL assignment). In an example, a UE of the one or more UEs may receive a UL grant and/or RAR grant indicating using short LBT (e.g., the UE receiving the UL grant and/or RAR grant indicating to use short LBT may mean that that the UE may perform short LBT before transmitting based on the UL grant or RAR grant).

With respect to one or more embodiments herein, in some examples, for COT initiated by UE, UE may share the COT to a network based on indicating COT sharing information (e.g., the UE may transmit the COT sharing information to the network). In NR Uu interface (between network and UE), COT sharing information is signaled in L1 (Layer 1) signaling, wherein the COT sharing information may be a kind (e.g., one kind) of Uplink Control Information (UCI).

With respect to one or more embodiments herein, in some examples, a device may be a UE or a network.

Figure 13:
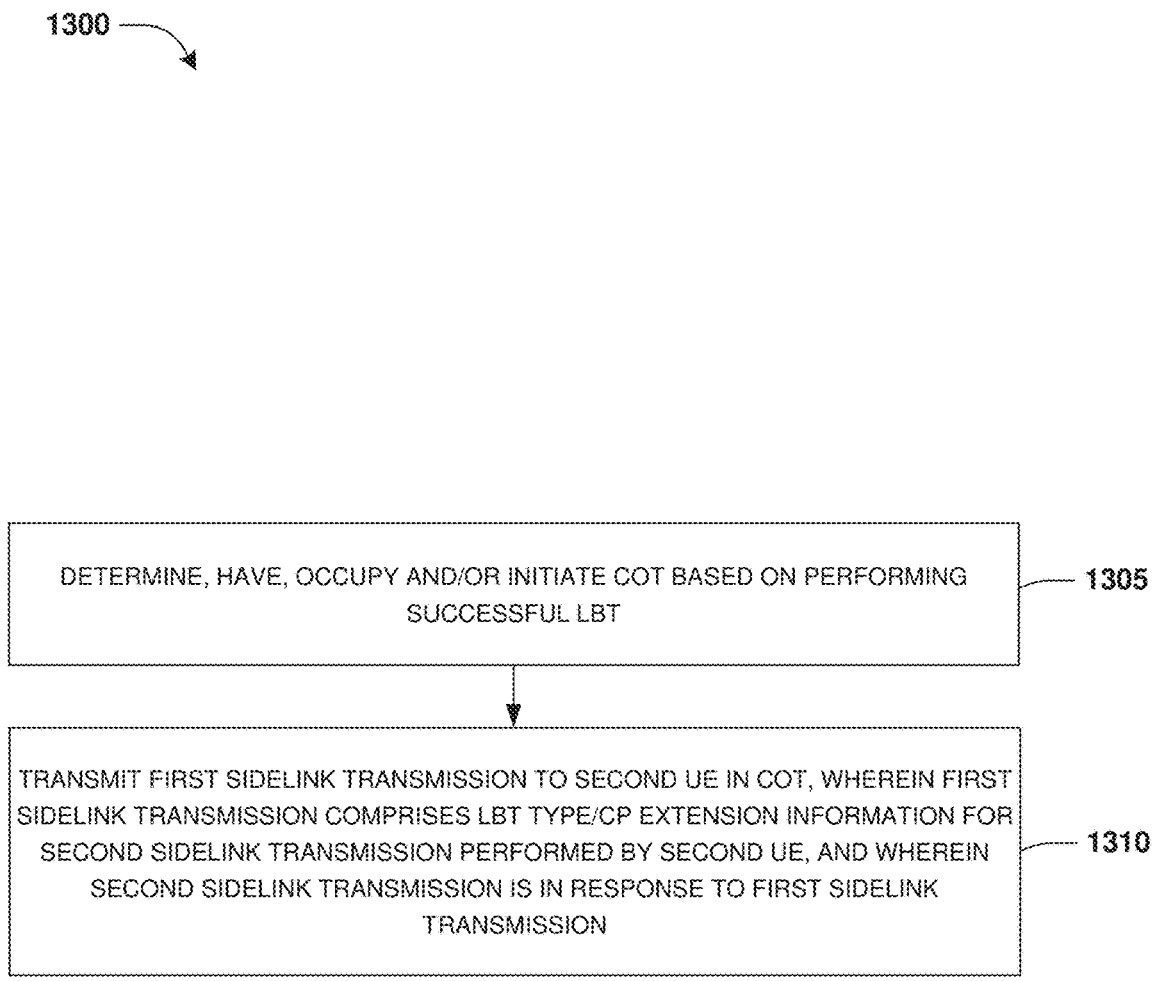
FIG. 13 is a flow chart according to one exemplary embodiment.

FIG. 13 is a flow chart 1300 according to one exemplary embodiment from the perspective of a first UE, such as a first UE performing sidelink transmission using shared spectrum channel access. In step 1305, based on (e.g., in response to) performing a successful LBT (e.g., a LBT procedure having a LBT result corresponding to idle), the first UE determines (e.g., obtains), has, occupies and/or initiates a COT. In step 1310, the first UE transmits a first sidelink transmission to a second UE in the COT, wherein the first sidelink transmission comprises LBT type/CP extension information for a second sidelink transmission performed by the second UE, and wherein the second sidelink transmission is in response to the first sidelink transmission.

Referring back to FIGS. 3 and 4, in one exemplary embodiment of a first UE, the device 300 includes a program code 312 stored in the memory 310. In some examples, the first UE performs sidelink transmission using shared spectrum channel access. The CPU 308 may execute program code 312 to enable the first UE (i) to determine (e.g., obtain), have, occupy and/or initiate a COT based on (e.g., in response to) performing a successful LBT (e.g., a LBT procedure having a LBT result corresponding to idle), and (ii) to transmit a first sidelink transmission to a second UE in the COT, wherein the first sidelink transmission comprises LBT type/CP extension information for a second sidelink transmission performed by the second UE, and wherein the second sidelink transmission is in response to the first sidelink transmission. Furthermore, the CPU 308 can execute the program code 312 to perform one, some and/or all of the above-described actions and steps and/or others described herein.

FIG. 14 is a flow chart 1400 according to one exemplary embodiment from the perspective of a first UE, such as a first UE performing sidelink transmission using shared spectrum channel access. In step 1405, in response to performing a successful LBT (e.g., a LBT procedure having a LBT result corresponding to idle), the first UE determines (e.g., obtains), has, occupies and/or initiates a COT, wherein a length of the COT is a minimum length of: (i) a first length corresponding to a number of consecutive (e.g., contiguous) slots associated with a sidelink resource pool; and (ii) a second length corresponding to a maximum time associated with a CAPC.

Referring back to FIGS. 3 and 4, in one exemplary embodiment of a first UE, the device 300 includes a program code 312 stored in the memory 310. In some examples, the first UE performs sidelink transmission using shared spectrum channel access. The CPU 308 may execute program code 312 to enable the first UE (i) to determine (e.g., obtain), have, occupy and/or initiate a COT based on (e.g., in response to) performing a successful LBT (e.g., a LBT procedure having a LBT result corresponding to idle), wherein a length of the COT is a minimum length of: (A) a first length corresponding to a number of consecutive slots associated with a sidelink resource pool; and (B) a second length corresponding to a maximum time associated with a CAPC. Furthermore, the CPU 308 can execute the program code 312 to perform one, some and/or all of the above-described actions and steps and/or others described herein.

Figure 15:
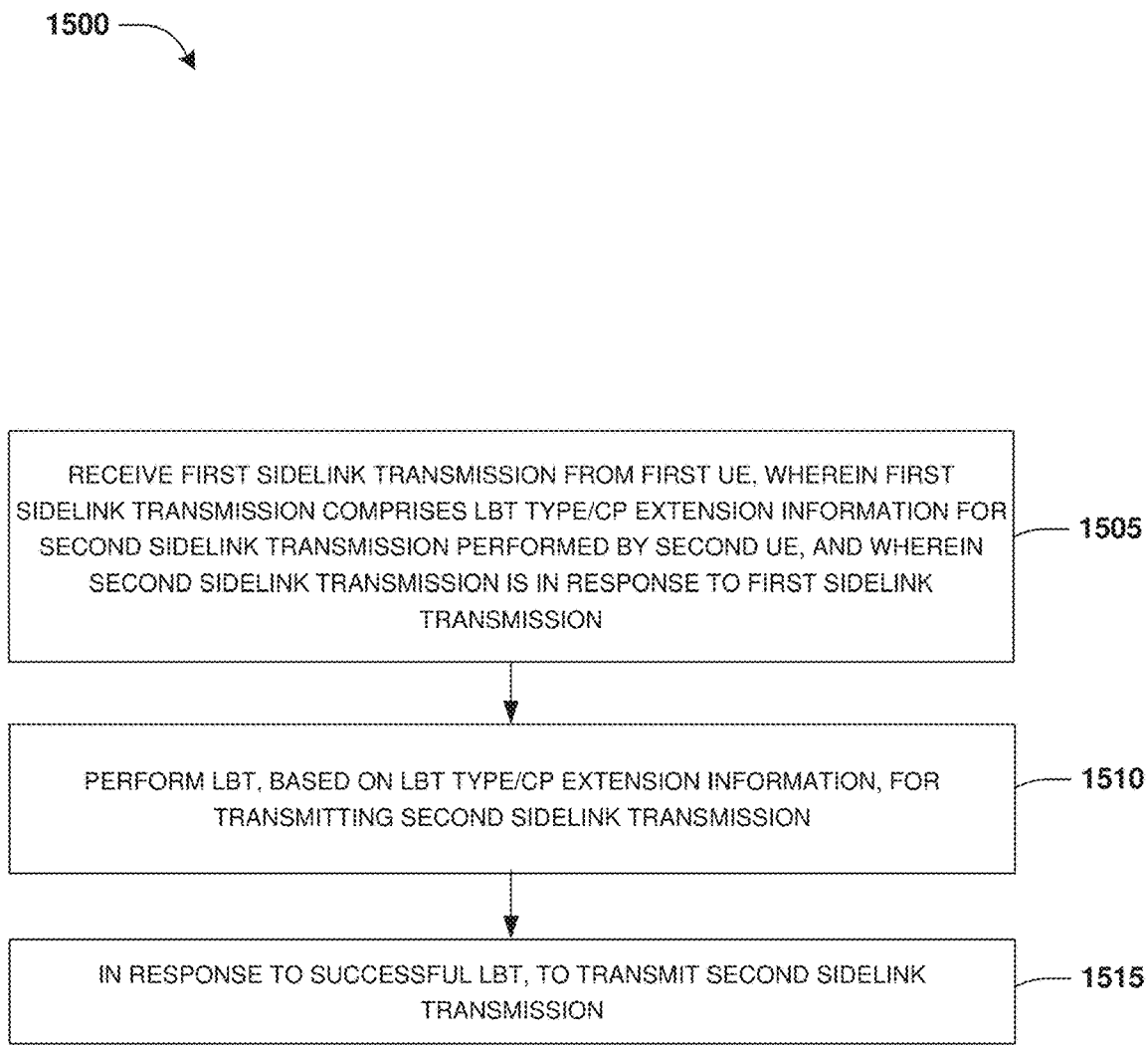
FIG. 15 is a flow chart according to one exemplary embodiment.

FIG. 15 is a flow chart 1500 according to one exemplary embodiment from the perspective of a second UE, such as a second UE performing sidelink transmission using shared spectrum channel access. In step 1505, the second UE receives a first sidelink transmission from a first UE, wherein the first sidelink transmission comprises LBT type/CP extension information for a second sidelink transmission performed by the second UE, and wherein the second sidelink transmission is in response to the first sidelink transmission. The LBT type/CP extension information may correspond to information associated with a LBT type and/or a CP extension (e.g., information that is indicative of a LBT type and/or a CP extension, such as information that identifies a LBT type and/or identifies a CP extension). In step 1510, the second UE performs LBT, based on the LBT type/CP extension information, for transmitting the second sidelink transmission. For example, the second UE performs the LBT (e.g., a LBT procedure) before and/or for transmitting the second sidelink transmission. In step 1515, in response to successful LBT, the second UE transmits the second sidelink transmission. The successful LBT may correspond to the LBT (e.g., the LBT procedure), that is based on the LBT type/CP extension information, being successful (such as where the LBT has a LBT result corresponding to idle).

Referring back to FIGS. 3 and 4, in one exemplary embodiment of a second UE, the device 300 includes a program code 312 stored in the memory 310. In some examples, the second UE performs sidelink transmission using shared spectrum channel access. The CPU 308 may execute program code 312 to enable the second UE (i) to receive a first sidelink transmission from a first UE, wherein the first sidelink transmission comprises LBT type/CP extension information for a second sidelink transmission performed by the second UE, and wherein the second sidelink transmission is in response to the first sidelink transmission, (ii) to perform LBT, based on the LBT type/CP extension information, for transmitting the second sidelink transmission, and (iii) in response to successful LBT, to transmit the second sidelink transmission. Furthermore, the CPU 308 can execute the program code 312 to perform one, some and/or all of the above-described actions and steps and/or others described herein.

With respect to FIGS. 13-15, in one embodiment, the second sidelink transmission is PSFCH, and/or the first sidelink transmission is PSSCH.

In one embodiment, the first sidelink transmission is with HARQ feedback (e.g., SL HARQ feedback) enable. For example, SL HARQ feedback may be enabled for the first sidelink transmission.

In one embodiment, the first UE indicates (e.g., sets) HARQ feedback enable to the first sidelink transmission (such as where the first UE sets HARQ feedback to enable for the first sidelink transmission). For example, the first UE indicates that HARQ feedback is enabled for the first sidelink transmission. In an example, the first sidelink transmission comprises an indication that HARQ feedback is enabled for the first sidelink transmission.

In one embodiment, the first sidelink transmission and the second sidelink transmission are in a same sidelink resource pool.

In one embodiment, the sidelink resource pool is in a carrier using shared spectrum channel access.

In one embodiment, the COT refers to an occupancy time on a channel in the carrier and/or on resources in the carrier.

In one embodiment, based on whether or not the second sidelink transmission is within the COT initiated by the first UE or not, the first UE determines (e.g., derives and/or sets) and/or indicates which code-point and/or combination of LBT type and/or CP extension is indicated in the LBT type/CP extension information.

In one embodiment, based on (e.g., in response to) the second sidelink transmission being within the COT initiated by the first UE, the first UE determines (e.g., derives and/or sets) and/or indicates a first code-point and/or a first combination of LBT type and/or CP extension for the LBT type/CP extension information. In an example, the first code-point may be indicative of the first combination of LBT type and/or CP extension. Alternatively and/or additionally, the LBT type/CP extension information may comprise the first code-point and/or an indication of the first combination of LBT type and/or CP extension, wherein the first combination of LBT type and/or CP extension may correspond to a first LBT type and/or a first CP extension status (e.g., the first CP extension status may correspond to a type of CP extension and/or whether or not CP extension should be applied for a transmission).

In one embodiment, based on (e.g., in response to) the second sidelink transmission not being within the COT initiated by the first UE (e.g., an ending timing of the second sidelink transmission is after an ending timing of the COT), the first UE determines (e.g., derives and/or sets) and/or indicates a second code-point and/or a second combination of LBT type and/or CP extension for the LBT type/CP extension information. In an example, the second code-point may be indicative of the second combination of LBT type and/or CP extension. Alternatively and/or additionally, the LBT type/CP extension information may comprise the second code-point and/or an indication of the second combination of LBT type and/or CP extension, wherein the second combination of LBT type and/or CP extension may correspond to a second LBT type and/or a second CP extension status (e.g., the second CP extension status may correspond to a type of CP extension and/or whether or not CP extension should be applied for a transmission).

In one embodiment, the first code-point and/or the first combination of LBT type and/or CP extension correspond to short LBT (e.g., the first LBT type is short LBT), short CP extension (e.g., the first CP extension status corresponds to application of short CP extension for a transmission) and/or no CP extension (e.g., the first CP extension status corresponds to application of no CP extension for a transmission), such as where $T_{ext}$ index i=0 or 1 in Table 5.3.1-1 in 3GPP TS 38.211 V16.6.0.

In one embodiment, the second code-point and/or the second combination of LBT type and/or CP extension correspond to long LBT (e.g., the second LBT type is long LBT) and/or long CP extension (e.g., the second CP extension status corresponds to application of long CP extension for a transmission), such as where $T_{ext}$ index i=2 or 3 in Table 5.3.1-1 in 3GPP TS 38.211 V16.6.0.

In one embodiment, the second code-point and/or the second combination of LBT type and/or CP extension correspond to long LBT (e.g., the second LBT type is long LBT) and/or one CP extension (e.g., the second CP extension status corresponds to application of long CP extension for a transmission), such as where $T_{ext}$ index i=0, 1, 2 or 3 in Table 5.3.1-1 in 3GPP TS 38.211 V16.6.0.

In one embodiment, the LBT type/CP extension information is used to assist the second UE in determining which LBT may be used for accessing the channel to transmit the second sidelink transmission (e.g., the second sidelink transmission may be performed on the channel). For example, the second UE may determine LBT information (e.g., a LBT type and/or a LBT) for use in accessing the channel (e.g., shared spectrum channel) for performing the second sidelink transmission (e.g., the second UE may access the channel, according to the LBT information, in order to transmit the second sidelink transmission).

In one embodiment, the LBT type/CP extension information is indicated by 1st stage SCI (e.g., SCI format 1-A), 2nd stage SCI (e.g., SCI format 2-X, where X=A, B, C, D, E, or F), and/or MAC CE.

In one embodiment, the LBT type/CP extension information is indicated by 1st stage SCI (e.g., SCI format 1-A) scheduling the first sidelink transmission, and/or 2nd stage SCI (e.g., SCI format 2-X, where X=A, B, C, D, E, or F) scheduling the first sidelink transmission.

Figure 16:
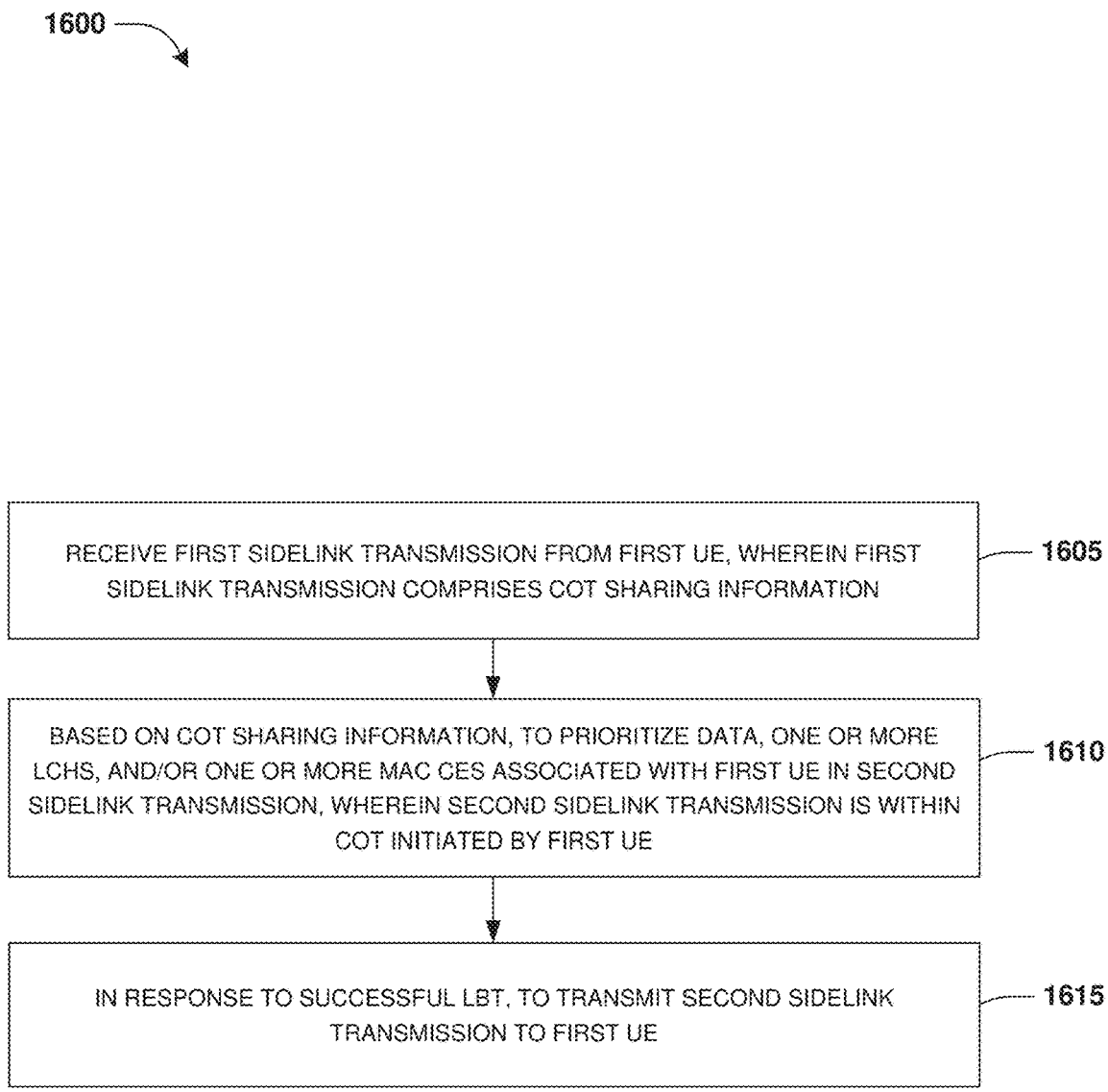
FIG. 16 is a flow chart according to one exemplary embodiment.

FIG. 16 is a flow chart 1600 according to one exemplary embodiment from the perspective of a second UE, such as a second UE performing sidelink transmission using shared spectrum channel access. In step 1605, the second UE receives a first sidelink transmission from a first UE, wherein the first sidelink transmission comprises COT sharing information. In step 1610, based on (e.g., in response to) the COT sharing information, the second UE prioritizes data, one or more LCHs, and/or one or more MAC CEs associated with the first UE in a second sidelink transmission, wherein the second sidelink transmission is within a COT initiated by the first UE. In an example, based on (e.g., in response to) receiving the COT sharing information from the first UE, the second UE may prioritize including the data, the one or more LCHs and/or the one or more MAC CEs (targeted to the first UE, for example) in the second sidelink transmission over other data, other LCHs and/or other MAC CEs (e.g., the data, the one or more LCHs and/or the one or more MAC CEs targeted to the first UE may be prioritized over other data, other LCHs and/or other MAC CEs targeted to one or more other UEs). The COT sharing information may comprise information associated with the COT initiated by the first UE. In step 1615, in response to successful LBT (e.g., in response to performing a LBT procedure having a LBT result corresponding to idle), the second UE transmits the second sidelink transmission to the first UE.

In one embodiment, the second sidelink transmission is in response to the first sidelink transmission, the second sidelink transmission is PSFCH, and/or the first sidelink transmission is PSSCH and/or PSCCH. In an example, the first sidelink transmission is PSSCH and/or PSCCH, and the second sidelink transmission is PSFCH that is in response to the first sidelink transmission, wherein the PSFCH comprises feedback (e.g., SL HARQ feedback) in response to the first sidelink transmission.

In one embodiment, the second sidelink transmission is PSCCH and/or PSSCH, and/or the first sidelink transmission is PSSCH and/or PSCCH.

In one embodiment, the first sidelink transmission and the second sidelink transmission are in a same sidelink resource pool.

In one embodiment, the sidelink resource pool is in a carrier using shared spectrum channel access.

In one embodiment, the COT refers to an occupancy time on a channel in the carrier and/or on resources in the carrier.

In one embodiment, the second UE selects a destination associated with the first UE for the second sidelink transmission, wherein the destination is a destination identifier (ID) of the first UE, a groupcast destination ID for a group comprising the first UE or a broadcast destination ID. Alternatively and/or additionally, the destination (e.g., the destination, of the second sidelink transmission, selected by the second UE) may comprise the destination ID of the first UE, the groupcast destination ID and/or the broadcast destination ID.

In one embodiment, the second UE selects a second destination not associated with the first UE (e.g., the second destination does not comprise the destination ID of the first UE, does not comprise the groupcast destination ID for the group comprising the first UE and/or does not comprise the broadcast destination ID), if (and/or when) there is no SL data available for the destination associated with the first UE.

Referring back to FIGS. 3 and 4, in one exemplary embodiment of a second UE, the device 300 includes a program code 312 stored in the memory 310. In some examples, the second UE performs sidelink transmission using shared spectrum channel access. The CPU 308 may execute program code 312 to enable the second UE (i) to receive a first sidelink transmission from a first UE, wherein the first sidelink transmission comprises COT sharing information, (ii) based on (e.g., in response to) the COT sharing information, to prioritize data, one or more LCHs, and/or one or more MAC CEs associated with the first UE in a second sidelink transmission, wherein the second sidelink transmission is within a COT initiated by the first UE, and (iii) in response to successful LBT (e.g., in response to performing a LBT procedure having a LBT result corresponding to idle), to transmit the second sidelink transmission to the first UE. Furthermore, the CPU 308 can execute the program code 312 to perform one, some and/or all of the above-described actions and steps and/or others described herein.

Figure 17:
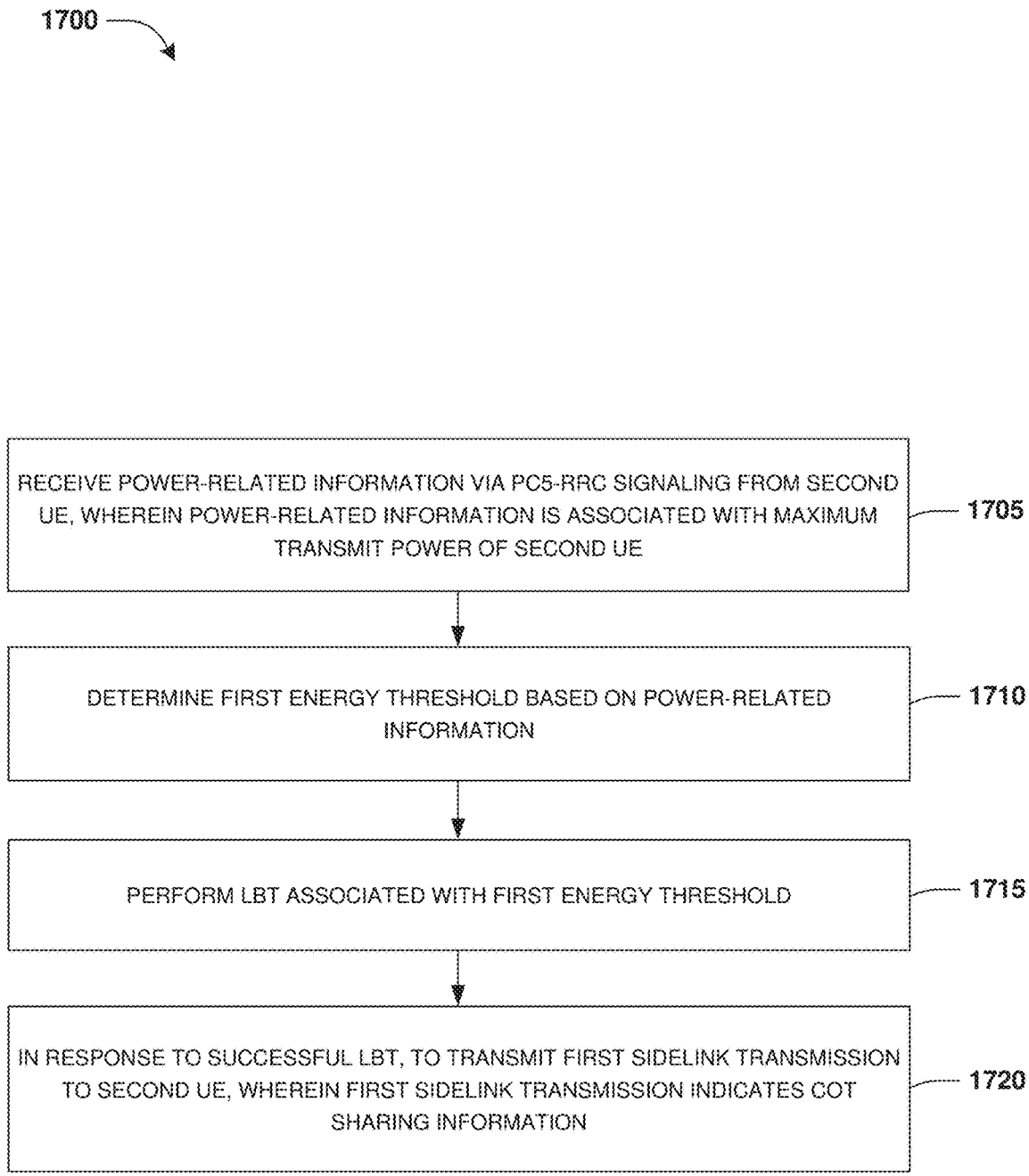
FIG. 17 is a flow chart according to one exemplary embodiment.

FIG. 17 is a flow chart 1700 according to one exemplary embodiment from the perspective of a first UE, such as a first UE performing sidelink transmission using shared spectrum channel access. The first UE has a unicast connection with a second UE. In some examples, the first UE communicates with the second UE via the unicast connection. In step 1705, the first UE receives power-related information via PC5-RRC signaling from the second UE, wherein the power-related information is associated with (e.g., indicative of) a maximum transmit power of the second UE. In step 1710, the first UE determines (e.g., sets) a first energy threshold based on the power-related information. In step 1715, the first UE performs an LBT (e.g., an LBT for accessing a channel, such as a channel on which the first UE communicates with the second UE) associated with the first energy threshold. In step 1720, in response to successful LBT, the first UE transmits a first sidelink transmission to the second UE, wherein the first sidelink transmission indicates COT sharing information. The successful LBT may correspond to the LBT (e.g., the LBT procedure), that is associated with the first energy threshold, being successful (such as where the LBT has a LBT result corresponding to idle).

In one embodiment, when the first UE performs an LBT associated with the first energy threshold, the first UE can share the COT to the second UE (e.g., if the LBT is performed with the first energy threshold, the first UE may share the COT to the second UE).

In one embodiment, when the first UE performs an LBT associated with a second energy threshold (different than the first energy threshold), the first UE does not (and/or is not allowed to) share the COT to the second UE, wherein the first energy detection threshold is higher than the second energy detection threshold (e.g., if the LBT is performed with the second energy threshold, the first UE may not share the COT to the second UE).

In one embodiment, a maximum transmit power of the first UE is smaller than the maximum transmit power of the second UE.

In one embodiment, the COT sharing information is indicated by 1st stage SCI, 2nd stage SCI, and/or MAC CE.

In one embodiment, the 1st stage SCI and/or the 2nd stage SCI (that are indicative of the COT sharing information, for example) schedules the first sidelink transmission.

In one embodiment, the COT sharing information is delivered (to the second UE, for example) by PSSCH.

In one embodiment, the COT sharing information is not delivered (to the second UE, for example) by PSCCH.

Referring back to FIGS. 3 and 4, in one exemplary embodiment of a first UE, the device 300 includes a program code 312 stored in the memory 310. In some examples, the first UE performs sidelink transmission using shared spectrum channel access. IN some examples, the first UE communicates with the second UE via the unicast connection. The CPU 308 may execute program code 312 to enable the first UE (i) to receive power-related information via PC5-RRC signaling from the second UE, wherein the power-related information is associated with maximum transmit power of the second UE, (ii) to determine (e.g., set) a first energy threshold based on the power-related information, (iii) to perform an LBT (e.g., an LBT for accessing a channel, such as a channel on which the first UE communicates with the second UE) associated with the first energy threshold, and (iv) in response to successful LBT, to transmit a first sidelink transmission to the second UE, wherein the first sidelink transmission indicates COT sharing information. Furthermore, the CPU 308 can execute the program code 312 to perform one, some and/or all of the above-described actions and steps and/or others described herein.

Figure 18:
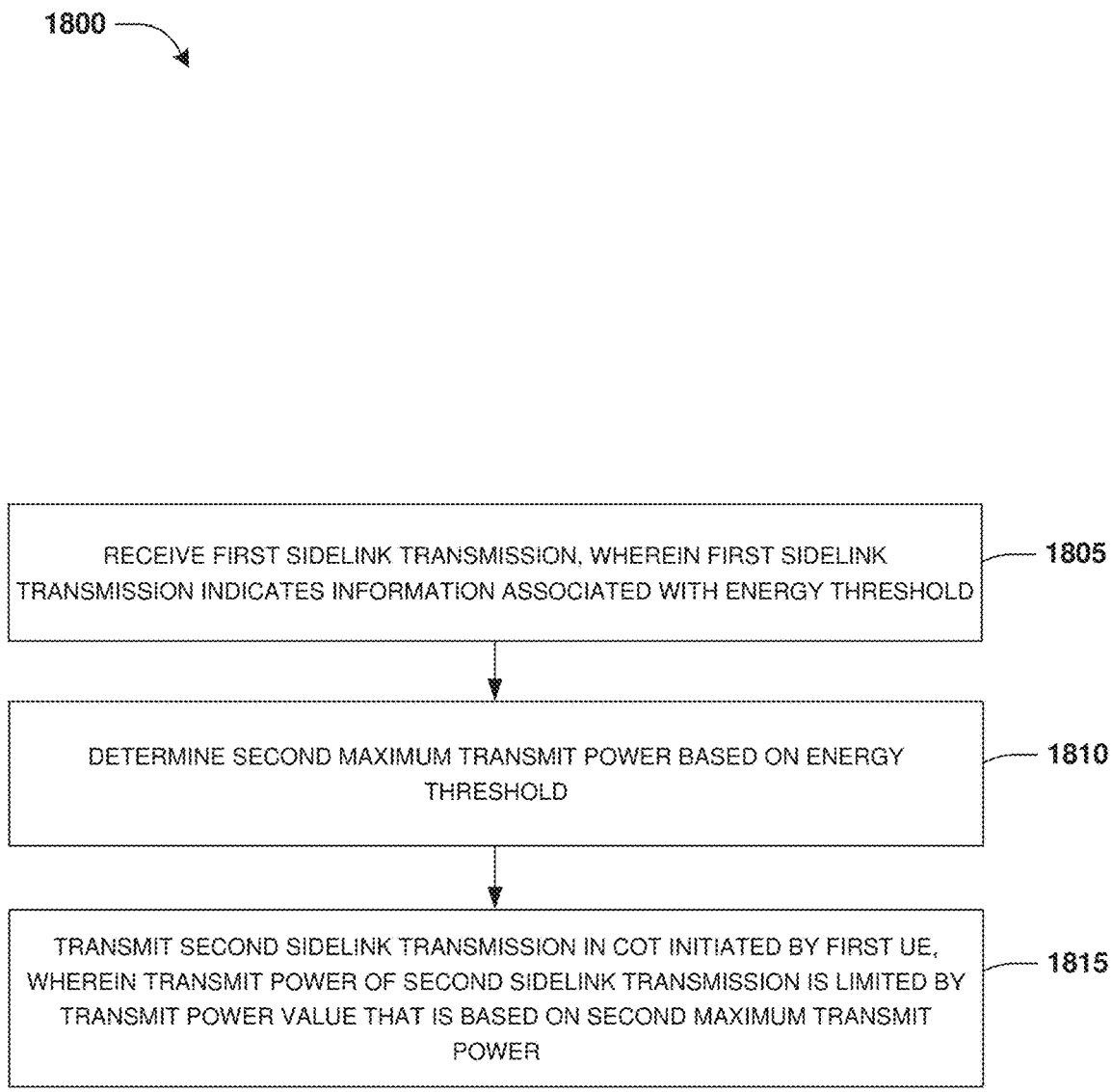
FIG. 18 is a flow chart according to one exemplary embodiment.

FIG. 18 is a flow chart 1800 according to one exemplary embodiment from the perspective of a second UE, such as a second UE performing sidelink transmission using shared spectrum channel access. In step 1805, the second UE receives a first sidelink transmission, wherein the first sidelink transmission indicates information associated with an energy threshold (e.g., the first sidelink transmission indicates information indicative of the energy threshold). In step 1810, the second UE determines (e.g., derives) a second maximum transmit power based on the energy threshold. In step 1815, the second UE transmits a second sidelink transmission in a COT initiated by the first UE, wherein a transmit power of the second sidelink transmission is limited by a transmit power value that is based on (e.g., equal to) the second maximum transmit power.

In one embodiment, the energy threshold is indicated in COT sharing information provided by the first UE (e.g., the first UE may provide the COT sharing information to the second UE), and/or the COT sharing information is indicated by the first sidelink transmission.

In one embodiment, the COT sharing information is indicated by 1st stage SCI, 2nd stage SCI, and/or MAC CE.

In one embodiment, the 1st stage SCI and/or the 2nd stage SCI (that are indicative of the COT sharing information, for example) schedules the first sidelink transmission.

In one embodiment, the second UE determines sidelink transmission power for the second sidelink transmission based on a minimum power of: (i) a derived sidelink transmit power; (ii) a first maximum sidelink transmit power; and (iii) a second maximum sidelink transmit power.

In one embodiment, the transmit power value (based upon which transmit power of the second sidelink transmission is limited) is based on (e.g., equal to) a minimum power of: (i) a derived sidelink transmit power; (ii) a first maximum sidelink transmit power; and (iii) a second maximum sidelink transmit power. In some examples, the transmit power of the second sidelink transmission is equal to or lower than the transmit power value.

In one embodiment, the second maximum sidelink transmit power is the same as the second maximum transmit power.

In one embodiment, the derived sidelink transmit power is based on target received power ($P_{O,D}$, or $P_{O,S}$), number of PRBs, DL pathloss ($PL_D$), DL pathloss compensation ($\alpha D$), SL pathloss ($PL_S$), and/or SL pathloss compensation ($\alpha_S$).

In one embodiment, the first maximum sidelink transmit power is associated with (e.g., based on, such as equal to) a maximum transmit power ($P_{CMAX}$) of the second UE.

In one embodiment, the second maximum sidelink transmit power is associated with (e.g., based on, such as equal to) the information associated with the energy threshold.

In one embodiment, the information associated with the energy threshold is $X_{Thresh}$ and/or bandwidth of the second sidelink transmission is $M_{BW}$.

In one embodiment, the second maximum transmit power is $(T_{value} - X_{Thresh} + 10 \cdot \log_{10}(M_{BW} \text{ MHz}/20 \text{ MHz}))$ dBm, wherein $T_{value}$ is a value (e.g., a specific and/or fixed value) and/or a value derived and/or defined by regulatory requirements in dB or dBm.

In one embodiment, the second maximum sidelink transmit power may be $(-72+23-X_{Thresh})$ dBm/20 MHz.

In one embodiment, the first sidelink transmission and the second sidelink transmission are in a same sidelink resource pool.

In one embodiment, the sidelink resource pool is in a carrier using shared spectrum channel access.

In one embodiment, the COT refers to an occupancy time on a channel in the carrier and/or on resources in the carrier.

Referring back to FIGS. 3 and 4, in one exemplary embodiment of a second UE, the device 300 includes a program code 312 stored in the memory 310. In some examples, the second UE performs sidelink transmission using shared spectrum channel access. The CPU 308 may execute program code 312 to enable the second UE (i) to receive a first sidelink transmission, wherein the first sidelink transmission indicates information associated with an energy threshold (e.g., the first sidelink transmission indicates information indicative of the energy threshold), (ii) to determine (e.g., derive) a second maximum transmit power based on the energy threshold, and (iii) to transmit a second sidelink transmission in a COT initiated by the first UE, wherein a transmit power of the second sidelink transmission is limited by a transmit power value that is based on (e.g., equal to) the second maximum transmit power. Furthermore, the CPU 308 can execute the program code 312 to perform one, some and/or all of the above-described actions and steps and/or others described herein.

Figure 19:
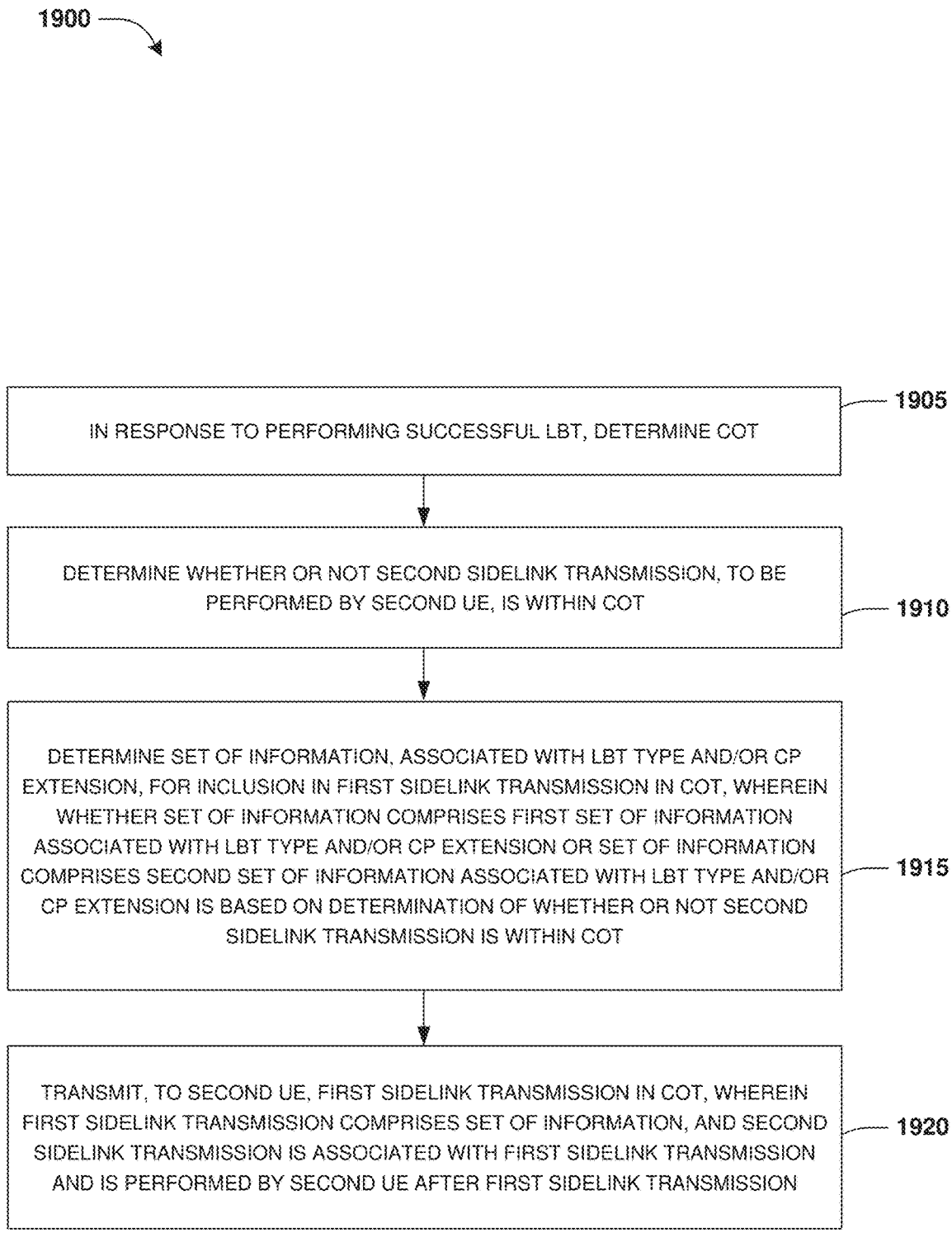
FIG. 19 is a flow chart according to one exemplary embodiment.

FIG. 19 is a flow chart 1900 according to one exemplary embodiment from the perspective of a first UE, such as a first UE performing sidelink transmission using shared spectrum channel access. In step 1905, in response to performing successful LBT, the first UE determines (e.g., obtains) a COT. For example, the first UE may have, occupy and/or initiate the COT based on (e.g., in response to) the successful LBT. The successful LBT may correspond to a LBT procedure, performed by the first UE, that has a LBT result corresponding to idle. In step 1910, the first UE determines whether or not a second sidelink transmission, to be performed by a second UE, is within the COT. In step 1915, the UE determines (e.g., sets and/or derives) a set of information, associated with LBT type and/or CP extension, for inclusion in a first sidelink transmission in the COT, wherein whether the set of information comprises a first set of information associated with LBT type and/or CP extension or the set of information comprises a second set of information associated with LBT type and/or CP extension is based on the determination of whether or not the second sidelink transmission is within the COT. In step 1920, the UE transmits, to the second UE, the first sidelink transmission in the COT. The first sidelink transmission comprises the set of information. The second sidelink transmission is associated with the first sidelink transmission (e.g., the second sidelink transmission is transmitted by the second UE in response to the first sidelink transmission) and is performed by the second UE after the first sidelink transmission.

For example, in step 1915, based on whether or not the second sidelink transmission is within the COT (e.g., the COT initiated by the first UE), the UE may determine whether to include the first set of information (associated with LBT type and/or CP extension) in the first sidelink transmission or to include the second set of information (associated with LBT type and/or CP extension) in the first sidelink transmission.

For example, in step 1915, based on whether or not the second sidelink transmission is within the COT (e.g., the COT initiated by the first UE), the UE may determine whether to provide the first set of information (associated with LBT type and/or CP extension) to the second UE or to provide the second set of information (associated with LBT type and/or CP extension) to the second UE.

In an example, the first set of information may correspond to first information (e.g., first LBT type/CP extension information) associated with a first LBT type and/or a first CP extension status (e.g., the first set of information may be indicative of the first LBT type and/or the first CP extension status). In an example, the second set of information may correspond to second information (e.g., second LBT type/CP extension information) associated with a second LBT type and/or a second CP extension status (e.g., the second set of information may be indicative of the second LBT type and/or the second CP extension status). The first set of information may be different than the second set of information. For example, the first LBT type may be different than the second LBT type. Alternatively and/or additionally, the first CP extension status may be different than the second CP extension status.

In some examples, the determination of whether or not the second sidelink transmission is within the COT may correspond to a determination of whether or not a timing of the second sidelink transmission is within the COT.

In an example, the first UE provides (e.g., indicates) the set of information to the second UE via the first sidelink transmission (e.g., the first UE may set one or more fields, of the first sidelink transmission, to one or more values indicative of the set of information).

In one embodiment, the second sidelink transmission is PSFCH for transmitting SL HARQ feedback associated with the first sidelink transmission. In one embodiment, the first sidelink transmission is PSSCH and/or PSCCH. In one embodiment, the first sidelink transmission is with SL HARQ feedback enable (e.g., SL HARQ feedback is enabled for the first sidelink transmission, such as where a recipient of the first sidelink transmission, such as the second UE, is configured to transmit SL HARQ feedback in response to the first sidelink transmission). In one embodiment, the first UE indicates that HARQ feedback (e.g., SL HARQ feedback) enable for the first sidelink transmission. For example, the first UE may set one or more fields of the first sidelink transmission to one or more values that indicate that HARQ feedback (e.g., SL HARQ feedback) is enabled for the first sidelink transmission. In an example, the second UE transmits the PSFCH (e.g., the second sidelink transmission) comprising the SL HARQ feedback based on HARQ feedback (e.g., SL HARQ feedback) being enabled for the first sidelink transmission.

In one embodiment, the second sidelink transmission is a PSFCH transmission comprising SL HARQ feedback associated with the first sidelink transmission. In one embodiment, the first sidelink transmission is a PSSCH transmission and/or a PSCCH transmission. In one embodiment, SL HARQ feedback is enabled for the first sidelink transmission. In one embodiment, the first UE indicates that HARQ feedback (e.g., SL HARQ feedback) is enabled for the first sidelink transmission. For example, the first UE may set one or more fields of the first sidelink transmission to one or more values that indicate that HARQ feedback (e.g., SL HARQ feedback) is enabled for the first sidelink transmission. In an example, the second UE transmits the PSFCH transmission (e.g., the second sidelink transmission) comprising the SL HARQ feedback based on HARQ feedback (e.g., SL HARQ feedback) being enabled for the first sidelink transmission.

In one embodiment, the set of information (included in the first sidelink transmission) is used, by the second UE, before performing the second sidelink transmission and/or for performing the second sidelink transmission. In one embodiment, the set of information included in the first sidelink transmission is used, by the second UE, to determine LBT information for use in accessing a channel for transmitting the second sidelink transmission. For example, the set of information is to assist the second UE in determining the LBT information to be used for accessing the channel. For example, the second UE may determine the LBT information (e.g., a LBT type and/or a LBT) for use in accessing the channel (e.g., shared spectrum channel) for performing the second sidelink transmission (e.g., the second UE may access the channel, according to the LBT information, in order to transmit the second sidelink transmission on the channel). In one embodiment, the first set of information is indicative of short LBT and/or transmission with CP extension (e.g., transmission with application of CP extension). In one embodiment, the second set of information is indicative of long LBT and/or transmission without CP extension (e.g., transmission without application of CP extension).

In one embodiment, the first sidelink transmission and the second sidelink transmission are in a sidelink resource pool (e.g., the first sidelink transmission and the second sidelink transmission are both performed using one or more resources of the same sidelink resource pool). In one embodiment, the second sidelink transmission is associated with the sidelink resource pool (e.g., the second sidelink transmission is configured, such as pre-configured, with the sidelink resource pool and/or the second UE is configured, such as pre-configured, with the sidelink resource pool, wherein the second UE transmits the second sidelink transmission using the sidelink resource pool). In one embodiment, the sidelink resource pool is in a carrier using shared spectrum channel access. In one embodiment, the COT (e.g., the COT initiated by the first UE) corresponds to an occupancy time on a channel in the carrier and/or on one or more resources in the carrier.

In one embodiment, based on (e.g., in response to) a determination (e.g., determination of step 1910) that the second sidelink transmission is within the COT (e.g., the COT initiated by the first UE), the set of information included in the first sidelink transmission is the first set of information. For example, the first UE may determine to include the first set of information in the first sidelink transmission based on (e.g., in response to) the determination that the second sidelink transmission is within the COT. Alternatively and/or additionally, the first UE may determine to provide the first set of information to the second UE (via the first sidelink transmission) based on (e.g., in response to) the determination that the second sidelink transmission is within the COT. Alternatively and/or additionally, based on (e.g., in response to) the determination that the second sidelink transmission is within the COT, the first UE may set one or more fields of the first sidelink transmission to one or more values indicative of the first set of information. Alternatively and/or additionally, based on (e.g., in response to) the determination that the second sidelink transmission is within the COT, the first UE may determine (e.g., derive) the set of information to be the first set of information.

In one embodiment, based on (e.g., in response to) a determination (e.g., determination of step 1910) that the second sidelink transmission is not within the COT (e.g., the COT initiated by the first UE), the set of information included in the first sidelink transmission is the second set of information. For example, the first UE may determine to include the second set of information in the first sidelink transmission based on (e.g., in response to) the determination that the second sidelink transmission is not within the COT. Alternatively and/or additionally, the first UE may determine to provide the second set of information to the second UE (via the first sidelink transmission) based on (e.g., in response to) the determination that the second sidelink transmission is not within the COT. Alternatively and/or additionally, based on (e.g., in response to) the determination that the second sidelink transmission is not within the COT, the first UE may set one or more fields of the first sidelink transmission to one or more values indicative of the second set of information. Alternatively and/or additionally, based on (e.g., in response to) the determination that the second sidelink transmission is not within the COT, the first UE may determine (e.g., derive) the set of information to be the second set of information.

In one embodiment, the determination that the second sidelink transmission is not within the COT (e.g., the COT initiated by the first UE) is based on a determination that an ending timing of the second sidelink transmission is after an ending timing of the COT. In an example, the ending timing of the second sidelink transmission corresponds to a timing (e.g., at least one of a time, a time period, a time unit, a slot, a symbol, etc.) of an end of the second sidelink transmission). In an example, the ending timing of the COT corresponds to a timing (e.g., at least one of a time, a time period, a time unit, a slot, a symbol, etc.) of an end of the COT).

In one embodiment, a length of the COT is a minimum length of: (i) a first length corresponding to (e.g., equal to) a number of consecutive (e.g., contiguous) slots, that are associated with a sidelink resource pool, from a beginning of the COT (e.g., a number of consecutive sidelink slots that comprise and/or correspond to resources of the sidelink resource pool); and (ii) a second length corresponding to a maximum time associated with a CAPC. In an example, in the scenario 700 shown in FIG. 7, the number of consecutive slots may correspond to 7 slots (e.g., a number of consecutive slots S3~S9, that are each associated with a sidelink resource pool, from a beginning of COT 712).

In one embodiment, the set of information is indicated by a 1st stage SCI, a 2nd stage SCI, and/or a MAC CE.

In one embodiment, the set of information is indicated by a 1st stage SCI that schedules the first sidelink transmission and/or a 2nd stage SCI that schedules the first sidelink transmission.

In one embodiment, the set of information is delivered (to the second UE, for example) via PSSCH.

In one embodiment, the set of information is not delivered (to the second UE, for example) via PSSCH.

In one embodiment, one or more fields of the first sidelink transmission are set to one or more values indicative of the set of information.

In one embodiment, if (e.g., when) SL HARQ feedback is enabled for the first sidelink transmission (e.g., based on SL HARQ feedback being enabled for the first sidelink transmission), the first sidelink transmission comprises the set of information and/or the first sidelink transmission comprises the one or more fields indicative of the set of information (e.g., the one or more fields may be set to the one or more values indicative of the set of information).

In one embodiment, if (e.g., when) SL HARQ feedback is disabled for the first sidelink transmission (e.g., based on SL HARQ feedback being disabled for the first sidelink transmission), the first sidelink transmission does not comprise the set of information and/or the first sidelink transmission does not comprise the one or more fields (e.g., the first sidelink transmission does not comprise any field for indicating LBT type/CP extension information). Alternatively and/or additionally, if (e.g., when) SL HARQ feedback is disabled for the first sidelink transmission (e.g., based on SL HARQ feedback being disabled for the first sidelink transmission), the one or more fields may be set to one or more values (e.g., one or more specific values) that are not indicative of the set of information (and/or are not indicative of LBT type/CP extension information).

In one embodiment, the first sidelink transmission comprises COT sharing information.

In one embodiment, the COT sharing information provides the set of information (e.g., the COT sharing information may be indicative of the set of information).

In one embodiment, the set of information is indicated by one or more first fields of a 2nd stage SCI in the first sidelink transmission and the COT sharing information is indicated by one or more second fields, of the 2nd stage SCI, different than the one or more first fields.

In one embodiment, the set of information is indicated by one or more first MAC CEs in the first sidelink transmission and the COT sharing information is indicated by one or more second MAC CEs, in the first sidelink transmission, different than the one or more first MAC CEs.

In one embodiment, the set of information is indicated by a first 2nd stage SCI in the first sidelink transmission and the COT sharing information is indicated by a second 2nd stage SCI, in the first sidelink transmission, different than the first 2nd stage SCI, wherein a first format of the first 2nd stage SCI is different than a second format of the second 2nd stage SCI.

In one embodiment, the COT sharing information comprises: (i) an indication of whether or not to share the COT (e.g., the COT initiated by the first UE); (ii) a shared starting timing of the COT; (iii) a shared ending timing of the COT; (iv) an ending position of the COT and/or an ending timing of the COT; (v) a remaining COT duration of the COT; (vi) a CAPC for the COT; (vii) an energy threshold for the COT; (viii) a channel access type and/or a LBT type for the second sidelink transmission; and/or (ix) a CP extension for the second sidelink transmission.

Referring back to FIGS. 3 and 4, in one exemplary embodiment of a first UE, the device 300 includes a program code 312 stored in the memory 310. In some examples, the first UE performs sidelink transmission using shared spectrum channel access. The CPU 308 may execute program code 312 to enable the first UE (i) in response to performing successful LBT, to determine a COT, (ii) to determine whether or not a second sidelink transmission, to be performed by a second UE, is within the COT, (iii) to determine a set of information, associated with LBT type and/or CP extension, for inclusion in a first sidelink transmission in the COT, wherein whether the set of information comprises a first set of information associated with LBT type and/or CP extension or the set of information comprises a second set of information associated with LBT type and/or CP extension is based on the determination of whether or not the second sidelink transmission is within the COT, and (iv) to transmit, to the second UE, the first sidelink transmission in the COT, wherein the first sidelink transmission comprises the set of information, and wherein the second sidelink transmission is associated with the first sidelink transmission and is performed by the second UE after the first sidelink transmission. Furthermore, the CPU 308 can execute the program code 312 to perform one, some and/or all of the above-described actions and steps and/or others described herein.

Figure 20:
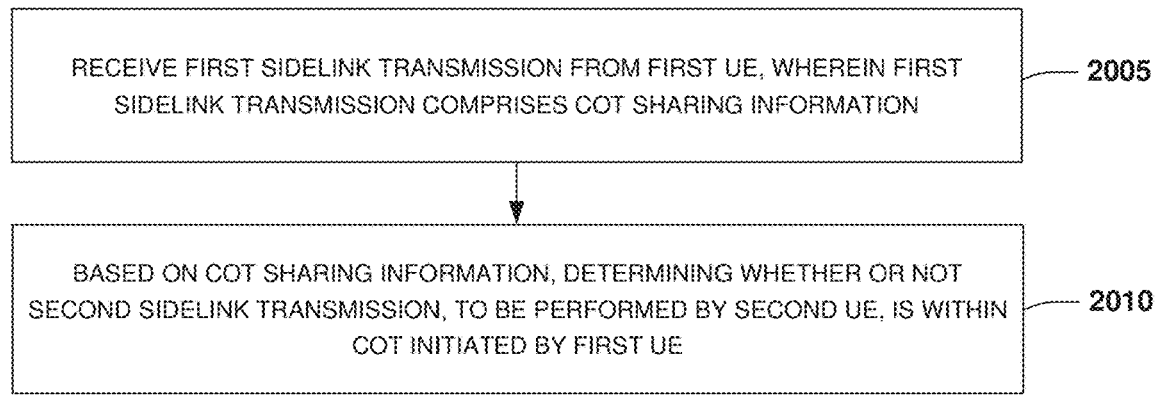
FIG. 20 is a flow chart according to one exemplary embodiment.

FIG. 20 is a flow chart 2000 according to one exemplary embodiment from the perspective of a second UE, such as a second UE performing sidelink transmission using shared spectrum channel access. In step 2005, the second UE receives a first sidelink transmission from a first UE, wherein the first sidelink transmission comprises COT sharing information. In step 2010, based on (e.g., in response to) the COT sharing information, the second UE determines whether or not a second sidelink transmission, to be performed by the second UE, is within a COT initiated (and/or shared) by the first UE. In an example, the COT sharing information may be transmitted by the first UE to the second UE to share the COT (initiated by the first UE) with the second UE. For example, the COT sharing information may comprise information associated with the COT. In some examples, the determination of whether or not the second sidelink transmission is within the COT may correspond to a determination of whether or not a timing of the second sidelink transmission is within the COT.

In one embodiment, based on (e.g., in response to) the second sidelink transmission being within the COT initiated (and/or shared) by the first UE, the second UE performs short LBT before (and/or for) performing the second sidelink transmission. Alternatively and/or additionally, based on (e.g., in response) to successful LBT (e.g., a LBT procedure, performed by the second UE, that has a LBT result corresponding to idle), the second UE may transmit the second sidelink transmission to the first UE, wherein the second sidelink transmission is within the COT initiated (and/or shared) by the first UE. Alternatively and/or additionally, based on (e.g., in response to) the second sidelink transmission not being within the COT initiated (and/or shared) by the first UE, the second UE may not perform (and/or may not be allowed to perform) a short LBT before (and/or for) performing the second sidelink transmission, and/or the second UE may perform long LBT before (and/or for) performing the second sidelink transmission.

In one embodiment, based on (e.g., in response to) the second sidelink transmission (to be performed by the second UE) being within the COT (e.g., the COT initiated and/or shared by the first UE), the second UE performs short LBT before performing the second sidelink transmission and/or for performing the second sidelink transmission. For example, the second sidelink transmission may be performed based on a LBT result of the short LBT. In response to successful LBT (e.g., the short LBT, performed by the second UE, having a LBT result corresponding to idle), the second UE transmits the second sidelink transmission to the first UE.

In one embodiment, based on (e.g., in response to) the second sidelink transmission (to be performed by the second UE) being at least partially outside the COT (e.g., the COT initiated and/or shared by the first UE), the second UE performs long LBT before performing the second sidelink transmission and/or for performing the second sidelink transmission. For example, the second sidelink transmission may be performed based on a LBT result of the long LBT. In response to successful LBT (e.g., the long LBT, performed by the second UE, having a LBT result corresponding to idle), the second UE transmits the second sidelink transmission to the first UE.

In one embodiment, based on (e.g., in response to) the second sidelink transmission (to be performed by the second UE) being at least partially outside the COT (e.g., the COT initiated and/or shared by the first UE), the second UE does not perform (and/or is not allowed to perform) short LBT before performing the second sidelink transmission and/or for performing the second sidelink transmission. For example, the second sidelink transmission may be performed based on a LBT result a LBT different than short LBT.

In one embodiment, the COT sharing information comprises: (i) an indication of whether or not to share the COT (e.g., the COT initiated by the first UE); (ii) a shared starting timing of the COT; (iii) a shared ending timing of the COT; (iv) an ending position of the COT and/or an ending timing of the COT; (v) a remaining COT duration of the COT; (vi) a CAPC for the COT; (vii) an energy threshold for the COT; (viii) a channel access type and/or a LBT type (for the second sidelink transmission, for example); and/or (ix) a CP extension (for the second sidelink transmission, for example).

In one embodiment, the second sidelink transmission is PSFCH for transmitting SL HARQ feedback associated with the first sidelink transmission. In one embodiment, the first sidelink transmission is PSSCH and/or PSCCH. In one embodiment, the first sidelink transmission is with SL HARQ feedback enable. In one embodiment, the first sidelink transmission is associated with a first SCI format indicating the COT sharing information with the information of LBT type and/or CP extension.

In one embodiment, the second sidelink transmission is a PSFCH transmission comprising SL HARQ feedback associated with the first sidelink transmission. For example, the second sidelink transmission may be PSFCH for transmitting SL HARQ feedback associated with the first sidelink transmission. In one embodiment, the first sidelink transmission is a PSSCH transmission and/or a PSCCH transmission. For example, the first sidelink transmission may be PSSCH and/or PSCCH. In one embodiment, SL HARQ feedback is enabled for the first sidelink transmission (e.g., SL HARQ feedback is enabled for the first sidelink transmission, such as where a recipient of the first sidelink transmission, such as the second UE, is configured to transmit SL HARQ feedback in response to the first sidelink transmission). For example, the first sidelink transmission is with SL HARQ feedback enable. In one embodiment, the first sidelink transmission is associated with a first SCI format indicative of the COT sharing information and a set of information associated with LBT type and/or CP extension. In an example, the set of information may correspond to information (e.g., LBT type/CP extension information) associated with a LBT type and/or a CP extension status (e.g., the set of information may be indicative of the LBT type and/or the CP extension status). In an example, the first sidelink transmission may comprise transmission of a SCI corresponding to the first SCI format.

In one embodiment, SL HARQ feedback is disabled for the first sidelink transmission (e.g., SL HARQ feedback is disabled for the first sidelink transmission, such as where a recipient of the first sidelink transmission, such as the second UE, is not configured to transmit SL HARQ feedback in response to the first sidelink transmission). For example, the first sidelink transmission is with SL HARQ feedback disable. In one embodiment, the first sidelink transmission is associated with a second SCI format (e.g., a SCI format different than the first SCI format) indicative of the COT sharing information without information associated with LBT type and/or CP extension. For example, the second SCI format may not be indicative of information (e.g., LBT type/CP extension information) associated with a LBT type and/or a CP extension status. In an example, the first sidelink transmission may comprise transmission of a SCI corresponding to the second SCI format (e.g., the first sidelink transmission and/or the SCI may not comprise information associated with LBT type and/or CP extension).

In one embodiment, based on (e.g., in response to) the COT sharing information, the second UE prioritizes data, one or more LCHs and/or one or more MAC CEs associated with the first UE for the second sidelink transmission, wherein the second sidelink transmission is within the COT initiated by the first UE. The UE may select a destination, associated with the first UE, for the second sidelink transmission. The destination may comprise a destination ID of the first UE, a groupcast destination ID of a group comprising the first UE and/or a broadcast destination ID. In some examples, in response to performing successful LBT (e.g., in response to performing a LBT procedure having a LBT result corresponding to idle), the second UE may transmit the second sidelink transmission to the first UE.

In an example, based on (e.g., in response to) receiving the COT sharing information from the first UE (and/or based on the second sidelink transmission being within the COT), the second UE may prioritize including the data, the one or more LCHs and/or the one or more MAC CEs (targeted to the first UE, for example) in the second sidelink transmission over other data, other LCHs and/or other MAC CEs (e.g., the data, the one or more LCHs and/or the one or more MAC CEs targeted to the first UE may be prioritized over other data, other LCHs and/or other MAC CEs targeted to one or more other UEs). For example, the data, the one or more LCHs and/or the one or more MAC CEs (targeted to the first UE, for example) may be transmitted to the first UE via the second sidelink transmission based on the data, the one or more LCHs and/or the one or more MAC CEs being prioritized over other data, other LCHs and/or other MAC CEs targeted to one or more other UEs. In an example, the second UE may prioritize including the data, the one or more LCHs and/or the one or more MAC CEs (targeted to the first UE, for example) in generating the second sidelink transmission (e.g., the second UE may generate the second sidelink transmission to comprise the data, the one or more LCHs and/or the one or more MAC CEs based on the data, the one or more LCHs and/or the one or more MAC CEs being prioritized over other data, other LCHs and/or other MAC CEs targeted to one or more other UEs).

In one embodiment, if (and/or when) the first sidelink transmission does not trigger and/or request the second sidelink transmission: (i) the second UE ignores and/or does not use information associated with LBT type and/or CP extension (e.g., the second UE ignores and/or does not use LBT type/CP extension information, that is indicated by the first sidelink transmission, for the second sidelink transmission, such as where the second UE performs the second sidelink transmission using one or more parameters, such as a LBT type and/or a CP extension status, that are not based on the LBT type/CP extension information); (ii) the first sidelink transmission is not indicative of information associated with LBT type and/or CP extension (e.g., the first sidelink transmission is not indicative of LBT type/CP extension information); (iii) the COT sharing information is not indicative of information associated with LBT type and/or CP extension (e.g., the COT sharing information is not indicative of LBT type/CP extension information); and/or (iv) the first sidelink transmission (and/or the COT sharing information) is associated with a second SCI format that is indicative of the COT sharing information without information associated with LBT type and/or CP extension. For example, the second SCI format may not be indicative of information (e.g., LBT type/CP extension information) associated with a LBT type and/or a CP extension status. In an example, the first sidelink transmission may comprise transmission of a SCI corresponding to the second SCI format (e.g., the first sidelink transmission and/or the SCI may not comprise information associated with LBT type and/or CP extension).

In one embodiment, the first sidelink transmission and the second sidelink transmission are in a sidelink resource pool (e.g., the first sidelink transmission and the second sidelink transmission are both performed using one or more resources of the same sidelink resource pool). In one embodiment, the second sidelink transmission is associated with the sidelink resource pool (e.g., the second sidelink transmission is configured, such as pre-configured, with the sidelink resource pool and/or the second UE is configured, such as pre-configured, with the sidelink resource pool, wherein the second UE transmits the second sidelink transmission using the sidelink resource pool). In one embodiment, the sidelink resource pool is in a carrier using shared spectrum channel access. In one embodiment, the COT (e.g., the COT initiated by the first UE) corresponds to an occupancy time on a channel in the carrier and/or on one or more resources in the carrier. In one embodiment, if (and/or when) the sidelink resource pool is configured with PSFCH, the first sidelink transmission is associated with a first SCI format indicative of the COT sharing information and a set of information associated with LBT type and/or CP extension. For example, if (and/or when) the sidelink resource pool is configured with PSFCH, the first sidelink transmission may comprise transmission of a SCI corresponding to the first SCI format (e.g., the first sidelink transmission and/or the SCI may comprise the COT sharing information and the set of information associated with LBT type and/or CP extension). In one embodiment, if (and/or when) the sidelink resource pool not is configured with PSFCH, the first sidelink transmission is associated with a second SCI format indicative of the COT sharing information without information associated with LBT type and/or CP extension (e.g., without the set of information associated with LBT type and/or CP extension). For example, if (and/or when) the sidelink resource pool is not configured with PSFCH, the first sidelink transmission may comprise transmission of a SCI corresponding to the second SCI format (e.g., the first sidelink transmission and/or the SCI may comprise the COT sharing information and may not comprise the set of information associated with LBT type and/or CP extension).

Referring back to FIGS. 3 and 4, in one exemplary embodiment of a second UE, the device 300 includes a program code 312 stored in the memory 310. In some examples, the second UE performs sidelink transmission using shared spectrum channel access. The CPU 308 may execute program code 312 to enable the second UE (i) to receive a first sidelink transmission from a first UE, wherein the first sidelink transmission comprises COT sharing information, and (ii) based on (e.g., in response to) the COT sharing information, to determine whether or not a second sidelink transmission, to be performed by the second UE, is within a COT initiated (and/or shared) by the first UE. Furthermore, the CPU 308 can execute the program code 312 to perform one, some and/or all of the above-described actions and steps and/or others described herein.

Figure 21:
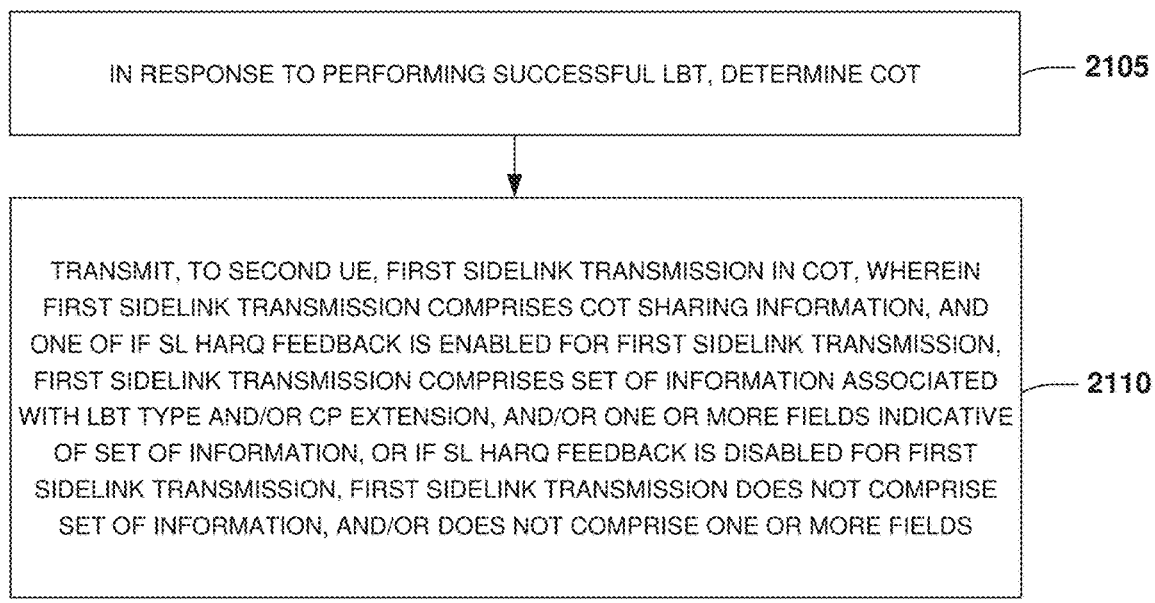
FIG. 21 is a flow chart according to one exemplary embodiment.

FIG. 21 is a flow chart 2100 according to one exemplary embodiment from the perspective of a first UE, such as a first UE performing sidelink transmission using shared spectrum channel access. In step 2105, in response to performing successful LBT, the first UE determines (e.g., obtains) a COT. For example, the first UE may have, occupy and/or initiate the COT based on (e.g., in response to) the successful LBT. The successful LBT may correspond to a LBT procedure, performed by the first UE, that has a LBT result corresponding to idle. In step 2110, the UE transmits, to a second UE, a first sidelink transmission in the COT. The first sidelink transmission comprises COT sharing information. If (e.g., when) SL HARQ feedback is enabled for the first sidelink transmission (e.g., based on SL HARQ feedback being enabled for the first sidelink transmission), the first sidelink transmission comprises a set of information associated with LBT type and/or CP extension and/or one or more fields indicative of the set of information (e.g., the one or more fields may be set to one or more values indicative of the set of information). Alternatively, if (e.g., when) SL HARQ feedback is disabled for the first sidelink transmission (e.g., based on SL HARQ feedback being disabled for the first sidelink transmission), the first sidelink transmission does not comprise the set of information and/or the first sidelink transmission does not comprise the one or more fields (e.g., the first sidelink transmission does not comprise any field for indicating LBT type/CP extension information). Alternatively and/or additionally, if (e.g., when) SL HARQ feedback is disabled for the first sidelink transmission (e.g., based on SL HARQ feedback being disabled for the first sidelink transmission), the one or more fields may be set to one or more values (e.g., one or more specific values) that are not indicative of the set of information (and/or are not indicative of LBT type/CP extension information). Alternatively and/or additionally, if (e.g., when) SL HARQ feedback is disabled for the first sidelink transmission (e.g., based on SL HARQ feedback being disabled for the first sidelink transmission), the first sidelink transmission may not comprise any information (e.g., LBT type/CP extension information) associated with a LBT type and/or a CP extension status (e.g., the first sidelink transmission may not be indicative of a LBT type and/or a CP extension status)

In an example, the set of information may correspond to information (e.g., LBT type/CP extension information) associated with a LBT type and/or a CP extension status (e.g., the set of information may be indicative of the LBT type and/or the CP extension status).

Referring back to FIGS. 3 and 4, in one exemplary embodiment of a first UE, the device 300 includes a program code 312 stored in the memory 310. In some examples, the first UE performs sidelink transmission using shared spectrum channel access. The CPU 308 may execute program code 312 to enable the first UE (i) in response to performing successful LBT, to determine a COT, and (ii) to transmit, to a second UE, a first sidelink transmission in the COT, wherein the first sidelink transmission is based on whether SL HARQ feedback is enabled or is disabled for the first sidelink transmission, where: (A) if (e.g., when) SL HARQ feedback is enabled for the first sidelink transmission, the first sidelink transmission comprises a set of information associated with LBT type and/or CP extension and/or comprises one or more fields indicative of the set of information; or (B) if (e.g., when) SL HARQ is disabled for the first sidelink transmission, the first sidelink transmission does not comprise the set of information and/or does not comprise the one or more fields. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 13-21. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 13-21, and/or one, some and/or all of the above-described actions and steps and/or others described herein.

It may be appreciated that applying one or more of the techniques presented herein may result in one or more benefits including, but not limited to, increased efficiency of communication between devices (e.g., UEs). The increased efficiency may be a result of enabling UEs to perform sidelink transmission in unlicensed spectrum and/or wideband unlicensed spectrum, thereby providing for improved throughput. For sidelink transmission applied on unlicensed spectrum (which may need fair coexistence with other RAT(s) and/or non-3GPP devices, for example), sidelink transmission could be performed under regulation for unlicensed spectrum.

In the present disclosure, if feature A is based on (e.g., in response to) feature B, then feature A may be based on (e.g., in response to) only feature B or may be based on (e.g., in response to) one or more features C, D, etc. in addition to feature B.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a second User Equipment (UE), the method comprising:
   receiving a first sidelink transmission from a first UE, wherein the first sidelink transmission comprises channel occupancy time (COT) sharing information;
   based on the COT sharing information, determining whether or not a second sidelink transmission, to be performed by the second UE, is within a COT initiated by the first UE;
   in response to the second sidelink transmission being within the COT initiated by the first UE, prioritizing at least one of data, one or more logical channels (LCHs) or one or more Medium Access Control Control Elements (MAC CEs) associated with the first UE for the second sidelink transmission, wherein the prioritizing is used for selecting a destination, associated with the first UE, for the second sidelink transmission, wherein:
     the destination comprises at least one of:
       a destination identifier (ID) of the first UE;
       a groupcast destination ID of a group comprising the first UE; or
       a broadcast destination ID; and
     the second sidelink transmission comprises data with a channel access priority class (CAPC) value that is the same or lower than a specific CAPC value which is included in the COT sharing information transmitted by the first UE; and
   in response to performing successful listen before talk (LBT), transmitting the second sidelink transmission to the selected destination associated with the first UE.

2. The method of claim 1, comprising:
   one of:
     based on the second sidelink transmission, to be performed by the second UE, being within the COT, performing short listen before talk (LBT) at least one of before performing the second sidelink transmission or for performing the second sidelink transmission; or
     based on the second sidelink transmission, to be performed by the second UE, being at least partially outside the COT, performing long LBT at least one of before performing the second sidelink transmission or for performing the second sidelink transmission; and
   transmitting the second sidelink transmission to the first UE in response to successful LBT comprising the short LBT or the long LBT.

3. The method of claim 1, wherein the COT sharing information comprises at least one of:
   an indication of whether or not to share the COT;
   a shared starting timing of the COT;
   a shared ending timing of the COT;
   at least one of an ending position of the COT or an ending timing of the COT;
   a remaining COT duration of the COT;
   an energy threshold for the COT;
   at least one of a channel access type or a LBT type; or
   a CP extension.

4. The method of claim 1, wherein at least one of:
   the second sidelink transmission is a Physical Sidelink Feedback Channel (PSFCH) transmission comprising Sidelink Hybrid Automatic Repeat Request (SL HARQ) feedback associated with the first sidelink transmission;
   the first sidelink transmission is at least one of a Physical Sidelink Shared Channel (PSSCH) transmission or a Physical Sidelink Control Channel (PSCCH) transmission;
   SL HARQ feedback is enabled for the first sidelink transmission; or
   the first sidelink transmission is associated with a first Sidelink Control Information (SCI) format indicative of the COT sharing information and a set of information associated with at least one of listen before talk (LBT) type or cyclic prefix (CP) extension.

5. The method of claim 1, wherein at least one of:
   Sidelink Hybrid Automatic Repeat Request (SL HARQ) feedback is disabled for the first sidelink transmission; or
   the first sidelink transmission is associated with a second Sidelink Control Information (SCI) format indicative of the COT sharing information without information associated with at least one of listen before talk (LBT) type or cyclic prefix (CP) extension.

6. The method of claim 1, wherein at least one of:
   the destination ID of the first UE is signaled by sidelink control information (SCI);
   the groupcast destination ID of the group comprising the first UE is signaled by SCI; or
   the broadcast destination ID is signaled by SCI.

7. The method of claim 1, wherein:
   if the first sidelink transmission does not at least one of trigger or request the second sidelink transmission, at least one of:
     the second UE at least one of ignores or does not use information associated with at least one of listen before talk (LBT) type or cyclic prefix (CP) extension;
     the first sidelink transmission is not indicative of information associated with at least one of LBT type or CP extension;

the COT sharing information is not indicative of information associated with at least one of LBT type or CP extension; or the first sidelink transmission is associated with a second Sidelink Control Information (SCI) format indicative of the COT sharing information without information associated with at least one of LBT type or CP extension.

8. The method of claim 1, wherein at least one of:
the first sidelink transmission and the second sidelink transmission are in a sidelink resource pool;
the second sidelink transmission is associated with the sidelink resource pool;
the sidelink resource pool is in a carrier using shared spectrum channel access;
the COT corresponds to an occupancy time on at least one of a channel in the carrier or one or more resources in the carrier;
if the sidelink resource pool is configured with Physical Sidelink Feedback Channel (PSFCH), the first sidelink transmission is associated with a first Sidelink Control Information (SCI) format indicative of the COT sharing information and a set of information associated with at least one of listen before talk (LBT) type or cyclic prefix (CP) extension; or
if the sidelink resource pool is not configured with PSFCH, the first sidelink transmission is associated with a second SCI format indicative of the COT sharing information without information associated with at least one of LBT type or CP extension.

9. A second User Equipment (UE), comprising:
a control circuit;
a processor installed in the control circuit; and
a memory installed in the control circuit and operatively coupled to the processor, wherein the processor is configured to execute a program code stored in the memory to perform operations, the operations comprising:
  receiving a first sidelink transmission from a first UE, wherein the first sidelink transmission comprises channel occupancy time (COT) sharing information;
  based on the COT sharing information, determining whether or not a second sidelink transmission, to be performed by the second UE, is within a COT initiated by the first UE;
  in response to the second sidelink transmission being within the COT initiated by the first UE, prioritizing at least one of data, one or more logical channels (LCHs) or one or more Medium Access Control Control Elements (MAC CEs) associated with the first UE for the second sidelink transmission, wherein the prioritizing is used for selecting a destination, associated with the first UE, for the second sidelink transmission, wherein:
    the destination comprises at least one of:
      a destination identifier (ID) of the first UE;
      a groupcast destination ID of a group comprising the first UE; or
      a broadcast destination ID; and
    the second sidelink transmission comprises data with a channel access priority class (CAPC) value that is the same or lower than a specific CAPC value which is included in the COT sharing information transmitted by the first UE; and in response to performing successful listen before talk (LBT), transmitting the second sidelink transmission to the selected destination associated with the first UE.

10. The second UE of claim 9, comprising:
one of:
  based on the second sidelink transmission, to be performed by the second UE, being within the COT, performing short listen before talk (LBT) at least one of before performing the second sidelink transmission or for performing the second sidelink transmission; or
  based on the second sidelink transmission, to be performed by the second UE, being at least partially outside the COT, performing long LBT at least one of before performing the second sidelink transmission or for performing the second sidelink transmission; and
transmitting the second sidelink transmission to the first UE in response to successful LBT comprising the short LBT or the long LBT.

11. The second UE of claim 9, wherein the COT sharing information comprises at least one of:
an indication of whether or not to share the COT;
a shared starting timing of the COT;
a shared ending timing of the COT;
at least one of an ending position of the COT or an ending timing of the COT;
a remaining COT duration of the COT;
an energy threshold for the COT;
at least one of a channel access type or a LBT type; or
a CP extension.

12. The second UE of claim 9, wherein at least one of:
the second sidelink transmission is a Physical Sidelink Feedback Channel (PSFCH) transmission comprising Sidelink Hybrid Automatic Repeat Request (SL HARQ) feedback associated with the first sidelink transmission;
the first sidelink transmission is at least one of a Physical Sidelink Shared Channel (PSSCH) transmission or a Physical Sidelink Control Channel (PSCCH) transmission;
SL HARQ feedback is enabled for the first sidelink transmission; or
the first sidelink transmission is associated with a first Sidelink Control Information (SCI) format indicative of the COT sharing information and a set of information associated with at least one of listen before talk (LBT) type or cyclic prefix (CP) extension.

13. The second UE of claim 9, wherein at least one of:
Sidelink Hybrid Automatic Repeat Request (SL HARQ) feedback is disabled for the first sidelink transmission; or
the first sidelink transmission is associated with a second Sidelink Control Information (SCI) format indicative of the COT sharing information without information associated with at least one of listen before talk (LBT) type or cyclic prefix (CP) extension.

14. The second UE of claim 9, wherein at least one of:
the destination ID of the first UE is signaled by sidelink control information (SCI);
the groupcast destination ID of the group comprising the first UE is signaled by SCI; or
the broadcast destination ID is signaled by SCI.

15. The second UE of claim 9, wherein:
if the first sidelink transmission does not at least one of trigger or request the second sidelink transmission, at least one of:
the second UE at least one of ignores or does not use information associated with at least one of listen before talk (LBT) type or cyclic prefix (CP) extension;
the first sidelink transmission is not indicative of information associated with at least one of LBT type or CP extension;
the COT sharing information is not indicative of information associated with at least one of LBT type or CP extension; or
the first sidelink transmission is associated with a second Sidelink Control Information (SCI) format indicative of the COT sharing information without information associated with at least one of LBT type or CP extension.

16. The second UE of claim 9, wherein at least one of:
the first sidelink transmission and the second sidelink transmission are in a sidelink resource pool;
the second sidelink transmission is associated with the sidelink resource pool;
the sidelink resource pool is in a carrier using shared spectrum channel access;
the COT corresponds to an occupancy time on at least one of a channel in the carrier or one or more resources in the carrier;
if the sidelink resource pool is configured with Physical Sidelink Feedback Channel (PSFCH), the first sidelink transmission is associated with a first Sidelink Control Information (SCI) format indicative of the COT sharing information and a set of information associated with at least one of listen before talk (LBT) type or cyclic prefix (CP) extension; or
if the sidelink resource pool is not configured with PSFCH, the first sidelink transmission is associated with a second SCI format indicative of the COT sharing information without information associated with at least one of LBT type or CP extension.

17. A non-transitory computer-readable medium comprising processor-executable instructions that when executed cause performance of operations, the operations comprising:
receiving a first sidelink transmission from a first User Equipment (UE), wherein the first sidelink transmission comprises channel occupancy time (COT) sharing information;
based on the COT sharing information, determining whether or not a second sidelink transmission, to be performed by a second UE, is within a COT initiated by the first UE;
in response to the second sidelink transmission being within the COT initiated by the first UE, prioritizing at least one of data, one or more logical channels (LCHs) or one or more Medium Access Control Control Elements (MAC CEs) associated with the first UE for the second sidelink transmission, wherein the prioritizing is used for selecting a destination, associated with the first UE, for the second sidelink transmission, wherein:
the destination comprises at least one of:
a destination identifier (ID) of the first UE;
a groupcast destination ID of a group comprising the first UE; or
a broadcast destination ID; and
the second sidelink transmission comprises data with a channel access priority class (CAPC) value that is the same or lower than a specific CAPC value which is included in the COT sharing information transmitted by the first UE; and
in response to performing successful listen before talk (LBT), transmitting the second sidelink transmission to the selected destination associated with the first UE.

18. The non-transitory computer-readable medium of claim 17, comprising:
one of:
based on the second sidelink transmission, to be performed by the second UE, being within the COT, performing short listen before talk (LBT) at least one of before performing the second sidelink transmission or for performing the second sidelink transmission; or
based on the second sidelink transmission, to be performed by the second UE, being at least partially outside the COT, performing long LBT at least one of before performing the second sidelink transmission or for performing the second sidelink transmission; and
transmitting the second sidelink transmission to the first UE in response to successful LBT comprising the short LBT or the long LBT.

19. The non-transitory computer-readable medium of claim 17, wherein the COT sharing information comprises at least one of:
an indication of whether or not to share the COT;
a shared starting timing of the COT;
a shared ending timing of the COT;
at least one of an ending position of the COT or an ending timing of the COT;
a remaining COT duration of the COT;
an energy threshold for the COT;
at least one of a channel access type or a LBT type; or
a CP extension.

20. The non-transitory computer-readable medium of claim 17, wherein at least one of:
the second sidelink transmission is a Physical Sidelink Feedback Channel (PSFCH) transmission comprising Sidelink Hybrid Automatic Repeat Request (SL HARQ) feedback associated with the first sidelink transmission;
the first sidelink transmission is at least one of a Physical Sidelink Shared Channel (PSSCH) transmission or a Physical Sidelink Control Channel (PSCCH) transmission;
SL HARQ feedback is enabled for the first sidelink transmission; or
the first sidelink transmission is associated with a first Sidelink Control Information (SCI) format indicative of the COT sharing information and a set of information associated with at least one of listen before talk (LBT) type or cyclic prefix (CP) extension.

21. The non-transitory computer-readable medium of claim 17, wherein at least one of:
Sidelink Hybrid Automatic Repeat Request (SL HARQ) feedback is disabled for the first sidelink transmission; or
the first sidelink transmission is associated with a second Sidelink Control Information (SCI) format indicative of the COT sharing information without information associated with at least one of listen before talk (LBT) type or cyclic prefix (CP) extension.

* * * * *